United States Patent
Paulk et al.

(10) Patent No.: US 12,514,933 B2
(45) Date of Patent: Jan. 6, 2026

(54) MODIFIED CPG DINUCLEOTIDES FOR RECOMBINANT VIRAL VECTOR PRODUCTION

(71) Applicant: Siren Biotechnology, Inc., San Francisco, CA (US)

(72) Inventors: Nicole Kristen Paulk, San Francisco, CA (US); Nathalie Andree Nancy Clement, Gainesville, FL (US); Siti Nur Sarah Morris, Vallejo, CA (US)

(73) Assignee: Siren Biotechnology, Inc., San Francisco, CA (US)

( * ) Notice: Subject to any disclaimer, the term of this patent is extended or adjusted under 35 U.S.C. 154(b) by 0 days.

(21) Appl. No.: 18/841,165

(22) PCT Filed: Oct. 4, 2023

(86) PCT No.: PCT/US2023/075992
§ 371 (c)(1),
(2) Date: Aug. 23, 2024

(87) PCT Pub. No.: WO2024/077089
PCT Pub. Date: Apr. 11, 2024

(65) Prior Publication Data
US 2025/0108130 A1  Apr. 3, 2025

Related U.S. Application Data

(60) Provisional application No. 63/413,196, filed on Oct. 4, 2022.

(51) Int. Cl.
*A61K 48/00* (2006.01)
*C12N 15/86* (2006.01)

(52) U.S. Cl.
CPC ............ *A61K 48/005* (2013.01); *C12N 15/86* (2013.01); *C12N 2750/14122* (2013.01); *C12N 2750/14143* (2013.01)

(58) Field of Classification Search
CPC .............................. C12N 15/86; A61K 48/005
See application file for complete search history.

(56) References Cited

U.S. PATENT DOCUMENTS

| | | |
|---|---|---|
| 3,773,919 A | 11/1973 | Boswell et al. |
| 6,566,118 B1 | 5/2003 | Atkinson et al. |
| 6,723,551 B2 | 4/2004 | Kotin et al. |
| 2002/0168640 A1 | 11/2002 | Li et al. |
| 2004/0235156 A1 | 11/2004 | Ralph |
| 2007/0036760 A1 | 2/2007 | Wilson et al. |
| 2020/0062843 A1 | 2/2020 | Wang et al. |

FOREIGN PATENT DOCUMENTS

| | | |
|---|---|---|
| WO | WO-1994011026 A2 | 5/1994 |
| WO | WO-2021003195 A1 | 1/2021 |
| WO | WO-2022017363 A1 | 1/2022 |
| WO | WO-2022094180 A1 | 5/2022 |

OTHER PUBLICATIONS

Jain NK, Ogden PJ, Church GM. Comprehensive mutagenesis maps the effect of all single-codon mutations in the AAV2 rep gene on AAV production. Elife. 2024;12:RP87730. (Year: 2024).*
Ogden PJ, Kelsic ED, Sinai S, Church GM. Comprehensive AAV capsid fitness landscape reveals a viral gene and enables machine-guided design. Science. 2019;366(6469):1139-1143. doi:10.1126/science.aaw2900 (Year: 2019).*
PCT/US2023/075992 International Search Report and Written Opinion mailed Apr. 2, 2024.

* cited by examiner

*Primary Examiner* — Teresa E Knight
*Assistant Examiner* — Kodye Lee Abbott
(74) *Attorney, Agent, or Firm* — Antheros Legal Advisors LLP

(57) ABSTRACT

The disclosure relates generally to methods of producing recombinant viral vectors with reduced immunogenicity.

20 Claims, 9 Drawing Sheets
Specification includes a Sequence Listing.

Codon Usage Tables

Codon Usage Table: Escherichia coli

| First Position | U | | | C | | | A | | | G | | | Third Position |
|---|---|---|---|---|---|---|---|---|---|---|---|---|---|
| U | UUU → Phe (F) | 0.58 | | UCU → Ser (S) | 0.14 | | UAU → Tyr (Y) | 0.57 | | UGU → Cys (C) | 0.45 | | U |
| | UUC → Phe (F) | 0.42 | | UCC → Ser (S) | 0.15 | | UAC → Tyr (Y) | 0.43 | | UGC → Cys (C) | 0.55 | | C |
| | UUA → Leu (L) | 0.13 | | UCA → Ser (S) | 0.14 | | UAA → * | 0.59 | | UGA → * | 0.33 | | A |
| | UUG → Leu (L) | 0.13 | | UCG → Ser (S) | 0.15 | | UAG → * | 0.08 | | UGG → Trp (W) | 1.00 | | G |
| C | CUU → Leu (L) | 0.11 | | CCU → Pro (P) | 0.17 | | CAU → His (H) | 0.58 | | CGU → Arg (R) | 0.36 | | U |
| | CUC → Leu (L) | 0.10 | | CCC → Pro (P) | 0.13 | | CAC → His (H) | 0.42 | | CGC → Arg (R) | 0.37 | | C |
| | CUA → Leu (L) | 0.04 | | CCA → Pro (P) | 0.19 | | CAA → Gln (Q) | 0.33 | | CGA → Arg (R) | 0.07 | | A |
| | CUG → Leu (L) | 0.49 | | CCG → Pro (P) | 0.51 | | CAG → Gln (Q) | 0.67 | | CGG → Arg (R) | 0.11 | | G |
| A | AUU → Ile (I) | 0.50 | | ACU → Thr (T) | 0.17 | | AAU → Asn (N) | 0.47 | | AGU → Ser (S) | 0.16 | | U |
| | AUC → Ile (I) | 0.40 | | ACC → Thr (T) | 0.41 | | AAC → Asn (N) | 0.53 | | AGC → Ser (S) | 0.27 | | C |
| | AUA → Ile (I) | 0.09 | | ACA → Thr (T) | 0.15 | | AAA → Lys (K) | 0.76 | | AGA → Arg (R) | 0.05 | | A |
| | AUG → Met (M) | 1.00 | | ACG → Thr (T) | 0.27 | | AAG → Lys (K) | 0.24 | | AGG → Arg (R) | 0.03 | | G |
| G | GUU → Val (V) | 0.26 | | GCU → Ala (A) | 0.16 | | GAU → Asp (D) | 0.63 | | GGU → Gly (G) | 0.33 | | U |
| | GUC → Val (V) | 0.21 | | GCC → Ala (A) | 0.27 | | GAC → Asp (D) | 0.37 | | GGC → Gly (G) | 0.39 | | C |
| | GUA → Val (V) | 0.16 | | GCA → Ala (A) | 0.22 | | GAU → Glu (E) | 0.68 | | GGA → Gly (G) | 0.12 | | A |
| | GUG → Val (V) | 0.37 | | GCG → Ala (A) | 0.35 | | GAG → Glu (E) | 0.32 | | GGG → Gly (G) | 0.16 | | G |

■ = preferred codon

Format: mRNA ◆    GCA → Ala (A)

FIG. 2

```
                         SEQUENCE LISTING

Sequence total quantity: 14
SEQ ID NO: 1              moltype = DNA  length = 589
FEATURE                   Location/Qualifiers
source                    1..589
                          mol_type = other DNA
                          organism = synthetic construct
SEQUENCE: 1
aatcaacctc tggattacaa aatttgtgaa agattgactg gtattcttaa ctatgttgct   60
cctttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aacccccact  240
ggttggggca ttgccaccac ctgtcagctc ctttccggga ctttcgcttt ccccctcct  300
attgccacgg cggaactcat cgccgcctgc cttgcccgct gctggacagg ggctcggctg  360
ttgggcactg acaattccgt ggtgttgtcg gggaaatcat cgtcctttcc ttggctgctc  420
gcctgtgttg ccacctggat tctgcgcggg acgtccttct gctacgtccc ttcggccctc  480
aatccagcgg accttccttc ccgcggcctg ctgccggctc tgcggcctct tccgcgtctt  540
cgccttcgcc ctcagacgag tcggatctcc ctttgggccg cctcccgc              589

SEQ ID NO: 2              moltype = RNA  length = 20
FEATURE                   Location/Qualifiers
source                    1..20
                          mol_type = other RNA
                          organism = synthetic construct
SEQUENCE: 2
cgttgtcagg caacgtggcg                                               20

SEQ ID NO: 3              moltype = RNA  length = 20
FEATURE                   Location/Qualifiers
source                    1..20
                          mol_type = other RNA
                          organism = synthetic construct
SEQUENCE: 3
gccttcgccc tcagacgagt                                               20

SEQ ID NO: 4              moltype = RNA  length = 20
FEATURE                   Location/Qualifiers
source                    1..20
                          mol_type = other RNA
                          organism = synthetic construct
SEQUENCE: 4
tggcccgttg tcaggcaacg                                               20

SEQ ID NO: 5              moltype = RNA  length = 20
FEATURE                   Location/Qualifiers
source                    1..20
                          mol_type = other RNA
                          organism = synthetic construct
SEQUENCE: 5
tccgactcgt ctgagggcga                                               20

SEQ ID NO: 6              moltype = RNA  length = 20
FEATURE                   Location/Qualifiers
source                    1..20
                          mol_type = other RNA
                          organism = synthetic construct
SEQUENCE: 6
gcgtatccac atagcgtaaa                                               20
```

| SEQ ID NO: 7 | moltype = DNA length = 1866 |
|---|---|
| FEATURE | Location/Qualifiers |
| source | 1..1866 |
| | mol_type = other DNA |
| | organism = synthetic construct |

SEQUENCE: 7

```
atgccggggt tttacgagat tgtgattaag gtcccccagcg accttgacga gcatctgccc    60
ggcatttctg acagctttgt gaactgggtg gccgagaagg aatgggagtt gccgccagat   120
tctgacatgg atctgaatct gattgagcag gcaccccctga ccgtggccga gaagctgcag   180
cgcgactttc tgacggaatg gcgccgtgtg agtaaggccc cggaggccct tttctttgtg   240
caatttgaga agggagagag ctacttccac atgcacgtgc tcgtgaaaac caccggggtg   300
aaatccatgt ttttgggacg tttcctgagt cagattcgcg aaaaactgat tcagagaatt   360
taccgcggga tcgagccgac tttgccaaac tggttcgcgg tcacaaagac cagaaatggc   420
gccggaggcg ggaacaaggt ggtggatgag tgctacatcc ccaattactt gctccccaaa   480
acccagcctg agctccagtg ggcgtggact aatatggaac agtatttaag gcctgtttg    540
aatctcacgg agcgtaaacg gttggtggcg cagcatctga cgcacgtgtc gcagacgcag   600
gagcagaaca agagaatca gaatcccaat tctgatgcgc cggtgatcag atcaaaaact   660
tcagccaggt acatggagct ggtcggtgtgg ctcgtggaca aggggattac ctcggagaag   720
cagtggatcc aggaggacca ggcctcatac atctccttca atgcggcctc caactcgcgg   780
tcccaaatca aggctgcctt ggacaatgcg ggaaagatta tgagcctgac taaaaccgcc   840
cccgactacc tggtgggcca gcagcccgtg gaggacatttt ccagcaatcg gatttataaa   900
attttggaac taaacgggta cgatcccccaa tatgcggctt cgtcttttct gggatgggcc   960
acgaaaaagt tcggcaagag gaacaccatc tggctgtttg ggcctgcaac taccgggaag  1020
accaacatcg cggaggccat agcccacact gtgcccttct acgggtgcgt aaactggacc  1080
aatgagaact ttcccttcaa cgactgtgtc gacaagatgt gatctggtg ggaggagggg  1140
aagatgaccg ccaaggtcgt ggagtcggcc aaagccattc tcggaggaag caaggtgccg  1200
gtggaccaga aatgcaagtc ctcggcccag atagacccga ctccccgtgat cgtcacctcc  1260
aacaccaaca tgtgcgccgt gattgacggg aactcaacga ccttcgaaca ccagcagccg  1320
ttgcaagacc ggatgttcaa atttgaactc acccgcccgtc tggatcatga ctttgggaag  1380
gtcaccaagc aggaagtcaa agactttttc cggtgggcaa aggatcacgt ggttgaggtg  1440
gagcatgaat tctacgtcaa aaagggtgga gccaagaaaa gacccgcccc cagtgacgca  1500
gatataagtg agcccaaacg ggtgcgcgag tcagttgcgc agccatcgac gtcagacgcg  1560
gaagcttcga tcaactacgc ggacaggtac caaaacaaat gttctcgtca cgtgggcatg  1620
aatctgatgc tgttttccctg cagacaatgc gagagactga atcagaattc aaatatctgt  1680
ttcactcacg gtgtcaaaga ctgtttagag tgctttcccg tgtcagaatc tcaacccgtt  1740
tctgtcgtca aaaaggcgta tcagaaactg tgctacattc atcacatcat gggaaaggtg  1800
ccagacgctt gcactgcttg cgacctggtc aatgtggact tggatgactg tgtttctgaa  1860
caataa                                                              1866
```

| SEQ ID NO: 8 | moltype = DNA length = 2211 |
|---|---|
| FEATURE | Location/Qualifiers |
| source | 1..2211 |
| | mol_type = other DNA |
| | organism = synthetic construct |

SEQUENCE: 8

```
atggctgccg atggttatct tccagattgg ctcgaggaca accttagtga aggaattcgc    60
gagtggtggg ctttgaaacc tggagccccct caacccaagg caaatcaaca acatcaagac   120
aacgctcgag gtcttgtgct tccggggttac aaatacctg gacccggcaa cggactcgac   180
aagggggagc cggtcaacgc agcagacgcg cggccctcg agcacgacaa ggcctacgac   240
cagcagctca aggccggaga caaccccgtac ctcaagtaca ccacgccgga cgccgagttc   300
caggagcgc tcaaagaaga tacgtctttt ggggggaacc tcgggcgagc agtcttccag   360
gccaaaaaga ggcttcttga acctcttggt ctggttgagg aagcggctaa gacggctcct   420
ggaaagaaga ggcctgtaga gcagtctcct caggaaccgg actcctcgc gggtattggc   480
aaatcgggtg cacagcccgc taaaagaga ctcaatttcg gtcagactgg cgacacagag   540
tcagtcccag accctcaacc aatcggagaa cctccccagg ccccccctcagg tgtgggatct   600
cttacaatgg cttcaggtgg tggcgcacca gtggcagaca ataacgaagg tgccgatgga   660
gtgggtagtt cctcgggaaa ttggcattgc gattcccaat ggctggggga cagagtcatc   720
accaccagca cccgaaccctg ggccctgccc acctacaaca atcacctcta caagcaaatc   780
tccaacagca catctggagg atcttcaaat gacaacgcct acttcggcta cagcaccccc   840
tgggggtatt ttgacttcaa cagattccac tgccacttct caccacgtga ctggcagcga   900
ctcatcaaca acaactgggg attccggcct aagcgactca acttcaagct cttcaacatt   960
caggtcaaag aggttacgga caacaatgga gtcaagacca tcgccaataa ccttaccagc  1020
acggtccagg tcttcacgga tcagactat cagctcccgt acgtgctcgg tcggctcac  1080
gagggctgc tcccgcgtt cccagccgac gtttccatga ttcctcagta cgggtactg  1140
acgcttaatg atggaagcca ggccgtgggt cgttcgtcct tttactgcct ggaatatttc  1200
ccgtcgcaaa tgctaagaac gggtaacaac ttccagttca gctacgagtt tgagaacgta  1260
cctttccata gcagctacgc tcacagccaa agcctggacc gactaatgaa tccactcatc  1320
gaccaatact tgtactatct ctcaaagact attaacggtt ctggacagaa tcaacaaacg  1380
ctaaaattca gtgtggccgg acccagcaac atggctgtcc agggaagaaa ctacatacct  1440
ggacccagct accgacaaca acgtgtctca accactgtga ctcaaaacaa caacagcgaa  1500
tttgcttggc ctggagcttc ttctgggct ctcaatggac gtaatagctt gatgaatcct  1560
ggacctgcta tggccagcca caagaagga gaggaccgtt tctttcctt gtctggatct  1620
ttaatttttg gcaaacaagg aactggaaga gacaacgtgg atgcggacaa agtcatgata  1680
accaacgaag aagaaattaa aactactaac ccggtagcaa cggagtccta tggacaggta  1740
gccacaaacc accagagtgc ccaagcacag gcgcagaccg gctgggttca aaaccaagga  1800
atacttcgg gtatggtttg gcaggacaga gatgtgtacc tgcaaggacc catttggcc  1860
aaaattcctc acacggacgg caactttcac ccttctccgc tgatgggagg gtttggaatg  1920
aagcacccgc ctcctcagat cctcatcaaa aacacacctg tacctgcgga tcctccaacg  1980
gccttcaaca aggacaagct gaactctttc atcacccagt attctactgg ccaagtcagc  2040
```

```
gtggagatcg agtgggagct gcagaaggaa aacagcaagc gctgaaccc ggagatccag  2100
tacacttcca actattacaa gtctaataat gttgaatttg ctgttaatac tgaaggtgta  2160
tatagtgaac cccgcccat tggcaccaga tacctgactc gtaatctgta a            2211
```

SEQ ID NO: 9             moltype = DNA    length = 795
FEATURE                  Location/Qualifiers
source                   1..795
                         mol_type = other DNA
                         organism = synthetic construct
SEQUENCE: 9
```
tcagaagaac tcgtcaagaa ggcgatagaa ggcgatgcgc tgcgaatcgg gagcggcgat   60
accgtaaagc acgaggaagc ggtcagccca ttcgccgcca agctcttcag caatatcacg  120
ggtagccaac gctatgtcct gatagcggtc cgccacaccc agccggccac agtcgatgaa  180
tccagaaaag cggccatttt ccaccatgat attcggcaag caggcatcgc catgggtcac  240
gacgagatcc tcgccgtcgg gcatgctcgc cttgagcctg gcgaacagtt cggctggcgc  300
gagccctga tgctcttcgt ccagatcatc ctgatcgaca agaccggctt ccatccgagt  360
acgtgctcgc tcgatgcgat gtttcgcttg gtggtcgaat gggcaggtag ccggatcaag  420
cgtatgcagc cgccgcattg catcagccat gatggatact ttctcggcag gagcaaggtg  480
agatgacagg agatcctgcc ccggcacttc gcccaatagc agccagtccc ttcccgcttc  540
agtgacaacg tcgagcacag ctgcgcaagg aacgcccgtc gtggccagcc acgatagccg  600
cgctgcctcg tcttgcagtt cattcagggc accggacagg tcggtcttga caaaaagaac  660
cgggcgcccc tgcgctgaca gccggaacac ggcggcatca gagcagccga ttgtctgttg  720
tgcccagtca tagccgaata gcctctccac ccaagcggcc ggagaacctg cgtgcaatcc  780
atcttgttca atcat                                                   795
```

SEQ ID NO: 10            moltype = DNA    length = 1866
FEATURE                  Location/Qualifiers
source                   1..1866
                         mol_type = other DNA
                         organism = synthetic construct
SEQUENCE: 10
```
atgcctgggt tttatgagat tgtgattaag gtcccagtg accttgatga gcatctgcct    60
ggcatttctg acagctttgt gaactgggtg gctgagaagg aatgggagtt gccaccagat  120
tctgacatgg atctgaatct gattgagcag gcacccgtg gctggctga aagctgcag   180
agagactttc tgacagaatg gagaagggtg agtaaggcc ctgaggccct tttctttgtg  240
caatttgaga agggagagag ctacttccac atgcatgtgc tggtggaaac cacagggtg   300
aaatccatgt ttttgggaag attcctgagt cagattagaa aaaactgat tcagagaatt   360
tacagaggga ttgagcccac tttgccaaac tggtttgctg tcacaaagac cagaaatggc  420
gccggagcg ggaacaaggt ggtgatgag tgctacatcc ccaattactt gctccccaaa   480
acccagcctg agctccagtg ggcgtggact aatatgaac agtatttaag cgcctgtttg   540
aatctcacgg agcgtaaag gttggtggct cagcatctga cacatgtgtc tcagactcag   600
gagcagaaca aagagaatca gaatcccaat tctgatgctc cagtgatcag atcaaaaact  660
tcagccaggt acatggagct ggtggtgtg ctggtggaa ctctgagaag                720
cagtggatcc aggaggacca ggcctctac atctccttca atgctgcctc caactccaga   780
tcccaaatca aggctgcctt ggacaatgct ggaaagatta tgagcctgac taaaacagcc   840
cctgactacc tggtgggcca gcagcctgtg aggacattt ccagcaatag gatttataaa   900
attttggaac taaatgggta tgatcccaa tatgctgctt ctgtctttct gggatgggcc   960
acaaaaaagt ttggcaagag gaacaccatc tggctgtttg ggcctgcaac tacagggaag  1020
accaacattg ctgaggccat agcccacact gtgcccttct atgggtgtgt aaactggacc  1080
aatgagaact tccccttcaa tgactgtgtg gacaagatgt tgatctggtg ggaggagggg  1140
aagatgacag ccaaggtggt ggagtcagcc aaagccattc tgggaggaag caaggtgaga  1200
gtggaccaga aatgcaagtc ctctgcccag atagaccta ctcctgtgat tgtcacctcc   1260
aacaccaaca tgtgtgctgt gattgatggg aactcaacaa cctttgaaca ccagcagccc  1320
ttgcaagaca ggatgttcaa atttgaactc accagaaggc tggatcatga ctttgggaag  1380
gtcaccaagc aggaagtcaa agactttttc cggtgggcaa aggatcacgt ggttgaggtg  1440
gagcatgaat tctacgtcaa aaagggtgga gccaagaaaa gacccgcccc cagtgacgca  1500
gatataagtg agcccaaacg ggtgcgcgag tcagttgccc agccatccac ctcagatgct  1560
gaagcttcga tcaactacgc agacaggtac caaaacaaat gttctagaca tgtgggcatg  1620
aatctgatgc tgtttccctg cagacaatgt gagagaatga tcagaattc aaatatctgc  1680
ttcactcatg gacagaaaga ctgtttagag tgctttcctg tgtcagaatc tcaaccagtt  1740
tctgtggtca aaaaggccta tcagaaactg tgctacattc atcatatcat gggaaaggtg  1800
ccagatgctt gcactgcctg tgatctggtc aatgtggatt ggatgactg catctttgaa  1860
caataa                                                             1866
```

SEQ ID NO: 11            moltype = DNA    length = 2211
FEATURE                  Location/Qualifiers
source                   1..2211
                         mol_type = other DNA
                         organism = synthetic construct
SEQUENCE: 11
```
atggctgctg atggttatct tccagattgg ctcgaggaca accttagtga aggaattaga   60
gagtggtggg ctttgaaacc tggagcccct caacccaagg caaatcaaca acatcaagac  120
aacgctcgag gtcttgtgct tccgggttac aaataccttg accccggcaa cggactcgac  180
aaggggagc cggtcaacgc agcagacgcg gcggccctcg agcacgacaa ggcctacgac  240
cagcagctca aggccggaga caaccccgta ctcaagtaca accacgccga cgccgagttc  300
caggagcggc tcaaagaaga tacgtctttt gggggcaacc tcgggcgagc agtcttccag  360
gccaaaaaga ggcttcttga acctcttggt ctggttgagg aagcggctaa gacggctcct  420
ggaaagaaga ggcctgtaga gcagtctcct caggaaccag actcctctgc tggtattggc  480
aaatctggtg cacagccagc taaaaagaga ctcaattttg gtcagactgg cgacacagag  540
```

```
tcagtcccag accctcaacc aatcggagaa cctcccgcag ccccctcagg tgtgggatct    600
cttacaatgg cttcaggtgg tggcgcacca gtggcagaca ataacgaagg tgccgatgga    660
gtgggtagtt cctcgggaaa ttggcattgc gattcccaat ggctggggga cagagtcatc    720
accaccagca cccgaacctg ggccctgccc acctacaaca atcacctcta caagcaaatc    780
tccaacagca catctggagg atcttcaaat gacaacgcct acttcggcta cagcaccccc    840
tgggggtatt ttgacttcaa cagattccac tgccacttct caccacgtga ctggcagcga    900
ctcatcaaca caactgggg attccggcct aagcgactca acttcaagct cttcaacatt    960
caggtcaaag aggttacgga caacaatgga gtcaagacca tcgccaataa ccttaccagc    1020
acggtccagg tcttcacgga ctcagactat cagctcccgt acgtgctcgg gtcggctcac    1080
gagggctgcc tcccgccgtt cccagcggac gttttcatga ttcctcagta tgggtatctg    1140
acacttaatg atggaagcca ggctgtgggt aggtcctcct tttactgcct ggaatatttc    1200
ccatcccaaa tgctaagaac aggtaacaac ttccagttca gctatgagtt tgagaatgta    1260
cctttccata gcagctatgc tcacagccaa agcctggaca gactaatgaa tccactcatt    1320
gaccaatact tgtactatct ctcaaagact attaatggtt ctggacagaa tcaacaaact    1380
ctaaaattca gtgtgctgg acccagcaac atggctgtcc agggaagaaa ctacatacct    1440
ggacccagct acagacaaca aagggtctca accactgtga ctcaaaacaa caacagtgaa    1500
tttgcttggc ctggagcttc ttcttgggct ctcaatggaa ggaatagctt gatgaatcct    1560
ggacctgcta tggccagcca caagaagga gaggacaggt tcttccttt gtctggatct    1620
ttaattttg gcaaacaagg aactggaaga gacaatgtgg atgctgcaa agtcatgata    1680
accaatgaag aagaaattaa aactactaac ccagtagcaa cagagtccta tggacaagtg    1740
gccacaaacc accagagtgc ccaagcacag gcccagacag gctgggttca aaaccaagga    1800
atacttcctg gtatggtttg gcaggacaga gatgtgtacc tgcaaggacc catttgggcc    1860
aaaattcctc acacagatgg caactttcac ccttctcccc tgatggggag gtttggaatg    1920
aagcaccctc ctcctcagat cctcatcaaa aacacacctg tacctgctga tcctccaaca    1980
gccttcaaca aggacaagct gaactctttc atcacccagt attctactgg ccaagtcagt    2040
gtggagattg agtgggagct gcagaaggaa aacagcaagg ggtggaaccc tgagatccag    2100
tacacttcca actattacaa gtctaataat gttgaatttg ctgttaatac tgaaggtgta    2160
tatagtgaac ccaggcccat tggcaccaga tacctgacta ggaatctgta a             2211

SEQ ID NO: 12         moltype = DNA   length = 795
FEATURE               Location/Qualifiers
source                1..795
                      mol_type = other DNA
                      organism = synthetic construct
SEQUENCE: 12
tcagaagaac tcatcaagaa gtctatagaa ggcaattctc tgggaatcag gagctgcaat     60
accataaagc acaaggaatc tgtcagccca ttcaccacca agtcttcag caatatctct    120
ggtagccaag gctatgtcct gatatctgtc tgccacaccc agtctgccac agtcaatgaa    180
tccagaaaat ctgccatttt ccaccatgat atttggcaag caggcatcac catgggtcac    240
aacaagatcc tcaccatctg gcatgctggc cttgagcctg gcaaacagtt ctgctggggc    300
aagcccctga tgctcttcat ccagatcatc ctgatcaaca agacctgctt ccattctagt    360
tcttgctctc tcaattctat gttggcttg gtggtcaaat gggcaggtag ctggatcaag    420
ggtatgcagt cttctcattg catcagccat gatggatact ttctctgcag gagcaaggtg    480
agatgacagg agatcctgcc ctggcacttc acccaaatagc agccagtccc ttcctgcttc    540
agtgacaaca tcaagcacag ctgcacaagg aacaccagtg gtggccagcc aggatagtct    600
ggctgcctca tcttgcagtt cattcaggc acctgacagg tcagtcttga caaaaagaac    660
tggtctcccc tgggctgaca gcctgaacac tgctgcatca gagcagccaa ttgtctgttg    720
tgcccagtca tagccaaata gcctctccac ccaagctgct ggagaacctg catgcaatcc    780
atcttgttca atcat                                                      795

SEQ ID NO: 13         moltype = DNA   length = 564
FEATURE               Location/Qualifiers
source                1..564
                      mol_type = genomic DNA
                      organism = Homo sapiens
SEQUENCE: 13
atgaccaaca agtgtctcct ccaaattgct ctcctgttgt gcttctccac tacagctctt     60
tccatgagct acaacttgct tggattccta caaagaagca gcaattttca gtgtcagaag    120
ctcctgtggc aattgaatgg gaggcttgaa tactgcctca aggacaggat gaactttgac    180
atccctgagg agattaagca gctgcagcag ttccagaagg aggatgctgc attgaccatc    240
tatgagatgc tccagaacat cttttctatt ttcagacaag attcatctag cactggctgg    300
aatgagacta ttgttgagaa cctcctggct aatgtctatc atcagataaa ccatctgaag    360
acagtcctgg aagaaaaact ggagaaagaa gatttccacg ggggaaaact catgagcagt    420
ctgcacctga aaagatatta tgggaggatt ctgcattacc tgaaggccaa ggagtacagt    480
cactgtgcct ggaccatagt cagagtggaa atcctaagga acttttactt cattaacaga    540
cttacaggtt acctccgaaa ctaa                                             564

SEQ ID NO: 14         moltype = DNA   length = 564
FEATURE               Location/Qualifiers
source                1..564
                      mol_type = other DNA
                      organism = synthetic construct
SEQUENCE: 14
atgaccaaca agtgtctcct ccaaattgct ctcctgttgt gcttctccac tacagctctt     60
tccatgagct acaacttgct tggattccta caaagaagca gcaattttca gtgtcagaag    120
ctcctgtggc aattgaatgg gaggcttgaa tactgcctca aggacaggat gaactttgac    180
atccctgagg agattaagca gctgcagcag ttccagaagg aggatgctgc attgaccatc    240
tatgagatgc tccagaacat cttttctatt ttcagacaag attcatctag cactggctgg    300
aatgagacta ttgttgagaa cctcctggct aatgtctatc atcagataaa ccatctgaag    360
```

-continued

```
acagtcctgg aagaaaaact ggagaaagaa gatttcacca ggggaaaact catgagcagt    420
ctgcacctga aaagatatta tgggaggatt ctgcattacc tgaaggccaa ggagtacagt    480
cactgtgcct ggaccatagt cagagtggaa atcctaagga acttttactt cattaacaga   540
cttacaggtt acctcagaaa ctaa                                          564
```

MODIFIED CPG DINUCLEOTIDES FOR RECOMBINANT VIRAL VECTOR PRODUCTION

CROSS REFERENCE TO RELATED APPLICATIONS

This application is the U.S. National Stage entry of International Application No. PCT/US2023/075992, filed on Oct. 4, 2023, which claims the benefit of and priority to U.S. Provisional Application No. 63/413,196, filed Oct. 4, 2022, the entire disclosures of each are hereby incorporated by reference in their entireties for all purposes.

SEQUENCE LISTING

The contents of the electronic sequence listing (SIB-001WO_SL.xml; Size: 24,670 bytes; and Date of Creation: Dec. 15, 2023) is herein incorporated by reference in its entirety.

SUMMARY OF THE DISCLOSURE

Described herein, in some embodiments, are nucleic acids, comprising: a helper polynucleotide comprising reduced CpG dinucleotides as compared to a parental equivalent. Described herein, in some embodiments, are nucleic acids, comprising: a helper polynucleotide comprising increased methylation of CpG dinucleotides as compared to a parental equivalent. In some embodiments, the helper polynucleotide comprises a promoter, an enhancer, an intron, a microRNA, a linker, a splicing element, or a poly A signal. In some embodiments, the helper polynucleotide comprises a promoter. In some embodiments, the promoter is selected from the group consisting of: CMV, CBA, EF1a, CAG, PGK, TRE, U6, UAS, T7, Sp6, lac, araBad, trp, Ptac, p5, p19, p40, Synapsin, CaMKII, GRK1, a mini promoter, an inducible promoter, and derivatives thereof. In some embodiments, the helper polynucleotide comprises a prokaryotic helper polynucleotide. In some embodiments, the helper polynucleotide comprises a eukaryotic helper polynucleotide. In some embodiments, the helper polynucleotide comprises one or more components derived from yeast. In some embodiments, the helper polynucleotide comprises one or more components derived from a plant. In some embodiments, the helper polynucleotide comprises one or more components derived from an adenovirus, an adeno-associated virus (AAV), an alphavirus, a parvovirus, a baculovirus, a Dengue virus, a lentivirus, a poxvirus, an anellovirus, a bocavirus, a vaccinia virus, a herpesvirus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is Herpes Simplex Virus (HSV) type 1 (HSV-1), HSV type 2 (HSV-2), Varicella Zoster Virus (VZV), Epstein-Barr Virus (EBV), Cytomegalovirus (CMV), human herpes virus (HHV) 6 (HHV-6), HHV-7, or HHV-8. In some embodiments, the adenovirus or AAV helper polynucleotides are selected from the group consisting of: Rep, Cap, E1A, E1B, E4, E2A, and VA RNA. In some embodiments, the Rep comprises a nucleotide sequence having at least about 80% sequence identity to the nucleic acid sequence of SEQ ID NOs: 7 or 10. In some embodiments, the Cap comprises a nucleotide sequence having at least about 80% sequence identity to the nucleic acid sequence of SEQ ID NOs: 8 or 11. In some embodiments, the lentiviral helper polynucleotide is selected from the group consisting of: Gag, Pol, Tat, Rev, Env, and VSV-G. In some embodiments, the nucleic acid is DNA. In some embodiments, the nucleic acid is RNA. In some embodiments, the nucleic acid is provided within a plasmid, a phagemid, a phage derivative, a virus, a bacmid, a bacterial artificial chromosome (BAC), minicircle, doggybone, a yeast artificial chromosome (YAC), or a cosmid. In some embodiments, the virus is an alphavirus, a parvovirus, an adenovirus, an AAV, a baculovirus, a Dengue virus, a lentivirus, a herpesvirus, a poxvirus, an anellovirus, a bocavirus, a vaccinia virus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV-1, HSV-2, VZV, EBV, CMV, HHV-6, HHV-7, or HHV-8. In some embodiments, the helper polynucleotide comprises a backbone polynucleotide comprising reduced CpG dinucleotides. In some embodiments, the helper polynucleotide comprises a backbone polynucleotide comprising increased methylation of CpG dinucleotides. In some embodiments, the helper polynucleotide comprises a backbone polynucleotide comprising reduced CpG dinucleotides and increased methylation of CpG dinucleotides. In some embodiments, the backbone polynucleotide comprises an antibiotic resistance gene. In some embodiments, the antibiotic resistance gene encodes an aminoglycoside, a beta-lactam, a glycopeptide, a macrolide, a polypeptide, a tetracycline, or a derivative thereof. In some embodiments, the antibiotic resistance gene encodes kanamycin, spectinomycin, streptomycin, ampicillin, carbenicillin, bleomycin, erythromycin, polymyxin B, tetracycline, chloramphenicol, neomycin, zeocin, or a derivative thereof. In some embodiments, the kanamycin comprises a nucleotide sequence having at least about 80% sequence identity to the nucleic acid sequence of SEQ ID NOs: 9 or 12. In some embodiments, the backbone polynucleotide comprises an origin of replication. In some embodiments, the origin of replication is selected from the group consisting of: pMB1, pBR322, ColE1, R6K, p15A, pSC101, ColE2, F1, pUC, and combinations or a derivative thereof. In some embodiments, the CpG dinucleotides are reduced by at least about 10% as compared to the parental equivalent. In some embodiments, the CpG dinucleotides are reduced by at least about 50% as compared to the parental equivalent. In some embodiments, the CpG dinucleotides are reduced by at least about 75% as compared to the parental equivalent. In some embodiments, the methylation of CpG dinucleotides is increased by at least about 10% as compared to the parental equivalent. In some embodiments, the methylation of CpG dinucleotides is increased by at least about 50% as compared to the parental equivalent. In some embodiments, the methylation of CpG dinucleotides is increased by at least about 75% as compared to the parental equivalent. In some embodiments, the nucleic acid does not comprise inverted terminal repeats (ITRs). In some embodiments, the nucleic acid does not comprise a payload of interest. In some embodiments, the nucleic acid further comprises a helper polynucleotide comprising increased methylation of CpG dinucleotides as compared to a parental equivalent.

Described herein, in some embodiments, are recombinant AAV vectors comprising: a) a first nucleic acid comprising a nucleotide sequence having at least 90% sequence identity to the nucleic acid sequence of SEQ ID NOs: 13 or 14; and b) a second nucleic acid comprising a helper polynucleotide comprising a nucleotide sequence having at least about 90% sequence identity to the nucleic acid sequence of SEQ ID NOs: 10 or 11.

Described herein, in some embodiments, are recombinant AAV vectors comprising: a) a first nucleic acid comprising a nucleotide sequence having at least 90% sequence identity to the nucleic acid sequence of SEQ ID NO: 14; and b) a second nucleic acid comprising one or more helper polynucleotides, the first helper polynucleotide of the one or more helper polynucleotides comprising a nucleotide sequence having at least about 90% sequence identity to the nucleic acid sequence of SEQ ID NO: 10 and the second helper polynucleotide of the one or more helper polynucleotides comprising a nucleotide sequence having at least about 90% sequence identity to the nucleic acid sequence of SEQ ID NO: or 11.

Described herein, in some embodiments, are recombinant AAV vectors comprising: a) a first nucleic acid comprising a payload of interest; and b) a second nucleic acid comprising a helper polynucleotide, wherein the second nucleic acid has a reduced number of CpG dinucleotides as compared to a parental equivalent. Described herein, in some embodiments, are recombinant AAV vectors comprising: a) a first nucleic acid comprising a payload of interest; and b) a second nucleic acid comprising a helper polynucleotide, wherein the second nucleic acid has increased methylation of CpG dinucleotides as compared to a parental equivalent. In some embodiments, the helper polynucleotide is selected from the group consisting of: a promoter, an enhancer, an intron, a microRNA, a linker, a splicing element, and a polyA signal. In some embodiments, the helper polynucleotide comprises a promoter. In some embodiments, the promoter is selected from the group consisting of: CMV, CBA, EF1a, CAG, PGK, TRE, U6, UAS, T7, Sp6, lac, araBad, trp, Ptac, p5, p19, p40, Synapsin, CaMKII, GRK1, a mini promoter, an inducible promoter, and derivatives thereof. In some embodiments, the helper polynucleotide comprises a prokaryotic helper polynucleotide. In some embodiments, the helper polynucleotide comprises a eukaryotic helper polynucleotide. In some embodiments, the helper polynucleotide comprises one or more components derived from yeast. In some embodiments, the helper polynucleotide comprises one or more components derived from a plant. In some embodiments, the helper polynucleotide comprises one or more components derived from an adenovirus, an AAV, an alphavirus, a parvovirus, a baculovirus, a Dengue virus, a lentivirus, a poxvirus, an anellovirus, a bocavirus, a vaccinia virus, a herpesvirus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV-1, HSV-2, VZV, EBV, CMV, HHV-6, HHV-7, or HHV-8. In some embodiments, the adenovirus or AAV helper polynucleotides are selected from the group consisting of: Rep, Cap, E1A, E1B, E4, E2A, and VA RNA. In some embodiments, the Rep comprises a nucleotide sequence having at least about 80% sequence identity to the nucleic acid sequence of SEQ ID NOs: 7 or 10. In some embodiments, the Cap comprises a nucleotide sequence having at least about 80% sequence identity to the nucleic acid sequence of SEQ ID NOs: 8 or 11. In some embodiments, the lentiviral helper polynucleotides are selected from the group consisting of: Gag, Pol, Tat, Rev, Env, and VSV-G. In some embodiments, the first or the second nucleic acid is DNA. In some embodiments, the first or the second nucleic acid is RNA. In some embodiments, the first or the second nucleic acid is provided within a plasmid, a phagemid, a phage derivative, a virus, a bacmid, a BAC, minicircle, doggybone, a YAC, or a cosmid. In some embodiments, the virus is an alphavirus, a parvovirus, an adenovirus, an AAV, a baculovirus, a Dengue virus, a lentivirus, a herpesvirus, a poxvirus, an anellovirus, a bocavirus, a vaccinia virus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV-1, HSV-2, VZV, EBV, CMV, HHV-6, HHV-7, or HHV-8. In some embodiments, the helper polynucleotide comprises a backbone polynucleotide comprising reduced CpG dinucleotides. In some embodiments, the helper polynucleotide comprises a backbone polynucleotide comprising increased methylation of CpG dinucleotides. In some embodiments, the helper polynucleotide comprises a backbone polynucleotide comprising reduced CpG dinucleotides and increased methylation of CpG dinucleotides. In some embodiments, the backbone polynucleotide comprises an antibiotic resistance gene. In some embodiments, the antibiotic resistance gene encodes an aminoglycoside, a beta-lactam, a glycopeptide, a macrolide, a polypeptide, a tetracycline, or a derivative thereof. In some embodiments, the antibiotic resistance gene encodes kanamycin, spectinomycin, streptomycin, ampicillin, carbenicillin, bleomycin, crythromycin, polymyxin B, tetracycline, chloramphenicol, neomycin, zeocin, or a derivative thereof. In some embodiments, the kanamycin comprises a nucleotide sequence having at least about 80% sequence identity to the nucleic acid sequence of SEQ ID NOs: 9 or 12. In some embodiments, the backbone polynucleotide comprises an origin of replication. In some embodiments, the origin of replication is selected from the group consisting of: pMB1, pBR322, ColE1, R6K, p15A, pSC101, ColE2, F1, pUC, and combinations or a derivative thereof. In some embodiments, the CpG dinucleotides are reduced by at least about 10% as compared to the parental equivalent. In some embodiments, the CpG dinucleotides are reduced by at least about 50% as compared to the parental equivalent. In some embodiments, the CpG dinucleotides are reduced by at least about 75% as compared to the parental equivalent. In some embodiments, the methylation of CpG dinucleotides is increased by at least about 10% as compared to the parental equivalent. In some embodiments, the methylation of CpG dinucleotides is increased by at least about 50% as compared to the parental equivalent. In some embodiments, the methylation of CpG dinucleotides is increased by at least about 75% as compared to the parental equivalent. In some embodiments, the second nucleic acid does not comprise ITRs. In some embodiments, the payload of interest comprises a nucleotide sequence having at least about 80% sequence identity to the nucleic acid sequence of SEQ ID NOs: 13 or 14.

Described herein, in some embodiments, are compositions comprising: a) a Clustered Regularly Interspaced Short Palindromic Repeat (CRISPR)-associated endonuclease fused to an RNA methyltransferase or a nucleic acid encoding the CRISPR-associated endonuclease fused to an RNA methyltransferase; and b) one or more guide RNAs or a nucleic acid encoding the one or more guide RNAs, the one or more guide RNAs targeting a sequence for methylating a cytosine in a CpG dinucleotide. In some embodiments, the CRISPR-associated endonuclease is Cas9. In some embodiments, the CRISPR-associated endonuclease is catalytically dead. In some embodiments, the CRISPR-associated endonuclease is catalytically dead Cas9 (dCas9) or a derivative thereof. In some embodiments, the RNA methyltransferase is a prokaryotic RNA methyltransferase. In some embodiments, the prokaryotic RNA methyltransferase is Fmu, YebU, RsmF, or a derivative thereof. In some embodiments, the RNA methyltransferase is a eukaryotic RNA methyltransferase. In some embodiments, the eukaryotic RNA methyltransferase is TRM4B, TRDMT1, NOP2A (OL12), NSUN1 (NOP2), NSUN2, NSUN3, NSUN4, NSUN5, NSUN6, NSUN7, or a derivative thereof. In some embodiments, the RNA methyltransferase is a 5-methylcytosine (m5C) RNA methyltransferase. In some embodiments, the sequence is a portion of the nucleic acid sequence of SEQ ID NO: 1. In some embodiments, the sequence comprises at least 97% sequence identity to any one of the nucleic acid sequences of SEQ ID NOs: 2-6 or a reverse complement thereof. In some embodiments, the sequence comprises any one of the nucleic acid sequences of SEQ ID NOs: 2-6 or a reverse complement thereof. In some embodiments, the one or more guide RNAs are encoded by a sequence comprising at least about 97% sequence identity to any one of the nucleic acid sequences of SEQ ID NOs: 2-6 or a reverse complement thereof. In some embodiments, the one or more guide RNAs are encoded by a sequence according to any one of the nucleic acid sequences of SEQ ID NOs: 2-6 or a reverse complement thereof. In some embodiments, at least 100 CpG dinucleotides are methylated. In some embodiments, at least 500 CpG dinucleotides are methylated. In some embodiments, at least 1000 CpG dinucleotides are methylated. In some embodiments, one or more CpG dinucleotides are methylated within at most about 200 base pairs of the sequence. In some embodiments, one or more CpG dinucleotides are methylated within at most about 1000 base pairs of the sequence. In some embodiments, one or more CpG dinucleotides are methylated within at most about 5000 base pairs of the sequence. In some embodiments, one or more CpG dinucleotides are methylated within at most about 10000 base pairs of the sequence. In some embodiments, one or more CpG dinucleotides are methylated within at most about 20000 base pairs of the sequence.

Described herein, in some embodiments, are compositions comprising: a) a nuclease fused to a methyltransferase; and b) a nucleic acid targeting a sequence comprising at least 97% sequence identity to any one of the nucleic acid sequences of SEQ ID NOs: 2-6 or a reverse complement thereof. In some embodiments, the nuclease is zinc finger nuclease (ZFN), a transcription activator-like effector nuclease, a homing endonuclease, or a CRISPR-associated endonuclease. In some embodiments, the CRISPR-associated endonuclease is Cas9. In some embodiments, the CRISPR-associated endonuclease is catalytically dead. In some embodiments, the CRISPR-associated endonuclease is dCas9 or a derivative thereof. In some embodiments, the methyltransferase is a DNA methyltransferase. In some embodiments, the DNA methyltransferase is a prokaryotic DNA methyltransferase. In some embodiments, the prokaryotic DNA methyltransferase is CerM, Dcm, M.HhaI, M.HacIII, or a derivative thereof. In some embodiments, the DNA methyltransferase is a eukaryotic DNA methyltransferase. In some embodiments, the eukaryotic DNA methyltransferase is a MET1, CMT, or DRM methyltransferase. In some embodiments, the eukaryotic DNA methyltransferase is MET1, METIIa, METIII, METIIb, PMET, CMET5, CMET21, ZMET1, Masc1, or a derivative thereof. In some embodiments, the DNA methyltransferase is DNMT1, or DNMT3a. In some embodiments, the methyltransferase is an RNA methyltransferase. In some embodiments, the RNA methyltransferase is a prokaryotic RNA methyltransferase. In some embodiments, the prokaryotic RNA methyltransferase is Fmu, YebU, RsmF, or a derivative thereof. In some embodiments, the RNA methyltransferase is a eukaryotic RNA methyltransferase. In some embodiments, the eukaryotic RNA methyltransferase is TRM4B, TRDMT1, NOP2A (OL12), NSUN1 (NOP2), NSUN2, NSUN3, NSUN4, NSUN5, NSUN6, NSUN7, or a derivative thereof. In some embodiments, the RNA methyltransferase is a 5-methylcytosine (m5C) RNA methyltransferase. In some embodiments, the sequence is a portion of the nucleic acid sequence of SEQ ID NO: 1. In some embodiments, the sequence comprises at least about 97% sequence identity to any one of the nucleic acid sequences of SEQ ID NOs: 2-6 or a reverse complement thereof. In some embodiments, the sequence comprises any one of the nucleic acid sequences of SEQ ID NOs: 2-6 or a reverse complement thereof. In some embodiments, the nucleic acid is a guide RNA (gRNA). In some embodiments, the gRNA is encoded by a sequence comprising at least about 97% sequence identity to any one of the nucleic acid sequences of SEQ ID NOs: 2-6 or a reverse complement thereof. In some embodiments, the gRNA is encoded by a sequence according to any one of the nucleic acid sequences of SEQ ID NOs: 2-6 or a reverse complement thereof.

Described herein, in some embodiments, are cells comprising the vectors or compositions of any one of the foregoing embodiments. In some embodiments, the cell is a eukaryotic cell. In some embodiments, the cell is a mammalian cell. In some embodiments, the cell is an immortalized cell. In some embodiments, the cell is an insect cell. In some embodiments, the cell is a yeast cell. In some embodiments, the cell is a plant cell. In some embodiments, the cell is a fungal cell. In some embodiments, the cell is a prokaryotic cell. In some embodiments, the cell is an A549, HEK-293, HEK-293T, BHK, CHO, HeLa, MRC5, Sf9, Cos-1, Cos-7, Vero, BSC 1, BSC 40, BMT 10, WI38, HeLa, Saos, C2C12, L cell, HT1080, HepG2, Huh7, K562, primary cell, or a derivative thereof. In some embodiments, the cell is an engineered cell. In some embodiments, the cell is a stable cell. In some embodiments, the vector or the composition is expressed transiently. In some embodiments, the vector or the composition is stably expressed. In some embodiments, the vector or the composition is stably expressed from an inducible system.

Described herein, in some embodiments, are methods for generating a recombinant AAV vector, comprising: a) providing cells with a nucleic acid comprising a payload of interest; and b) culturing the cells of step a) in a growth medium comprising cytosine or a derivative thereof to generate the recombinant AAV vector comprising methylation of at least about 25% of CpG dinucleotides. In some embodiments, a concentration of the cytosine or the derivative thereof is in a range of about 100 micromolar (μm) to about 5 millimolar (mM). In some embodiments, a concentration of the cytosine or the derivative thereof is up to 3 mM. In some embodiments, the cytosine or the derivative thereof is selected from the group consisting of methylcytosine, phosphorylated cytosine, and phosphorothioate cytosine. In some embodiments, the nucleic acid comprises reduced CpG dinucleotides. In some embodiments, the nucleic acid comprises increased methylation of CpG dinucleotides. In some embodiments, the nucleic acid comprises reduced CpG dinucleotides and increased methylation of CpG dinucleotides. In some embodiments, the method further comprises providing in step a) a nucleic acid, comprising: a helper polynucleotide comprising reduced CpG dinucleotides as compared to a parental equivalent. In some embodiments, the method further comprises providing in step a) a nucleic acid, comprising: a helper polynucleotide comprising increased methylation of CpG dinucleotides as compared to a parental equivalent. In some embodiments, the method further comprises providing in step a) a composition comprising: a) a CRISPR-associated endonuclease fused to an RNA methyltransferase or a nucleic acid encoding the CRISPR-associated endonuclease fused to an RNA methyltransferase; and b) one or more guide RNAs or a nucleic acid encoding the one or more guide RNAs, the one or more guide RNAs targeting a sequence for methylating a cytosine in a CpG dinucleotide. In some embodiments, the method further comprises providing in step a) a composition comprising: a) a nuclease fused to a methyltransferase; and b) a nucleic acid targeting a sequence comprising at least 97% sequence identity to any one of the nucleic acid sequences of SEQ ID NOs: 2-6 or a reverse complement thereof. In some embodiments, in step a) the cells are transfected with the polynucleotide. In some embodiments, in step a) the cells are infected with the polynucleotide. In some embodiments, the cells are in suspension. In some embodiments, the cells are adherent. In some embodiments, the cells are engineered stable cell lines. In some embodiments, the payload of interest comprises a nucleotide sequence having at least about 80% sequence identity to the nucleic acid sequence of SEQ ID NOs: 13 or 14.

Described herein, in some embodiments, are pharmaceutical compositions comprising: a recombinant AAV vector comprising a payload of interest; a plurality of helper polynucleotides comprising reduced CpG dinucleotides; and a pharmaceutically acceptable excipient.

Described herein, in some embodiments, are pharmaceutical compositions comprising: a) a recombinant AAV vector comprising a payload of interest; b) a plurality of helper polynucleotides comprising increased methylation of CpG dinucleotides; and c) a pharmaceutically acceptable excipient.

Described herein, in some embodiments, are pharmaceutical compositions having less than about 50% CpG dinucleotides as compared to a parental equivalent, the pharmaceutical composition comprising a) a recombinant AAV vector comprising a payload of interest; b) a plurality of helper polynucleotides; and c) a pharmaceutically acceptable excipient, wherein the pharmaceutical composition comprises less than about 50% CpG dinucleotides. In some embodiments, the pharmaceutical composition comprises less than about 30% CpG dinucleotides. In some embodiments, the pharmaceutical composition comprises less than about 20% CpG dinucleotides. In some embodiments, the pharmaceutical composition comprises less than about 10% CpG dinucleotides. In some embodiments, the recombinant AAV vector comprises less than about 15% CpG dinucleotides. In some embodiments, the recombinant AAV vector comprises less than about 10% CpG dinucleotides. In some embodiments, the recombinant AAV vector comprise less than about 5% CpG dinucleotides. In some embodiments, the plurality of helper polynucleotides comprises less than about 25% CpG dinucleotides. In some embodiments, the plurality of helper polynucleotides comprises less than about 40% CpG dinucleotides. In some embodiments, the plurality of helper polynucleotides comprises less than about 50% CpG dinucleotides. In some embodiments, the helper polynucleotide is selected from the group consisting of: a promoter, an enhancer, an intron, a microRNA, a linker, a splicing element, and a polyA signal. In some embodiments, the helper polynucleotide comprises a promoter. In some embodiments, the promoter is selected from the group consisting of: CMV, CBA, EF1a, CAG, PGK, TRE, U6, UAS, T7, Sp6, lac, araBad, trp, Ptac, p5, p19, p40, Synapsin, CaMKII, GRK1, a mini promoter, an inducible promoter, and derivatives thereof. In some embodiments, the helper polynucleotide comprises a prokaryotic helper polynucleotide. In some embodiments, the helper polynucleotide comprises a eukaryotic helper polynucleotide. In some embodiments, the helper polynucleotide comprises one or more components derived from yeast. In some embodiments, the helper polynucleotide comprises one or more components derived from a plant. In some embodiments, the helper polynucleotide comprises one or more components derived from an adenovirus, an adeno-associated virus (AAV), an alphavirus, a parvovirus, a baculovirus, a Dengue virus, a lentivirus, a poxvirus, an anellovirus, a bocavirus, a vaccinia virus, a herpesvirus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, AAV-HSC16, or a derivative thereof. In some embodiments, the herpesvirus is Herpes Simplex Virus (HSV) type 1 (HSV-1), HSV type 2 (HSV-2), Varicella Zoster Virus (VZV), Epstein-Barr Virus (EBV), Cytomegalovirus (CMV), human herpes virus (HHV) 6 (HHV-6), HHV-7, or HHV-8. In some embodiments, the adenovirus or AAV helper polynucleotides are selected from the group consisting of: Rep, Cap, E1A, E1B, E4, E2A, and VA RNA. In some embodiments, the Rep comprises a nucleotide sequence having at least about 80% sequence identity to the nucleic acid sequence of SEQ ID NOs: 7 or 10. In some embodiments, the Cap comprises a nucleotide sequence having at least about 80% sequence identity to the nucleic acid sequence of SEQ ID NOs: 8 or 11. In some embodiments, the lentiviral helper polynucleotides are selected from the group consisting of: Gag, Pol, Tat, Rev, Env, and VSV-G. In some embodiments, the helper polynucleotide comprises a backbone polynucleotide comprising reduced CpG dinucleotides. In some embodiments, the helper polynucleotide comprises a backbone polynucleotide comprising increased methylation of CpG dinucleotides. In some embodiments, the helper polynucleotide comprises a backbone polynucleotide comprising reduced CpG dinucleotides and increased methylation of CpG dinucleotides. In some embodiments, the backbone polynucleotide comprises an antibiotic resistance gene. In some embodiments, the antibiotic resistance gene encodes an aminoglycoside, a beta-lactam, a glycopeptide, a macrolide, a polypeptide, a tetracycline, or a derivative thereof. In some embodiments, the antibiotic resistance gene encodes kanamycin, spectinomycin, streptomycin, ampicillin, carbenicillin, bleomycin, erythromycin, polymyxin B, tetracycline, chloramphenicol, neomycin, zeocin, or a derivative thereof. In some embodiments, the kanamycin comprises a nucleotide sequence having at least about 80% sequence identity to the nucleic acid sequence of SEQ ID NOs: 9 or 12. In some embodiments, the backbone polynucleotide comprises an origin of replication. In some embodiments, the origin of replication is selected from the group consisting of: pMB1, pBR322, ColE1, R6K, p15A, pSC101, ColE2, F1, pUC, and combinations or a derivative thereof. In some embodiments, the CpG dinucleotides are reduced by at least about 10% as compared to the parental equivalent. In some embodiments, the CpG dinucleotides are reduced by at least about 50% as compared to the parental equivalent. In some embodiments, the CpG dinucleotides are reduced by at least about 75% as compared to the parental equivalent. In some embodiments, the methylation of CpG dinucleotides is increased by at least about 10% as compared to the parental equivalent. In some embodiments, the methylation of CpG dinucleotides is increased by at least about 50% as compared to the parental equivalent. In some embodiments, the methylation of CpG dinucleotides is increased by at least about 75% as compared to the parental equivalent. In some embodiments, the payload of interest comprises a nucleotide sequence having at least about 80% sequence identity to the nucleic acid sequence of SEQ ID NOs: 13 or 14.

BRIEF DESCRIPTION OF THE DRAWINGS

The disclosure is more completely understood with reference to the following drawings.

FIG. 2 is a table with the standard *E. coli* genetic code.

DETAILED DESCRIPTION

Figure 1:
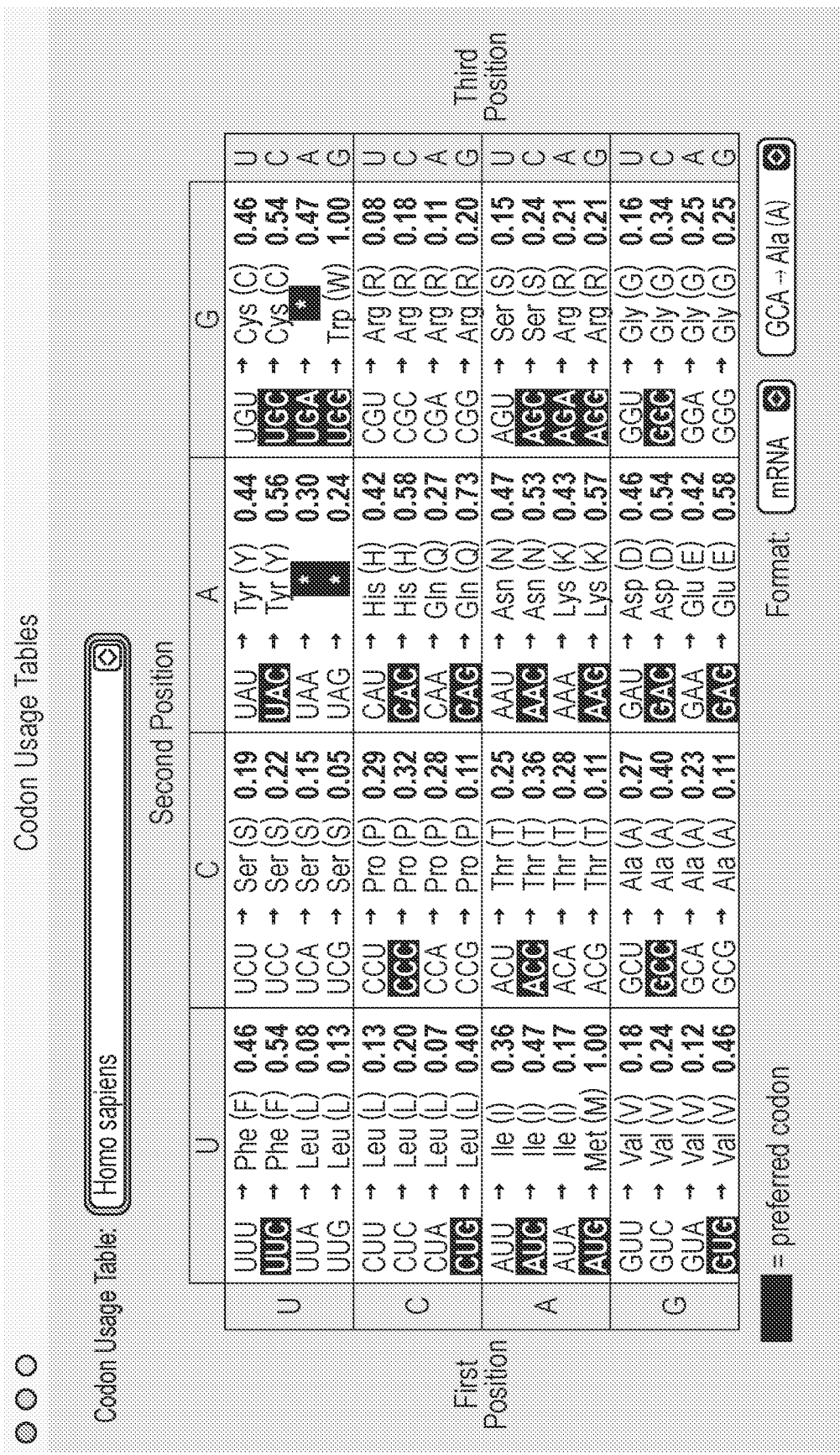
FIG. 1 is a table with the standard human genetic code.

Viral vectors are commonly used to deliver therapeutic genes to humans. In particular, adeno-associated viruses (AAV) have been used in recombinant viral vector systems for therapeutic delivery. Wild-type AAV is a small, non-enveloped human Parvovirus that is non-pathogenic to humans. The AAV genome comprises two open reading frames, Rep, and Cap flanked by two inverted terminal repeats (ITRs). Generally, recombinant adeno-associated viral (rAAV) vectors retain the ITRs that bracket a custom expression cassette containing the payload of interest. To generate the rAAV, additional vectors are needed such as helper polynucleotides that mediate AAV replication in vitro.

Currently, there are more than 200 ongoing human clinical trials using rAAV comprising drugs for eventual use in humans or veterinary animals. Numerous clinical trials have demonstrated safety, lack of toxicity, and efficacy of recombinant viral vectors in animal models and in humans. However, recent clinical data have generated a renewed focus on rAAV toxicity and immunogenicity. In particular, elements within the rAAV genome, combined with process-derived contaminants and impurities from different production platforms, have raised concerns as being potential triggers of innate immune responses once administered to patients.

One major immunostimulatory molecular pattern identified for AAV-induced immune responses involves CpGs. CpG denotation refers to a cytosine (C) linked through a phosphate bond (p) to a guanine (G) in CG dinucleotides in DNA genomes. Both the frequency of CpG and the methylation status of the cytosine in CpG varies across species. CpGs play a critical role in human immune reactions and their methylation status is an important trigger of human immune responses. In humans, unmethylated C's in CpGs are recognized by the Toll-like receptor 9 pathway as DNA signatures of pathogenic origin. This triggers an immune response against the hypomethylated DNA.

CpGs, particularly unmethylated CpGs, can trigger an immune response in humans that contributes to rAAV toxicity and immunogenicity. In some embodiments, a source of unmethylated CpGs in rAAV formulations is found in the final packaged rAAV vectors that are accidentally packaged from various sources such as from helper polynucleotides.

Another source of unmethylated CpGs arise from unpackaged impurities in the final rAAV formulation from components (e.g., helper polynucleotides) that are necessary to generate the rAAV. As such, there is a need to improve recombinant viral vectors and formulations for use in therapeutic gene therapy and genome editing.

Definitions

Unless defined otherwise, all technical and scientific terms used herein have the same meaning as is commonly understood by one of skill in the art to which the claimed subject matter belongs. Generally, nomenclatures utilized in connection with, and techniques of, immunology, oncology, cell and tissue culture, molecular biology, and protein and oligonucleotide or polynucleotide chemistry and hybridization described herein are those well-known and commonly used in the art. Units of measure not otherwise defined accord with The International System of Units (SI), NIST Special Publication 330, 2019 edition.

As used herein, all numerical values or numerical ranges comprise whole integers within or encompassing such ranges and fractions of the values or the integers within or encompassing ranges unless the context clearly indicates otherwise. Thus, for example, reference to a range of 90-100%, comprises 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. In another example, reference to a range of 1-5,000-fold comprises 1-, 2-, 3-, 4-, 5-, 6-, 7-, 8-, 9-, 10-, 11-, 12-, 13-, 14-, 15-, 16-, 17-, 18-, 19-, or 20-fold, etc., as well as 1.1-, 1.2-, 1.3-, 1.4-, or 1.5-fold, etc., 2.1-, 2.2-, 2.3-, 2.4-, or 2.5-fold, etc., and so forth.

The terminology used herein is for the purpose of describing particular embodiments only and is not intended to be limiting of any embodiment. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" comprises any and all combinations of one or more of the associated listed items.

As used herein, the term "adeno-associated virus vector" or "AAV vector" refers to a vector derived from an adeno-associated virus serotype, comprising without limitation, AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP.B, AAV-PHP.EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16. AAV vectors can have one or more of the AAV wild-type genes deleted in whole or part, e.g., the Rep and/or Cap genes, but retain functional flanking inverted terminal repeat (ITR) sequences. Functional ITR sequences promote the rescue, replication, and packaging of the AAV virion. Thus, an AAV vector is defined herein to comprise at least those sequences required in cis for replication and packaging (e.g., functional ITRs) of the virus. ITRs do not need to be the wild-type polynucleotide sequences and, in some embodiments, are altered, e.g., by the insertion, deletion, or substitution of nucleotides, so long as the sequences provide for functional rescue, replication, and packaging.

The terms "adeno-associated virus inverted terminal repeats" or "AAV ITRs" refer to regions flanking each end of the AAV genome which function together in cis as origins of DNA replication and as packaging signals for the virus. AAV ITRs, together with the AAV Rep coding region, can also provide for the efficient excision and integration of a polynucleotide sequence interposed between two flanking ITRs into a mammalian genome. As used herein, an "AAV ITR" does not necessarily comprise the wild-type polynucleotide sequence, which, in some embodiments, are altered, e.g., by the insertion, deletion or substitution of nucleotides. Additionally, the AAV ITRs are derived from any of several AAV serotypes, comprising without limitation AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP.B, AAV-PHP.EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, among others. Furthermore, 5' and 3' ITRs which flank a selected polynucleotide sequence in an AAV vector need not be identical or derived from the same AAV serotype or isolate, so long as they function as intended, e.g., to allow for the desired therapeutic or genome editing effect. Additionally, AAV ITRs are derived from any of several AAV serotypes, including without limitation, AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP.B, AAV-PHP.EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, and AAV-HSC16.

Unless specifically stated or obvious from context, as used herein, the term "about" in reference to a number or range of numbers is understood to mean the stated number and numbers ±10% thereof, or 10% below the lower listed limit and 10% above the higher listed limit for the values listed for a range.

A "Capsid gene" or "Cap gene" or "Cap" as used herein refers to a wild type or recombinant gene encoding the protein of any of the viral vector (e.g., AAV) capsid proteins that are components of viral particles. In some embodiments, a Cap gene has reduced CpG dinucleotides, increased methylation of CpG dinucleotides, or both.

"Complementary," as used herein, generally refers to a polynucleotide that comprises a nucleotide sequence capable of selectively annealing to an identifying region of a target polynucleotide under certain conditions. As used herein, the term "substantially complementary" and grammatical equivalents is intended to mean a polynucleotide that comprises a nucleotide sequence capable of specifically annealing to an identifying region of a target polynucleotide under certain conditions. Annealing refers to the nucleotide base-pairing interaction of one nucleic acid with another nucleic acid that results in the formation of a duplex, triplex, or other higher-ordered structure. The primary interaction is typically nucleotide base specific, e.g., A:T, A:U, and G:C, by Watson-Crick and Hoogsteen-type hydrogen bonding. In some embodiments, base-stacking and hydrophobic interactions can also contribute to duplex stability. Hybridization generally refers to the process in which two single-stranded polynucleotides bind non-covalently to form a stable double-stranded polynucleotide. A resulting double-stranded polynucleotide is a "hybrid" or "duplex." In certain instances, 100% sequence identity is not required for hybridization and, in certain embodiments, hybridization occurs at about greater than 70%, 75%, 80%, 85%, 90%, or 95% sequence identity. In certain embodiments, sequence identity comprises in addition to non-identical nucleobases, sequences comprising insertions and/or deletions.

By "CpG" sites is meant regions of DNA where a cytosine nucleotide occurs next to a guanine nucleotide in the linear nucleic acid sequence of nucleotides along its length, e.g., —C-phosphate-G-, cytosine and guanine separated by only one phosphate, or a cytosine 5' to the guanine nucleotide.

A "helper polynucleotide" refers to a polynucleotide that allows a vector (e.g., rAAV) to be generated. Exemplary helper polynucleotides of the disclosure include, but are not limited to, a promoter, an enhancer, an intron, a microRNA, a linker, a splicing element, a polyA signal, Rep, Cap, E1A, E1B, E4, E2A, ampicillin resistance gene, kanamycin resistance gene, VA, Gag, Pol, Tat, Rev, Env, and VSV-G. In some embodiments, a helper polynucleotide has reduced CpG dinucleotides, increased methylation of CpG dinucleotides, or both. A helper polynucleotide of the disclosure does not include an expression cassette comprising a payload of interest including a promoter operably linked to a payload of interest. "Helper polynucleotides" are also intended to include, without limitation, promoters, enhancers, internal ribosomal entry sites (IRES), and other expression control elements (e.g. transcription termination signals, such as polyadenylation signals and poly-U sequences). Helper polynucleotides include nucleic acids that direct constitutive expression of a nucleotide sequence in many types of host cell and those that direct expression of the nucleotide sequence only in certain host cells (e.g., tissue-specific regulatory sequences). In some embodiments, a helper polynucleotide, such as a tissue-specific promoter, directs expression primarily in a desired tissue of interest, such as muscle, neuron bone, skin, blood, specific organs (e.g. liver, pancreas), or particular cell types (e.g. lymphocytes). In some embodiments, helper polynucleotides also direct expression in a temporal-dependent manner, such as in a cell-cycle dependent or developmental stage-dependent, a tissue-specific, an environment-specific, or cell-type specific. In some embodiments, helper polynucleotides also direct expression in an inducible manner, such as would be controlled through the expression of or administration of an appropriate inducer molecule. Also encompassed by the term "helper polynucleotides" are enhancer elements, such as WPRE (e.g., a WPRE variant); CMV enhancers; the R-U5' segment in LTR of HTLV-I; SV40 enhancer; and the intron sequence between exons 2 and 3 of rabbit β-globin.

A "helper virus" refers to a virus that allows an otherwise-deficient coinfecting virus to replicate and be packaged by a host cell.

As used herein, the term "immunogenic" refers to the ability of a substance to induce an immune response in a recipient. In some embodiments, an immune response is induced when an immune system of an organism or a certain type of immune cells is exposed to an immunogenic substance. The term "non-immunogenic" refers to a lack of or absence of an immune response above a detectable threshold to a substance. In some embodiments, no immune response is detected when an immune system of an organism or a certain type of immune cells is exposed to a non-immunogenic substance. In some embodiments, a non-immunogenic composition, vector, or nucleic acid of the disclosure is provided herein, which does not induce an immune response above a pre-determined threshold when measured by an immunogenicity assay. In some embodiments, a reduced-immunogenic composition, vector, or nucleic acid of the disclosure is provided herein, which induces a reduced immune response below a pre-determined threshold when measured by an immunogenicity assay. For example, when an immunogenicity assay is used to measure antibodies raised against inflammatory markers, a non-immunogenic or reduced-immunogenic composition as provided herein leads to production of antibodies or markers at a level lower than predetermined threshold. The predetermined threshold is, for instance, at most 1.5 times, 2 times, 3 times, 4 times, or 5 times the level of antibodies or markers raised by a control reference.

As used herein, the terms "nuclease-deficient variant of a Cas nuclease," "dead Cas," or "dCas" refer to a Cas null mutant protein that is created by mutating both cleavage domains of a wild-type Cas nuclease. For example, a dCas would retain its ability to bind to genomic DNA through guide RNA:genomic DNA base pairing; however, unlike the wild-type Cas nuclease, where permanent gene disruption is achieved by cleavage by the nuclease, a dCas does not introduce cleavage.

The term "parvovirus" as used herein encompasses the family parvoviridae, comprising but not limited to autonomously replicating parviral genera and virus-dependent genera. Autonomous parvoviruses comprise, for example, members of the genus Bocavirus (Bocavirus), the genus Dependovirus (dependovirus), the genus erythro (erythrovirus), the genus mink aleutis virus (Amdovirus), the genus Parvovirus (Parvovirus), the genus Densovirus (Densovirus), the genus repeat virus (iterovirus), the genus cottravirus (containvirus), the genus avarporvovirus, the genus Copiparvovirus, the genus Protoparvovirus (Protoparvovirus), the genus Tetraparvovirus (tetrapivorvirus), the genus ambisense Densovirus (Ambidensovirus), the genus brevicula (brevinnovovirus), the genus hepatodensovirus (hepdensovirus), the genus prawn Densovirus (pendensovirus). Exemplary autonomous parvoviruses comprise, but are not limited to, porcine parvovirus, mouse parvovirus, canine parvovirus, mink enterovirus, bovine parvovirus, chicken parvovirus, feline panleukopenia virus (feline panleukosis virus), feline parvovirus, goose parvovirus, H1 parvovirus, muscovy duck parvovirus, snake parvovirus, and B19 virus.

As used herein, the terms "RNA guide," "guide RNA," and "gRNA" refer to any RNA molecule that facilitates the targeting of a polynucleotide-guided protein described herein (e.g., dCas) to a target nucleic acid. For example, a gRNA is a molecule that recognizes (e.g., binds to) a target nucleic acid. An RNA guide is designed to be complementary to a target nucleic acid. Exemplary "guide RNAs" comprise, but are not limited to, PEgRNAs, dRNAs, CRISPR RNAs (crRNAs), pre-crRNA, mature crRNA, or crRNAs in combination with cognate tracrRNAs. In some embodiments, the latter independent RNAs or fused to a single RNA using a linker. As used herein, the terms "CRISPR RNA" or "crRNA" refer to the 17-20 nucleotide sequence that is complementary to a target DNA. As used herein, the terms "trans-activating RNA" or "tracrRNA" refer to the ribonucleic sequence that acts as a scaffold linking a crRNA to a Cas nuclease.

"Percent identity," "% identity," or "sequence identity" refer to the extent to which two sequences (nucleotide or amino acid) have the same residues at the same positions in an alignment. For example, "a nucleotide sequence is X % identical to SEQ ID NO: Y" refers to % identity of the nucleotide sequence to SEQ ID NO: Y and is elaborated as X % of residues in the nucleotide sequence are identical to the corresponding residues of sequence disclosed in SEQ ID NO: Y. A sequence said to be X % identical to a reference sequence may contain more nucleotide or amino acid residues than specified in the reference sequence but must contain a sequence corresponding to the reference sequence. In most cases, the sequence in question will contain a sequence that corresponds to all of the specified reference sequences. Generally, computer programs are employed for such calculations. Exemplary programs that compare and align pairs of sequences, comprise ALIGN, FASTA, gapped BLAST, BLASTP, BLASTN, or GCG.

The term "plasmid" refers to an extrachromosomal element that carries genes that can replicate independently of the chromosomes of the cell. The plasmid can be in the form of a circular double-stranded DNA molecule. Such elements can include autonomously replicating sequences, genome integrating sequences, phage or nucleotide sequences, as well as linear, circular or supercoiled, single- or double-stranded DNA or RNA of any origin. Exemplary plasmids include, but are not limited to, minicircles and doggybone plasmids. In some embodiments, a plasmid (e.g., a transfer plasmid or a packaging plasmid) has reduced CpG dinucleotides, increased methylation of CpG dinucleotides, or both.

"Polynucleotide," or "nucleic acid," are used interchangeably herein and refer to chains of nucleotides of any length, and comprise DNA and RNA. In some embodiments, the nucleotides are deoxyribonucleotides, ribonucleotides, modified nucleotides or bases, and/or their analogs, or any substrate that is incorporated into a chain by DNA or RNA polymerase. A polynucleotide may comprise modified nucleotides, such as methylated nucleotides and their analogs. If present, modification to the nucleotide structure is imparted before or after assembly of the chain. In some embodiments, the sequence of nucleotides is interrupted by non-nucleotide components. In some embodiments, a polynucleotide is further modified after polymerization, such as by conjugation with a labeling component. Other types of modifications comprise, for example, "caps," substitution of one or more of the naturally occurring nucleotides with an analog, internucleotide modifications such as, for example, those with uncharged linkages (e.g., methyl phosphonates, phosphotriesters, phosphoamidates, carbamates) and with charged linkages (e.g., phosphorothioates, phosphorodithioates), those containing pendant moieties, such as, for example, proteins (e.g., nucleases, toxins, antibodies, signal peptides, poly-L-lysine), those with intercalators (e.g., acridine, psoralen), those containing chelators (e.g., metals, radioactive metals, boron, oxidative metals), those containing alkylators, those with modified linkages (e.g., alpha anomeric nucleic acids), as well as unmodified forms of the polynucleotide(s). In some embodiments, any of the hydroxyl groups ordinarily present in the sugars are replaced, for example, by phosphonate groups, phosphate groups, protected by standard protecting groups, or activated to prepare additional linkages to additional nucleotides, or are conjugated to solid supports. In some embodiments, the 5' and 3' terminal OH is phosphorylated or substituted with amines or organic capping group moieties of from 1 to 20 carbon atoms. Other hydroxyls may also be derivatized to standard protecting groups. In some embodiments, polynucleotides also contain analogous forms of ribose or deoxyribose sugars, comprising, for example, 2'-O-methyl-, 2'-O-allyl, 2'-fluoro- or 2'-azido-ribose, carbocyclic sugar analogs, alpha- or beta-anomeric sugars, epimeric sugars such as arabinose, xyloses or lyxoses, pyranose sugars, furanose sugars, sedoheptuloses, acyclic analogs and abasic nucleoside analogs such as methyl riboside. In some embodiments, one or more phosphodiester linkages are replaced by alternative linking groups. These alternative linking groups comprise, but are not limited to, embodiments wherein phosphate is replaced by P(O)S ("thioate"), P(S)S ("dithioate"), (O)NRi ("amidate"), P(O)R, P(O)OR', CO or CH2 ("formacetal"), in which each R or R' is independently H or substituted or unsubstituted alkyl (1-20 C) optionally containing an ether (—O—) linkage, aryl, alkenyl, cycloalkyl, cycloalkenyl or araldyl. Not all linkages in a polynucleotide need be identical. The preceding description applies to all polynucleotides referred to herein, comprising RNA and DNA.

"Promoter" and "promoter sequence" are used interchangeably and refer to a DNA sequence that controls the expression of a coding sequence or functional RNA. Typically, the coding sequence is located 3' to the promoter sequence. Promoters can be derived in their from a native gene, or be composed of different elements derived from different promoters found in nature, or synthetic DNA segments. In some embodiments, different promoters direct the expression of a gene in different tissues or cell types, or at different stages of development, or in response to different environmental or physiological conditions or inducer molecules. Promoters that cause a gene to be expressed in most cell types most of the time are commonly referred to as "constitutive promoters." Promoters that cause the expression of genes in a particular cell and tissue type are commonly referred to as "cell-specific promoters" or "tissue-specific promoters," respectively. Promoters that cause the expression of genes at specific stages of development or cell differentiation are commonly referred to as "development-specific promoters" or "cell differentiation-specific promoters." Promoters that induce and result in the expression of genes after exposing or treating cells with agents, biomolecules, chemicals, ligands, light, etc. that induce the promoters are commonly referred to as "inducible promoters" or "regulatable promoters." It is further recognized, in some embodiments, that since the exact boundaries of regulatory sequences have not been completely defined in most cases, DNA fragments of different lengths have the same promoter activity. In some embodiments, a promoter has reduced CpG dinucleotides, increased methylation of CpG dinucleotides, or both.

The phrase "pharmaceutically acceptable" refers to molecular entities and compositions that are physiologically tolerable to a mammal, particularly a human or animal patient.

As used herein, the term "protospacer" refers to an approximately 20 base pair DNA sequence that is adjacent to a protospacer adjacent motif sequence. The protospacer shares the same sequence as the spacer sequence of the gRNA. The gRNA anneals to the complement of the protospacer sequence on the target DNA (specifically, one strand thereof (i.e., the "target strand" versus the "non-target strand" of the target DNA sequence). In order for a Cas nuclease to function, it also requires a specific protospacer adjacent motif that varies depending on the bacterial species of the Cas gene. The skilled person will appreciate that the literature in the state of the art sometimes refers to the "protospacer" as the ~20 nucleotide target-specific guide sequence on the gRNA itself, rather than referring to it with the term "spacer." The context of the description surrounding the appearance of either "protospacer" or "spacer" will help inform the reader as to whether the term is in reference to the gRNA or the DNA target.

As used herein, the terms "protospacer adjacent sequence" or "PAM" refer to an approximately 2-6 base pair DNA sequence that is an important targeting component of a Cas nuclease. Typically, the PAM sequence is on either strand and is downstream in the 5' to 3' direction of a Cas nuclease cut site. The canonical PAM sequence (i.e., the PAM sequence that is associated with the Cas9 nuclease of *Streptococcus pyogenes* or SpCas9) is 5'-NGG-3', wherein "N" is any nucleobase followed by two guanine ("G") nucleobases. Different PAM sequences are associated with different Cas nucleases or equivalent proteins from different organisms. In addition, in some embodiments, any given Cas nuclease is modified to alter the PAM specificity of the polynucleotide-guided nuclease such that the polynucleotide-guided nuclease recognizes an alternative PAM sequence. It will also be appreciated that Cas nucleases from different bacterial species (i.e., orthologs) can have varying PAM specificities.

A "recombinant AAV vector (rAAV vector)" refers to a polynucleotide vector derived from an AAV and comprising one or more heterologous sequences (i.e., nucleic acid sequence not of AAV origin) that are flanked by at least one AAV ITR. In some embodiments, such rAAV vectors are replicated and packaged into viral particles when present in a host cell that has a suitable helper polynucleotide or virus (or that is expressing suitable helper functions) and that expresses AAV Rep and Cap gene products (i.e. AAV Rep and Cap proteins). When a rAAV vector is incorporated into a larger polynucleotide (e.g., in a chromosome or in another vector such as a plasmid used for cloning or transfection), then the rAAV vector are referred to as a "pro-vector" which are "rescued" by replication and encapsidation in the presence of AAV packaging functions and suitable helper functions.

The term "transgene" refers to a polynucleotide that is introduced into a cell and is capable of being transcribed into RNA by the cell and optionally, translated into a protein and/or expressed under appropriate conditions. The transgene may confer a desired property to a cell into which it was introduced, or otherwise lead to a desired therapeutic or diagnostic outcome.

The term "payload of interest" refers to a polynucleotide that is introduced into a cell that is capable of performing an intended function, such as gene repair or gene editing. In some embodiments, a payload of interest confers a desired property to a cell into which it was introduced, or otherwise leads to a desired therapeutic or diagnostic outcome.

As used herein, the term "vector" comprises a nucleic acid vector, e.g., a DNA vector, such as a plasmid, an RNA vector, or another suitable replicon (e.g., viral vector). A variety of vectors have been developed for the delivery of polynucleotides encoding exogenous polynucleotides or proteins into a prokaryotic or eukaryotic cell. Examples of such expression vectors are disclosed in, e.g., WO 1994/011026; incorporated herein by reference as it pertains to vectors suitable for the expression of a nucleic acid molecule of interest. Expression vectors suitable for use with the compositions and methods described herein contain a polynucleotide sequence as well as, e.g., additional sequence elements used for the expression of heterologous nucleic acid materials (e.g., a nucleic acid molecule) in a cell. Certain vectors that are used for the expression of the nucleic acid molecules described herein comprise plasmids that contain regulatory sequences, such as promoter and enhancer regions, which direct gene transcription. In some embodiments, the compact bidirectional promoters do not contain an enhancer. Other useful vectors for expression of nucleic acid molecule agents disclosed herein contain polynucleotide sequences that enhance the rate of translation of these polynucleotides or improve the stability or nuclear export of the RNA that results from gene transcription. These sequence elements comprise, e.g., 5' and 3' untranslated regions, an internal ribosomal entry site (IRES), and polyadenylation signal (polyA) in order to direct efficient transcription of the gene carried on the expression vector. In some embodiments, the expression vectors suitable for use with the compositions and methods described herein contain a backbone polynucleotide encoding a marker for selection of cells that contain such a vector. Examples of a suitable marker are genes that encode resistance to antibiotics, such as ampicillin, chloramphenicol, neomycin, zeocin, kanamycin, nourseothricin, aminoglycoside, a beta-lactam, a glycopeptide, a macrolide, a polypeptide, a tetracycline, spectinomycin, streptomycin, carbenicillin, bleomycin, erythromycin, polymyxin B, chloramphenicol, or a derivative thereof.

As used herein the term "wild type" or "wild-type" refers to the typical form of an organism, strain, gene, nucleic acid, vector, or vector components as it occurs in nature as distinguished from mutant or variant forms.

Polynucleotides of the Disclosure

Unmethylated CpGs can trigger an immune response in humans and contribute to vector toxicity and immunogenicity. Reducing the number of CpGs, increasing methylation of unmethylated CpGs, or both, can reduce this toxicity and immunogenicity, specifically in components that are involved in recombinant viral vector production (e.g., rAAV). Such components are described herein as helper polynucleotides that are involved in and help during recombinant viral vector production, for example, by providing genes that assist in replication or packaging. Helper polynucleotides as described herein refer to any component that is not the transgene or payload of interest and corresponding components for transgene or payload of interest expression or function.

Described herein, in some embodiments, are nucleic acids, comprising: a helper polynucleotide comprising reduced CpG dinucleotides as compared to a parental equivalent. Further described herein, in some embodiments, are nucleic acids, comprising: a helper polynucleotide comprising increased methylation of CpG dinucleotides as compared to a parental equivalent. In some embodiments, the nucleic acids comprise reduced CpG dinucleotides and increased methylation of CpG dinucleotides.

In some embodiments, the nucleic acid is DNA. In some embodiments, the nucleic acid is RNA.

In some embodiments, the helper polynucleotide is within a plasmid (e.g., circular DNA molecules that can autonomously replicate inside a cell), cosmid (e.g., pWE or sCos vectors), artificial chromosome, human artificial chromosome (HAC), yeast artificial chromosomes (YAC), bacterial artificial chromosome (BAC), minicircle, doggybone, P1-derived artificial chromosomes (PAC), phagemid, phage derivative, bacmid, or virus. In some embodiments, the helper polynucleotide is within a mammalian vector selected from the list consisting of: pSF-CMV-NEO-NH2-PPT-3× FLAG, pSF-CMV-NEO-COOH-3×FLAG, pSF-CMV-PURO-NH2-GST-TEV, pSF-OXB20-COOH-TEV-FLAG (R)-6His, pCEP4 pDEST27, pSF-CMV-Ub-KrYFP, pSF-CMV-FMDV-daGFP, pEF1a-mCherry-N1 vector, pEF1a-tdTomato vector, pSF-CMV-FMDV-Hygro, pSF-CMV-PGK-Puro, pMCP-tag(m), and pSF-CMV-PUBO-NH2-CMYC; bacterial expression vectors: pSF-OXB20-BetaGal, pSF-OXB20-Fluc, pSF-OXB20, and pSF-Tac; plant expression vectors: pRI 101-AN DNA and pCambia2301; and yeast expression vectors: pTYB21 and pKLAC2, and insect vectors: pAc5.1/V5-His A and pDEST8.

In some embodiments, the helper polynucleotide is within a virus. In some embodiments, the virus is an alphavirus, a parvovirus, an adenovirus, an AAV, a baculovirus, a Dengue virus, a lentivirus, a herpesvirus, a poxvirus, an anellovirus, a bocavirus, a vaccinia virus, or a retrovirus. In some embodiments, the virus is an alphavirus. In some embodiments, the virus is a parvovirus. In some embodiments, the virus is an adenovirus. In some embodiments, the virus is an AAV. In some embodiments, the virus is a baculovirus. In some embodiments, the virus is a Dengue virus. In some embodiments, the virus is a lentivirus. In some embodiments, the virus is a herpesvirus. In some embodiments, the virus is a poxvirus. In some embodiments, the virus is an anellovirus. In some embodiments, the virus is a bocavirus. In some embodiments, the virus is a vaccinia virus. In some embodiments, the virus is a retrovirus.

In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV type 1, HSV-2, VZV, EBV, CMV, HHV-6, HHV-7, or HHV-8.

In some embodiments, the virus is AAV1 or a derivative thereof. In some embodiments, the virus is AAV2 or a derivative thereof. In some embodiments, the virus is AAV3 or a derivative thereof. In some embodiments, the virus is AAV4 or a derivative thereof. In some embodiments, the virus is AAV5 or a derivative thereof. In some embodiments, the virus is AAV6 or a derivative thereof. In some embodiments, the virus is AAV7 or a derivative thereof. In some embodiments, the virus is AAV8 or a derivative thereof. In some embodiments, the virus is AAV9 or a derivative thereof. In some embodiments, the virus is AAV10 or a derivative thereof. In some embodiments, the virus is AAV11 or a derivative thereof. In some embodiments, the virus is AAV12 or a derivative thereof. In some embodiments, the virus is AAV13 or a derivative thereof. In some embodiments, the virus is AAV14 or a derivative thereof. In some embodiments, the virus is AAV15 or a derivative thereof. In some embodiments, the virus is AAV16 or a derivative thereof. In some embodiments, the virus is AAV-rh8 or a derivative thereof. In some embodiments, the virus is AAV-rh10 or a derivative thereof. In some embodiments, the virus is AAV-rh20 or a derivative thereof. In some embodiments, the virus is AAV-rh39 or a derivative thereof. In some embodiments, the virus is AAV-rh74 or a derivative thereof. In some embodiments, the virus is AAV-rhM4-1 or a derivative thereof. In some embodiments, the virus is AAV-hu37 or a derivative thereof. In some embodiments, the virus is AAV-Anc80 or a derivative thereof. In some embodiments, the virus is AAV-Anc80L65 or a derivative thereof. In some embodiments, the virus is AAV-7m8 or a derivative thereof. In some embodiments, the virus is AAV-PHP-B or a derivative thereof. In some embodiments, the virus is AAV-PHP-EB or a derivative thereof. In some embodiments, the virus is AAV-2.5 or a derivative thereof. In some embodiments, the virus is AAV-2tYF or a derivative thereof. In some embodiments, the virus is AAV-3B or a derivative thereof. In some embodiments, the virus is AAV-LK03 or a derivative thereof. In some embodiments, the virus is AAV-HSC1 or a derivative thereof. In some embodiments, the virus is AAV-HSC2 or a derivative thereof. In some embodiments, the virus is AAV-HSC3 or a derivative thereof. In some embodiments, the virus is AAV-HSC4 or a derivative thereof. In some embodiments, the virus is AAV-HSC5 or a derivative thereof. In some embodiments, the virus is AAV-HSC6 or a derivative thereof. In some embodiments, the virus is AAV-HSC7 or a derivative thereof. In some embodiments, the virus is AAV-HSC8 or a derivative thereof. In some embodiments, the virus is AAV-HSC9 or a derivative thereof. In some embodiments, the virus is AAV-HSC10 or a derivative thereof. In some embodiments, the virus is AAV-HSC11 or a derivative thereof. In some embodiments, the virus is AAV-HSC12 or a derivative thereof. In some embodiments, the virus is AAV-HSC13 or a derivative thereof. In some embodiments, the virus is AAV-HSC14 or a derivative thereof. In some embodiments, the virus is AAV-HSC15 or a derivative thereof. In some embodiments, the virus is AAV-TT or a derivative thereof. In some embodiments, the virus is AAV-DJ/8 or a derivative thereof. In some embodiments, the virus is AAV-Myo or a derivative thereof. In some embodiments, the virus is AAV-NP40 or a derivative thereof. In some embodiments, the virus is AAV-NP59 or a derivative thereof. In some embodiments, the virus is AAV-NP22 or a derivative thereof. In some embodiments, the virus is AAV-NP66 or a derivative thereof. In some embodiments, the virus is AAV-HSC16 or a derivative thereof.

In some embodiments, the virus is HSV-1 or a derivative thereof. In some embodiments, the virus is HSV-2 or a derivative thereof. In some embodiments, the virus is VZV or a derivative thereof. In some embodiments, the virus is EBV or a derivative thereof. In some embodiments, the virus is CMV or a derivative thereof. In some embodiments, the virus is HHV-6 or a derivative thereof. In some embodiments, the virus is HHV-7 or a derivative thereof. In some embodiments, the virus is HHV-8 or a derivative thereof.

In some embodiments, the helper polynucleotides comprise reduced CpG dinucleotides as compared to a parental equivalent. In some embodiments, the CpG dinucleotides are reduced by at least about 5%, 10%, 15%, 20%, 25%, 30%, 35%, 40%, 45%, 50%, 55%, 60%, 65%, 70%, 75%, 80%, 85%, 90%, 95%, or more than 99% as compared to a parental equivalent. In some embodiments, the CpG dinucleotides are reduced in a range of about 5% to about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 10% to about 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 15% to about 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 20% to about 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 25% to about 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 30% to about 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 40% to about 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 50% to about 55%, 60%, 65%, 70%, 75%, 80%, 85%, 90%, 95%, 96%, 97%, 98%, 99%, or 100%. In some embodiments, the CpG dinucleotides are reduced in a range of about 60% to about 65%, 70%, 75%, 80%, 85%, 90%, 95%, 96%, 97%, 98%, 99%, or 100%. In some embodiments, the CpG dinucleotides are reduced in a range of about 70% to about 75%, 80%, 85%, 90%, 95%, 96%, 97%, 98%, 99%, or 100%. In some embodiments, the CpG dinucleotides are reduced in a range of about 80% to about 85%, 90%, 95%, 96%, 97%, 98%, 99%, or 100%. In some embodiments, the CpG dinucleotides are reduced in a range of about 90% to about 95%, 96%, 97%, 98%, 99%, or 100%. In some embodiments, the CpG dinucleotides are reduced by at least about 50%. In some embodiments, the CpG dinucleotides are reduced by at least about 75%.

In some embodiments, the helper polynucleotides comprise increased methylation of CpG dinucleotides as compared to a parental equivalent. In some embodiments, the methylation of CpG dinucleotides is increased by at least about 5%, 10%, 15%, 20%, 25%, 30%, 35%, 40%, 45%, 50%, 55%, 60%, 65%, 70%, 75%, 80%, 85%, 90%, 95%, or more than 95% as compared to a parental equivalent. In some embodiments, the number of CpG dinucleotides is increased in a range of about 5% to about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 10% to about 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 15% to about 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 20% to about 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 25% to about 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 30% to about 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 40% to about 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 50% to about 55%, 60%, 65%, 70%, 75%, 80%, 85%, 90%, 95%, 96%, 97%, 98%, 99%, or 100%. In some embodiments, the number of CpG dinucleotides is increased in a range of about 60% to about 65%, 70%, 75%, 80%, 85%, 90%, 95%, 96%, 97%, 98%, 99%, or 100%. In some embodiments, the number of CpG dinucleotides is increased in a range of about 70% to about 75%, 80%, 85%, 90%, 95%, 96%, 97%, 98%, 99%, or 100%. In some embodiments, the number of CpG dinucleotides is increased in a range of about 80% to about 85%, 90%, 95%, 96%, 97%, 98%, 99%, or 100%. In some embodiments, the number of CpG dinucleotides is increased in a range of about 90% to about 95%, 96%, 97%, 98%, 99%, or 100%.

In some embodiments, the helper polynucleotide does not comprise inverted terminal repeats (ITRs).

In some embodiments, the helper polynucleotide does not comprise a payload of interest.

In some embodiments, the helper polynucleotide comprises a promoter, an enhancer, an intron, a microRNA, a linker, a splicing element, a polyA signal sequence, or combinations thereof. In some embodiments, the helper polynucleotide comprises a promoter. In some embodiments, the helper polynucleotide comprises an enhancer. In some embodiments, the helper polynucleotide comprises an intron. In some embodiments, the helper polynucleotide comprises a microRNA. In some embodiments, the helper polynucleotide comprises a linker. In some embodiments, the helper polynucleotide comprises a splicing element. In some embodiments, the helper polynucleotide comprises a polyA signal sequence.

In some embodiments, the helper polynucleotide comprises a promoter. In some embodiments, the promoter is selected from the group consisting of CMV, CBA, EF1a, CAG, PGK, TRE, U6, UAS, T7, Sp6, lac, araBad, trp, Ptac, p5, p19, p40, Synapsin, CaMKII, GRK1, a mini promoter, an inducible promoter, and derivatives thereof. In some embodiments, the promoter is the CMV promoter or a derivative thereof. In some embodiments, the promoter is the CBA promoter or a derivative thereof. In some embodiments, the promoter is the EF1a promoter or a derivative thereof. In some embodiments, the promoter is the CAG promoter or a derivative thereof. In some embodiments, the promoter is the PGK promoter or a derivative thereof. In some embodiments, the promoter is the TRE promoter or a derivative thereof. In some embodiments, the promoter is the U6 promoter or a derivative thereof. In some embodiments, the promoter is the UAS promoter or a derivative thereof. In some embodiments, the promoter is the T7 promoter or a derivative thereof. In some embodiments, the promoter is the Sp6 promoter or a derivative thereof. In some embodiments, the promoter is the lac promoter or a derivative thereof. In some embodiments, the promoter is the araBad promoter or a derivative thereof. In some embodiments, the promoter is the trp promoter or a derivative thereof. In some embodiments, the promoter is the Ptac promoter or a derivative thereof. In some embodiments, the promoter is the p5 promoter or a derivative thereof. In some embodiments, the promoter is the p19 promoter or a derivative thereof. In some embodiments, the promoter is the p40 promoter or a derivative thereof. In some embodiments, the promoter is the Synapsin promoter or a derivative thereof. In some embodiments, the promoter is the CaMKII promoter or a derivative thereof. In some embodiments, the promoter is the GRK1 promoter or a derivative thereof. In some embodiments, the promoter is a mini promoter or a derivative thereof. In some embodiments, the promoter is an inducible promoter.

In some embodiments, the helper polynucleotide comprises a prokaryotic helper polynucleotide. In some embodiments, the helper polynucleotide comprises a eukaryotic helper polynucleotide. In some embodiments, the helper polynucleotide is comprised of a eukaryotic helper polynucleotide and prokaryotic helper polynucleotide.

In some embodiments, the helper polynucleotide comprises one or more components derived from a yeast (e.g., an autonomous replication sequence, centromere, or telomere). In some embodiments, the helper polynucleotide comprises one or more components derived from a plant (e.g., virA, virB, virD, virG, or virE).

In some embodiments, the helper polynucleotide comprises one or more components (e.g., promoter, Rep, Cap) derived from a virus. In some embodiments, the virus is an alphavirus, a parvovirus, an adenovirus, an AAV, a baculovirus, a Dengue virus, a lentivirus, a herpesvirus, a poxvirus, an anellovirus, a bocavirus, a vaccinia virus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV type 1, HSV-2, VZV, EBV, CMV, HHV-6, HHV-7, or HHV-8. In some embodiments, the virus is an alphavirus. In some embodiments, the virus is a parvovirus. In some embodiments, the virus is an adenovirus. In some embodiments, the virus is an AAV. In some embodiments, the virus is a baculovirus. In some embodiments, the virus is a Dengue virus. In some embodiments, the virus is a lentivirus. In some embodiments, the virus is a herpesvirus. In some embodiments, the virus is a poxvirus. In some embodiments, the virus is an anellovirus. In some embodiments, the virus is a bocavirus. In some embodiments, the virus is a vaccinia virus. In some embodiments, the virus is a retrovirus.

In some embodiments, the virus is AAV1 or a derivative thereof. In some embodiments, the virus is AAV2 or a derivative thereof. In some embodiments, the virus is AAV3 or a derivative thereof. In some embodiments, the virus is AAV4 or a derivative thereof. In some embodiments, the virus is AAV5 or a derivative thereof. In some embodiments, the virus is AAV6 or a derivative thereof. In some embodiments, the virus is AAV7 or a derivative thereof. In some embodiments, the virus is AAV8 or a derivative thereof. In some embodiments, the virus is AAV9 or a derivative thereof. In some embodiments, the virus is AAV10 or a derivative thereof. In some embodiments, the virus is AAV11 or a derivative thereof. In some embodiments, the virus is AAV12 or a derivative thereof. In some embodiments, the virus is AAV13 or a derivative thereof. In some embodiments, the virus is AAV14 or a derivative thereof. In some embodiments, the virus is AAV15 or a derivative thereof. In some embodiments, the virus is AAV16 or a derivative thereof. In some embodiments, the virus is AAV-rh8 or a derivative thereof. In some embodiments, the virus is AAV-rh10 or a derivative thereof. In some embodiments, the virus is AAV-rh20 or a derivative thereof. In some embodiments, the virus is AAV-rh39 or a derivative thereof. In some embodiments, the virus is AAV-rh74 or a derivative thereof. In some embodiments, the virus is AAV-rhM4-1 or a derivative thereof. In some embodiments, the virus is AAV-hu37 or a derivative thereof. In some embodiments, the virus is AAV-Anc80 or a derivative thereof. In some embodiments, the virus is AAV-Anc80L65 or a derivative thereof. In some embodiments, the virus is AAV-7m8 or a derivative thereof. In some embodiments, the virus is AAV-PHP-B or a derivative thereof. In some embodiments, the virus is AAV-PHP-EB or a derivative thereof. In some embodiments, the virus is AAV-2.5 or a derivative thereof. In some embodiments, the virus is AAV-2tYF or a derivative thereof. In some embodiments, the virus is AAV-3B or a derivative thereof. In some embodiments, the virus is AAV-LK03 or a derivative thereof. In some embodiments, the virus is AAV-HSC1 or a derivative thereof. In some embodiments, the virus is AAV-HSC2 or a derivative thereof. In some embodiments, the virus is AAV-HSC3 or a derivative thereof. In some embodiments, the virus is AAV-HSC4 or a derivative thereof. In some embodiments, the virus is AAV-HSC5 or a derivative thereof. In some embodiments, the virus is AAV-HSC6 or a derivative thereof. In some embodiments, the virus is AAV-HSC7 or a derivative thereof. In some embodiments, the virus is AAV-HSC8 or a derivative thereof. In some embodiments, the virus is AAV-HSC9 or a derivative thereof. In some embodiments, the virus is AAV-HSC10 or a derivative thereof. In some embodiments, the virus is AAV-HSC11 or a derivative thereof. In some embodiments, the virus is AAV-HSC12 or a derivative thereof. In some embodiments, the virus is AAV-HSC13 or a derivative thereof. In some embodiments, the virus is AAV-HSC14 or a derivative thereof. In some embodiments, the virus is AAV-HSC15 or a derivative thereof. In some embodiments, the virus is AAV-TT or a derivative thereof. In some embodiments, the virus is AAV-DJ/8 or a derivative thereof. In some embodiments, the virus is AAV-Myo or a derivative thereof. In some embodiments, the virus is AAV-NP40 or a derivative thereof. In some embodiments, the virus is AAV-NP59 or a derivative thereof. In some embodiments, the virus is AAV-NP22 or a derivative thereof. In some embodiments, the virus is AAV-NP66 or a derivative thereof. In some embodiments, the virus is AAV-HSC16 or a derivative thereof.

In some embodiments, the virus is HSV-1 or a derivative thereof. In some embodiments, the virus is HSV-2 or a derivative thereof. In some embodiments, the virus is VZV or a derivative thereof. In some embodiments, the virus is EBV or a derivative thereof. In some embodiments, the virus is CMV or a derivative thereof. In some embodiments, the virus is HHV-6 or a derivative thereof. In some embodiments, the virus is HHV-7 or a derivative thereof. In some embodiments, the virus is HHV-8 or a derivative thereof.

In some embodiments, the adenovirus or AAV helper polynucleotide is selected from the group consisting of: Rep, Cap, E1A, E1B, E4, E2A, and VA RNA. For example, in some embodiments, the adenovirus or AAV helper polynucleotide is Rep. In some embodiments, the adenovirus or AAV helper polynucleotide is Cap. In some embodiments, the adenovirus or AAV helper polynucleotide is E1A. In some embodiments, the adenovirus or AAV helper polynucleotide is E1B. In some embodiments, the adenovirus or AAV helper polynucleotide is E4. In some embodiments, the adenovirus or AAV helper polynucleotide is E2A. In some embodiments, the adenovirus or AAV helper polynucleotide is VA RNA.

In some embodiments, the Rep is derived from AAV1 or a derivative thereof. In some embodiments, the Rep is derived from AAV2 or a derivative thereof. In some embodiments, the Rep is derived from AAV3 or a derivative thereof. In some embodiments, the Rep is derived from AAV4 or a derivative thereof. In some embodiments, the Rep is derived from AAV5 or a derivative thereof. In some embodiments, the Rep is derived from AAV6 or a derivative thereof. In some embodiments, the Rep is derived from AAV7 or a derivative thereof. In some embodiments, the Rep is derived from AAV8 or a derivative thereof. In some embodiments, the Rep is derived from AAV9 or a derivative thereof. In some embodiments, the Rep is derived from AAV10 or a derivative thereof. In some embodiments, the Rep is derived from AAV11 or a derivative thereof. In some embodiments, the Rep is derived from AAV12 or a derivative thereof. In some embodiments, the Rep is derived from AAV13 or a derivative thereof. In some embodiments, the Rep is derived from AAV14 or a derivative thereof. In some embodiments, the Rep is derived from AAV15 or a derivative thereof. In some embodiments, the Rep is derived from AAV16 or a derivative thereof. In some embodiments, the Rep is derived from AAV-rh8 or a derivative thereof. In some embodiments, the Rep is derived from AAV-rh10 or a derivative thereof. In some embodiments, the Rep is derived from AAV-rh20 or a derivative thereof. In some embodiments, the Rep is derived from AAV-rh39 or a derivative thereof. In some embodiments, the Rep is derived from AAV-rh74 or a derivative thereof. In some embodiments, the Rep is derived from AAV-rhM4-1 or a derivative thereof. In some embodiments, the Rep is derived from AAV-hu37 or a derivative thereof. In some embodiments, the Rep is derived from AAV-Anc80 or a derivative thereof. In some embodiments, the Rep is derived from AAV-Anc80L65 or a derivative thereof. In some embodiments, the Rep is derived from AAV-7m8 or a derivative thereof. In some embodiments, the Rep is derived from AAV-PHP-B or a derivative thereof. In some embodiments, the Rep is derived from AAV-PHP-EB or a derivative thereof. In some embodiments, the Rep is derived from AAV-2.5 or a derivative thereof. In some embodiments, the Rep is derived from AAV-2tYF or a derivative thereof. In some embodiments, the Rep is derived from AAV-3B or a derivative thereof. In some embodiments, the Rep is derived from AAV-LK03 or a derivative thereof. In some embodiments, the Rep is derived from AAV-HSC1 or a derivative thereof. In some embodiments, the Rep is derived from AAV-HSC2 or a derivative thereof. In some embodiments, the Rep is derived from AAV-HSC3 or a derivative thereof. In some embodiments, the Rep is derived from AAV-HSC4 or a derivative thereof. In some embodiments, the Rep is derived from AAV-HSC5 or a derivative thereof. In some embodiments, the Rep is derived from AAV-HSC6 or a derivative thereof. In some embodiments, the Rep is derived from AAV-HSC7 or a derivative thereof. In some embodiments, the Rep is derived from AAV-HSC8 or a derivative thereof. In some embodiments, the Rep is derived from AAV-HSC9 or a derivative thereof. In some embodiments, the Rep is derived from AAV-HSC10 or a derivative thereof. In some embodiments, the Rep is derived from AAV-HSC11 or a derivative thereof. In some embodiments, the Rep is derived from AAV-HSC12 or a derivative thereof. In some embodiments, the Rep is derived from AAV-HSC13 or a derivative thereof. In some embodiments, the Rep is derived from AAV-HSC14 or a derivative thereof. In some embodiments, the Rep is derived from AAV-HSC15 or a derivative thereof. In some embodiments, the Rep is derived from AAV-TT or a derivative thereof. In some embodiments, the Rep is derived from AAV-DJ/8 or a derivative thereof. In some embodiments, the Rep is derived from AAV-Myo or a derivative thereof. In some embodiments, the Rep is derived from AAV-NP40 or a derivative thereof. In some embodiments, the Rep is derived from AAV-NP59 or a derivative thereof. In some embodiments, the Rep is derived from AAV-NP22 or a derivative thereof. In some embodiments, the Rep is derived from AAV-NP66 or a derivative thereof. In some embodiments, the Rep is derived from AAV-HSC16 or a derivative thereof.

In some embodiments, the Rep comprises a nucleotide sequence having at least 70% (e.g., 75%, 80%, 90%, 95%, 97%, 98%, or 99%) sequence identity to the nucleic acid sequence of SEQ ID NOs: 7 or 10. In some embodiments, the Rep comprises a nucleotide sequence having at least 75% sequence identity to the nucleic acid sequence of SEQ ID NOs: 7 or 10. In some embodiments, the Rep comprises a nucleotide sequence having at least 80% sequence identity to the nucleic acid sequence of SEQ ID NOs: 7 or 10. In some embodiments, the Rep comprises a nucleotide sequence having at least 90% sequence identity to the nucleic acid sequence of SEQ ID NOs: 7 or 10. In some embodiments, the Rep comprises a nucleotide sequence having at least 95% sequence identity to the nucleic acid sequence of SEQ ID NOs: 7 or 10. In some embodiments, the Rep comprises a nucleotide sequence having at least 97% sequence identity to the nucleic acid sequence of SEQ ID NOs: 7 or 10. In some embodiments, the Rep comprises a nucleotide sequence having at least 98% sequence identity to the nucleic acid sequence of SEQ ID NOs: 7 or 10. In some embodiments, the Rep comprises a nucleotide sequence having at least 99% sequence identity to the nucleic acid sequence of SEQ ID NOs: 7 or 10. In some embodiments, the Rep comprises a nucleotide sequence having the nucleic acid sequence of SEQ ID NOs: 7 or 10.

In some embodiments, the Cap comprises a nucleotide sequence having at least 70% (e.g., 75%, 80%, 90%, 95%, 97%, 98%, or 99%) sequence identity to the nucleic acid sequence of SEQ ID NOs: 8 or 11. In some embodiments, the Cap comprises a nucleotide sequence having at least 75% sequence identity to the nucleic acid sequence of SEQ ID NOs: 8 or 11. In some embodiments, the Cap comprises a nucleotide sequence having at least 80% sequence identity to the nucleic acid sequence of SEQ ID NOs: 8 or 11. In some embodiments, the Cap comprises a nucleotide sequence having at least 90% sequence identity to the nucleic acid sequence of SEQ ID NOs: 8 or 11. In some embodiments, the Cap comprises a nucleotide sequence having at least 95% sequence identity to the nucleic acid sequence of SEQ ID NOs: 8 or 11. In some embodiments, the Cap comprises a nucleotide sequence having at least 97% sequence identity to the nucleic acid sequence of SEQ ID NOs: 8 or 11. In some embodiments, the Cap comprises a nucleotide sequence having at least 98% sequence identity to the nucleic acid sequence of SEQ ID NOs: 8 or 11. In some embodiments, the Cap comprises a nucleotide sequence having at least 99% sequence identity to the nucleic acid sequence of SEQ ID NOs: 8 or 11. In some embodiments, the Cap comprises a nucleotide sequence having the nucleic acid sequence of SEQ ID NOs: 8 or 11.

In some embodiments, the lentiviral helper polynucleotides are selected from the group consisting of: Gag, Pol, Tat, Rev, Env, and VSV-G. In some embodiments, the lentiviral helper polynucleotide is Gag. In some embodiments, the lentiviral helper polynucleotide is Pol. In some embodiments, the lentiviral helper polynucleotide is Tat. In some embodiments, the lentiviral helper polynucleotide is Rev. In some embodiments, the lentiviral helper polynucleotide is Env. In some embodiments, the lentiviral helper polynucleotide is VSV-G.

In some embodiments, the helper polynucleotide comprises a backbone polynucleotide comprising reduced CpG dinucleotides as compared to a parental equivalent. In some embodiments, the backbone polynucleotide comprises increased methylation of CpG dinucleotides as compared to a parental equivalent. In some embodiments, the backbone polynucleotide comprises reduced CpG dinucleotides and increased methylation of CpG dinucleotides as compared to a parental equivalent.

In some embodiments, the backbone polynucleotide comprises an antibiotic resistance gene, an origin of replication, an open reading frame, or combinations thereof. In some embodiments, the backbone polynucleotide comprises an antibiotic resistance gene, an origin of replication, and an open reading frame.

In some embodiments, the backbone polynucleotide comprises an antibiotic resistance gene. In some embodiments, the antibiotic resistance gene encodes an aminoglycoside, a beta-lactam, a glycopeptide, a macrolide, a polypeptide, a tetracycline, or a derivative thereof. In some embodiments, the backbone polynucleotide comprises aminoglycoside or a derivative thereof. In some embodiments, the backbone polynucleotide comprises a beta-lactam or a derivative thereof. In some embodiments, the backbone polynucleotide comprises a glycopeptide or a derivative thereof. In some embodiments, the backbone polynucleotide comprises a macrolide or a derivative thereof. In some embodiments, the backbone polynucleotide comprises a polypeptide or a derivative thereof. In some embodiments, the backbone polynucleotide comprises a tetracycline or a derivative thereof.

In some embodiments, the antibiotic resistance gene encodes kanamycin, spectinomycin, streptomycin, ampicillin, carbenicillin, bleomycin, erythromycin, polymyxin B, tetracycline, chloramphenicol, neomycin, zeocin, or a derivative thereof. In some embodiments, the antibiotic resistance gene encodes kanamycin.

In some embodiments, the kanamycin comprises a nucleotide sequence having at least 70% (e.g., 75%, 80%, 90%, 95%, 97%, 98%, or 99%) sequence identity to the nucleic acid sequence of SEQ ID NOs: 9 or 12. In some embodiments, the kanamycin comprises a nucleotide sequence having at least 75% sequence identity to the nucleic acid sequence of SEQ ID NOs: 9 or 12. In some embodiments, the kanamycin comprises a nucleotide sequence having at least 80% sequence identity to the nucleic acid sequence of SEQ ID NOs: 9 or 12. In some embodiments, the kanamycin comprises a nucleotide sequence having at least 90% sequence identity to the nucleic acid sequence of SEQ ID NOs: 9 or 12. In some embodiments, the kanamycin comprises a nucleotide sequence having at least 95% sequence identity to the nucleic acid sequence of SEQ ID NOs: 9 or 12. In some embodiments, the kanamycin comprises a nucleotide sequence having at least 97% sequence identity to the nucleic acid sequence of SEQ ID NOs: 9 or 12. In some embodiments, the kanamycin comprises a nucleotide sequence having at least 98% sequence identity to the nucleic acid sequence of SEQ ID NOs: 9 or 12. In some embodiments, the kanamycin comprises a nucleotide sequence having at least 99% sequence identity to the nucleic acid sequence of SEQ ID NOs: 9 or 12. In some embodiments, the kanamycin comprises a nucleotide sequence having the nucleic acid sequence of SEQ ID NOs: 9 or 12.

In some embodiments, the backbone polynucleotide comprises an origin of replication. In some embodiments, the origin of replication is pMB1, pBR322, ColE1, R6K, p15A, pSC101, ColE2, F1, pUC, combinations or a derivative thereof. In some embodiments, the origin of replication is pMB1 or a derivative thereof. In some embodiments, the origin of replication is pBR322 or a derivative thereof. In some embodiments, the origin of replication is ColE1 or a derivative thereof. In some embodiments, the origin of replication is R6K or a derivative thereof. In some embodiments, the origin of replication is p15A or a derivative thereof. In some embodiments, the origin of replication is pSC101 or a derivative thereof. In some embodiments, the origin of replication is ColE2 or a derivative thereof. In some embodiments, the origin of replication is F1 or a derivative thereof. In some embodiments, the origin of replication is pUC or a derivative thereof.

In some embodiments, a helper polynucleotide of the disclosure comprises a woodchuck hepatitis virus post-transcriptional element or a derivative thereof.

Nucleic acids described herein, in some embodiments, comprise a reporter sequence for co-expression, such as but not limited to lacZ, GFP, CFP, YFP, RFP, mCherry, mCardinal, Firefly luciferase, *Renilla* luciferase, NanoLuc luciferase and tdTomato. In some embodiments, the vector comprises a selectable marker.

Described herein, in some embodiments, are helper polynucleotides, wherein the helper polynucleotide comprises two or more of a promoter, an enhancer, an intron, a microRNA, a linker, a splicing element, a polyA signal sequence. In some embodiments, are helper polynucleotides, wherein the helper polynucleotide comprises two or more of a promoter, an enhancer, an intron, a microRNA, a linker, a splicing element, a polyA signal, a viral life-cycle coding gene or fragment thereof, such as Rep, Cap, E1A, E1B, E4, E2A, ampicillin resistance gene, kanamycin resistance gene, VA, Gag, Pol, Tat, Rev, Env, and VSV-G.

Described herein, in some embodiments, are nucleic acids comprising a helper polynucleotide, wherein any two or more helper polynucleotides of the disclosure is provided in the same plasmid or in different plasmids (e.g., a packaging plasmid, a transfer plasmid, or a helper plasmid).

Recombinant Viral Vectors

Viral genomes provide a rich source of vectors that are used for the efficient delivery of exogenous polynucleotides into a cell. Examples of viral vectors are a parvovirus (e.g., AAV), retrovirus (e.g., Retroviridae family viral vector), adenovirus (e.g., Ad5, Ad26, Ad34, Ad35, and Ad48), coronavirus, negative strand RNA viruses such as orthomyxovirus (e.g., influenza virus), rhabdovirus (e.g., rabies and vesicular stomatitis virus), paramyxovirus (e.g. measles and Sendai), positive strand RNA viruses, such as picornavirus and alphavirus, and double stranded DNA viruses comprising adenovirus, herpesvirus (e.g., Herpes Simplex virus types 1 and 2, Epstein-Barr virus, cytomegalovirus), and poxvirus (e.g., vaccinia, modified vaccinia Ankara (MVA), fowlpox and canarypox). Other viruses comprise Norwalk virus, togavirus, flavivirus, reoviruses, papovavirus, hepadnavirus, human papilloma virus, human foamy virus, and hepatitis virus, for example. Examples of retroviruses are avian leukosis-sarcoma, avian C-type viruses, mammalian C-type, B-type viruses, D-type viruses, oncoretroviruses, HTLV-BLV group, lentivirus, alpharetrovirus, gammaretrovirus, spumavirus. Other examples are murine leukemia viruses, murine sarcoma viruses, murine mammary tumor virus, bovine leukemia virus, feline leukemia virus, feline sarcoma virus, avian leukemia virus, human T-cell leukemia virus, baboon endogenous virus, Gibbon ape leukemia virus, Pfizer monkey virus, simian immunodeficiency virus, simian sarcoma virus, Rous sarcoma virus and lentiviruses.

Various recombinant viral vectors are contemplated herein. In some embodiments, the recombinant viral vector is a recombinant herpesvirus is Herpes Simplex Virus (HSV), such as HSV type 1 (HSV-1), HSV-2, Varicella Zoster Virus (VZV), Epstein-Barr Virus (EBV), Cytomegalovirus (CMV), human herpes virus (HHV) 6 (HHV-6), HHV-7, or HHV-8. In some embodiments, the HSV is HSV-1. In some embodiments, the HSV is HSV-2. In some embodiments, the HSV is VZV. In some embodiments, the HSV is EBV. In some embodiments, the HSV is CMV. In some embodiments, the HSV is HHV-6. In some embodiments, the HSV is HHV-7. In some embodiments, the HSV is HHV-8.

In some embodiments, the recombinant viral vector is an AAV, such as AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16.

In some embodiments, a recombinant AAV is AAV1 or a derivative thereof. In some embodiments, a recombinant AAV is AAV2 or a derivative thereof. In some embodiments, a recombinant AAV is AAV3 or a derivative thereof. In some embodiments, a recombinant AAV is AAV4 or a derivative thereof. In some embodiments, a recombinant AAV is AAV5 or a derivative thereof. In some embodiments, a recombinant AAV is AAV6 or a derivative thereof. In some embodiments, a recombinant AAV is AAV7 or a derivative thereof. In some embodiments, a recombinant AAV is AAV8 or a derivative thereof. In some embodiments, a recombinant AAV is AAV9 or a derivative thereof. In some embodiments, a recombinant AAV is AAV10 or a derivative thereof. In some embodiments, a recombinant AAV is AAV11 or a derivative thereof. In some embodiments, a recombinant AAV is AAV12 or a derivative thereof. In some embodiments, a recombinant AAV is AAV13 or a derivative thereof. In some embodiments, a recombinant AAV is AAV14 or a derivative thereof. In some embodiments, a recombinant AAV is AAV15 or a derivative thereof. In some embodiments, a recombinant AAV is AAV16 or a derivative thereof. In some embodiments, a recombinant AAV is AAV-rh8 or a derivative thereof. In some embodiments, a recombinant AAV is AAV-rh10 or a derivative thereof. In some embodiments, a recombinant AAV is AAV-rh20 or a derivative thereof. In some embodiments, a recombinant AAV is AAV-rh39 or a derivative thereof. In some embodiments, a recombinant AAV is AAV-rh74 or a derivative thereof. In some embodiments, a recombinant AAV is AAV-rhM4-1 or a derivative thereof. In some embodiments, a recombinant AAV is AAV-hu37 or a derivative thereof. In some embodiments, a recombinant AAV is AAV-Anc80 or a derivative thereof. In some embodiments, a recombinant AAV is AAV-Anc80L65 or a derivative thereof. In some embodiments, a recombinant AAV is AAV-7m8 or a derivative thereof. In some embodiments, a recombinant AAV is AAV-PHP-B or a derivative thereof. In some embodiments, a recombinant AAV is AAV-PHP-EB or a derivative thereof. In some embodiments, a recombinant AAV is AAV-2.5 or a derivative thereof. In some embodiments, a recombinant AAV is AAV-2tYF or a derivative thereof. In some embodiments, a recombinant AAV is AAV-3B or a derivative thereof. In some embodiments, a recombinant AAV is AAV-LK03 or a derivative thereof. In some embodiments, a recombinant AAV is AAV-HSC1 or a derivative thereof. In some embodiments, a recombinant AAV is AAV-HSC2 or a derivative thereof. In some embodiments, a recombinant AAV is AAV-HSC3 or a derivative thereof. In some embodiments, a recombinant AAV is AAV-HSC4 or a derivative thereof. In some embodiments, a recombinant AAV is AAV-HSC5 or a derivative thereof. In some embodiments, a recombinant AAV is AAV-HSC6 or a derivative thereof. In some embodiments, a recombinant AAV is AAV-HSC7 or a derivative thereof. In some embodiments, a recombinant AAV is AAV-HSC8 or a derivative thereof. In some embodiments, a recombinant AAV is AAV-HSC9 or a derivative thereof. In some embodiments, a recombinant AAV is AAV-HSC10 or a derivative thereof. In some embodiments, a recombinant AAV is AAV-HSC11 or a derivative thereof. In some embodiments, a recombinant AAV is AAV-HSC12 or a derivative thereof. In some embodiments, a recombinant AAV is AAV-HSC13 or a derivative thereof. In some embodiments, a recombinant AAV is AAV-HSC14 or a derivative thereof. In some embodiments, a recombinant AAV is AAV-HSC15 or a derivative thereof. In some embodiments, a recombinant AAV is AAV-TT or a derivative thereof. In some embodiments, a recombinant AAV is AAV-DJ/8 or a derivative thereof. In some embodiments, a recombinant AAV is AAV-Myo or a derivative thereof. In some embodiments, a recombinant AAV is AAV-NP40 or a derivative thereof. In some embodiments, a recombinant AAV is AAV-NP59 or a derivative thereof. In some embodiments, a recombinant AAV is AAV-NP22 or a derivative thereof. In some embodiments, a recombinant AAV is AAV-NP66 or a derivative thereof. In some embodiments, a recombinant AAV is AAV-HSC16 or a derivative thereof.

Recombinant AAV Vectors

Recombinant adeno-associated viral vectors (rAAV) can be used for incorporation of genes in order to facilitate their introduction into a cell, such as a target cell. Described herein are recombinant AAV (rAAV) vectors comprising: a first nucleic acid comprising a payload of interest; and a second nucleic acid comprising a helper polynucleotide, wherein the second nucleic acid has a reduced number of CpG dinucleotides as compared to a parental equivalent. Further described herein, are recombinant AAV vectors comprising: a first nucleic acid comprising a payload of interest; and a second nucleic acid comprising a helper polynucleotide, wherein the second nucleic acid has increased methylation of CpG dinucleotides as compared to a parental equivalent.

In some embodiments, the first or the second nucleic acid is DNA. In some embodiments, the first or the second nucleic acid is RNA.

In some embodiments, the payload of interest is interferon beta (IFNβ). In some embodiments, the IFNβ comprises a nucleotide sequence having at least 70% (e.g., 75%, 80%, 90%, 95%, 97%, 98%, or 99%) sequence identity to the nucleic acid sequence of SEQ ID NOs: 13 or 14. In some embodiments, the IFNβ comprises a nucleotide sequence having at least 75% sequence identity to the nucleic acid sequence of SEQ ID NOs: 13 or 14. In some embodiments, the IFNβ comprises a nucleotide sequence having at least 80% sequence identity to the nucleic acid sequence of SEQ ID NOs: 13 or 14. In some embodiments, the IFNβ comprises a nucleotide sequence having at least 90% sequence identity to the nucleic acid sequence of SEQ ID NOs: 13 or 14. In some embodiments, the IFNβ comprises a nucleotide sequence having at least 95% sequence identity to the nucleic acid sequence of SEQ ID NOs: 13 or 14. In some embodiments, the IFNβ comprises a nucleotide sequence having at least 97% sequence identity to the nucleic acid sequence of SEQ ID NOs: 13 or 14. In some embodiments, the IFNβ comprises a nucleotide sequence having at least 98% sequence identity to the nucleic acid sequence of SEQ ID NOs: 13 or 14. In some embodiments, the IFNβ comprises a nucleotide sequence having at least 99% sequence identity to the nucleic acid sequence of SEQ ID NOs: 13 or 14. In some embodiments, the IFNβ comprises a nucleotide sequence having the nucleic acid sequence of SEQ ID NOs: 13 or 14.

In some embodiments, the payload of interest is IFNα, IFNβ, IFNγ, or combinations thereof. In some embodiments, the payload of interest is IFNα, IFNβ, IFNγ, IFNα—IFNβ, IFNα-IFNγ, IFNβ-IFNγ, and IFNα—IFNβ-IFNγ. In some embodiments, the payload of interest is IFNα, IFNβ, IFNγ, IFNα—IFNβ, IFNα-IFNγ, IFNβ-IFNγ, and IFNα—IFNβ-IFNγ and the IFN is murine. In some embodiments, the payload of interest is IFNα, IFNβ, IFNγ, IFNα—IFNβ, IFNα-IFNγ, IFNβ-IFNγ, and IFNα—IFNβ-IFNγ and the IFN is human. In some embodiments, the payload of interest is a combination of human or murine IFNα, IFNβ, IFNγ, IFNα—IFNβ, IFNα-IFNγ, IFNβ-IFNγ, and IFNα—IFNβ-IFNγ. In some embodiments, the payload of interest is human IFNα, human IFNβ, human IFNγ, or combinations thereof. In some embodiments, the payload of interest is murine IFNα, murine IFNβ, murine IFNγ, or combinations thereof. In some embodiments, the payload of interest is human IFNα, human IFNβ, human IFNγ, murine IFNα, murine IFNβ, murine IFNγ, or combinations thereof.

In some embodiments, the rAAV comprises a backbone with a reduced number of CpG dinucleotides, an increased number of methylated CpG dinucleotides, or both. In some embodiments, the nucleic acids comprise those sequences of AAV that are required in cis for replication and packaging (e.g., functional ITRs) of the DNA into a virion. In some embodiments, the rAAV vectors contain marker or reporter genes.

Useful rAAV vectors comprise those having one or more of the naturally-occurring AAV genes deleted in whole or in part, but retain functional flanking ITR sequences. In some embodiments, the AAV ITRs are of any serotype suitable for a particular application. In some embodiments, the nucleic acid does not comprise ITRs. In some embodiments, are any suitable AAV serotype, comprising any now known or later discovered serotypes or any engineered, evolved, selected, or chimeric capsid serotype.

The capsid proteins of AAV compose the exterior, non-nucleic acid portion of the virion and are encoded by the AAV Cap gene. In some embodiments, the Cap gene encodes VP1, VP2, VP3, MAAP, AP, or combinations thereof.

In some embodiments, the helper polynucleotide comprises Rep, Cap, or helper functions required for producing the rAAV of the disclosure. In some embodiments, the Rep, Cap, or helper polynucleotides are delivered to the packaging host cell using any appropriate genetic element (e.g., vector). In some embodiments, a single nucleic acid encoding all three capsid proteins (e.g., VP1, VP2 and VP3) is delivered into the packaging host cell in a single vector. In some embodiments, nucleic acids encoding the capsid proteins are delivered into the packaging host cell by two vectors; a first vector comprising a first nucleic acid encoding two capsid proteins (e.g., VP1 and VP2) and a second vector comprising a second nucleic acid encoding a single capsid protein (e.g., VP3). In some embodiments, three vectors, each comprising a nucleic acid encoding a different capsid protein, are delivered to the packaging host cell.

In some embodiments, a single nucleic acid encoding multiple replication proteins (e.g., Rep78, Rep68, Rep52, and Rep40) is delivered into the packaging host cell in a single vector. In some embodiments, nucleic acids encoding the replication proteins are delivered into the packaging host cell by two vectors; a first vector comprising a first nucleic acid encoding one to three replication proteins and a second vector comprising a second nucleic acid encoding one to three replication proteins. In some embodiments, four vectors, each comprising a nucleic acid encoding a different replication protein, are delivered to the packaging host cell.

In some embodiments, a single nucleic acid encoding multiple adenovirus helper proteins (e.g., E1A, E1B, E4, E2A, and VA RNA) is delivered into the packaging host cell in a single vector. In some embodiments, nucleic acids encoding the adenovirus helper proteins are delivered into the packaging host cell by two vectors. In some embodiments, more than two vectors, each comprising a nucleic acid encoding a different capsid protein, are delivered to the packaging host cell. The selected genetic elements are delivered by any suitable method, comprising those described herein. The methods used to construct any embodiment of this disclosure comprise genetic engineering, recombinant engineering, and synthetic techniques.

In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16.

In some embodiments, a recombinant AAV is AAV1 or a derivative thereof. In some embodiments, a recombinant AAV is AAV2 or a derivative thereof. In some embodiments, a recombinant AAV is AAV3 or a derivative thereof. In some embodiments, a recombinant AAV is AAV4 or a derivative thereof. In some embodiments, a recombinant AAV is AAV5 or a derivative thereof. In some embodiments, a recombinant AAV is AAV6 or a derivative thereof. In some embodiments, a recombinant AAV is AAV7 or a derivative thereof. In some embodiments, a recombinant AAV is AAV8 or a derivative thereof. In some embodiments, a recombinant AAV is AAV9 or a derivative thereof. In some embodiments, a recombinant AAV is AAV10 or a derivative thereof. In some embodiments, a recombinant AAV is AAV11 or a derivative thereof. In some embodiments, a recombinant AAV is AAV12 or a derivative thereof. In some embodiments, a recombinant AAV is AAV13 or a derivative thereof. In some embodiments, a recombinant AAV is AAV14 or a derivative thereof. In some embodiments, a recombinant AAV is AAV15 or a derivative thereof. In some embodiments, a recombinant AAV is AAV16 or a derivative thereof. In some embodiments, a recombinant AAV is AAV-rh8 or a derivative thereof. In some embodiments, a recombinant AAV is AAV-rh10 or a derivative thereof. In some embodiments, a recombinant AAV is AAV-rh20 or a derivative thereof. In some embodiments, a recombinant AAV is AAV-rh39 or a derivative thereof. In some embodiments, a recombinant AAV is AAV-rh74 or a derivative thereof. In some embodiments, a recombinant AAV is AAV-rhM4-1 or a derivative thereof. In some embodiments, a recombinant AAV is AAV-hu37 or a derivative thereof. In some embodiments, a recombinant AAV is AAV-Anc80 or a derivative thereof. In some embodiments, a recombinant AAV is AAV-Anc80L65 or a derivative thereof. In some embodiments, a recombinant AAV is AAV-7m8 or a derivative thereof. In some embodiments, a recombinant AAV is AAV-PHP-B or a derivative thereof. In some embodiments, a recombinant AAV is AAV-PHP-EB or a derivative thereof. In some embodiments, a recombinant AAV is AAV-2.5 or a derivative thereof. In some embodiments, a recombinant AAV is AAV-2tYF or a derivative thereof. In some embodiments, a recombinant AAV is AAV-3B or a derivative thereof. In some embodiments, a recombinant AAV is AAV-LK03 or a derivative thereof. In some embodiments, a recombinant AAV is AAV-HSC1 or a derivative thereof. In some embodiments, a recombinant AAV is AAV-HSC2 or a derivative thereof. In some embodiments, a recombinant AAV is AAV-HSC3 or a derivative thereof. In some embodiments, a recombinant AAV is AAV-HSC4 or a derivative thereof. In some embodiments, a recombinant AAV is AAV-HSC5 or a derivative thereof. In some embodiments, a recombinant AAV is AAV-HSC6 or a derivative thereof. In some embodiments, a recombinant AAV is AAV-HSC7 or a derivative thereof. In some embodiments, a recombinant AAV is AAV-HSC8 or a derivative thereof. In some embodiments, a recombinant AAV is AAV-HSC9 or a derivative thereof. In some embodiments, a recombinant AAV is AAV-HSC10 or a derivative thereof. In some embodiments, a recombinant AAV is AAV-HSC11 or a derivative thereof. In some embodiments, a recombinant AAV is AAV-HSC12 or a derivative thereof. In some embodiments, a recombinant AAV is AAV-HSC13 or a derivative thereof. In some embodiments, a recombinant AAV is AAV-HSC14 or a derivative thereof. In some embodiments, a recombinant AAV is AAV-HSC15 or a derivative thereof. In some embodiments, a recombinant AAV is AAV-TT or a derivative thereof. In some embodiments, a recombinant AAV is AAV-DJ/8 or a derivative thereof. In some embodiments, a recombinant AAV is AAV-Myo or a derivative thereof. In some embodiments, a recombinant AAV is AAV-NP40 or a derivative thereof. In some embodiments, a recombinant AAV is AAV-NP59 or a derivative thereof. In some embodiments, a recombinant AAV is AAV-NP22 or a derivative thereof. In some embodiments, a recombinant AAV is AAV-NP66 or a derivative thereof. In some embodiments, a recombinant AAV is AAV-HSC16 or a derivative thereof.

In some embodiments, the rAAV vector is a pseudotyped rAAV vector. Pseudotyped vectors comprise AAV vectors of a given serotype pseudotyped with a Cap gene derived from a serotype other than the given serotype (e.g., AAV1, AAV3, AAV4, AAV5, AAV6, AAV7, AAV8, or AAV9, among others). For example, a representative pseudotyped vector is an AAV2 vector pseudotyped with a Cap gene derived from AAV serotype 8 or AAV serotype 9.

In some embodiments, the AAV have mutations within the virion capsid that are used to transduce particular cell types more effectively than non-mutated capsid virions. In some embodiments, suitable AAV mutants have ligand insertion mutations for the facilitation of targeting AAV to specific cell types. In some embodiments, the construction and characterization of AAV capsid mutants comprising insertion mutants, alanine screening mutants, and epitope tag mutants are used.

In some embodiments, artificial AAV capsids are used. Such an artificial capsid are generated by any suitable technique using a selected AAV sequence (e.g., a fragment of a VP1 capsid protein) in combination with heterologous sequences which are obtained from a different selected AAV serotype, non-contiguous portions of the same AAV serotype, from a non-AAV viral source, or from a non-viral source. An artificial AAV serotype are, without limitation, a pseudotyped AAV, a chimeric AAV capsid, a recombinant AAV capsid, or a "humanized" AAV capsid.

Other rAAV virions that are used in compositions and methods of the disclosure include, but are not limited to, those capsid hybrids that are generated by molecular breeding of viruses as well as by exon shuffling or generated through use of artificial intelligence or machine learning.

In some embodiments, the capsid is modified to improve therapy. In some embodiments, the capsid is modified for minimized immunogenicity, better stability and particle durability, efficient degradation, and/or accurate delivery of the heterologous coding sequence or a functional fragment or variant thereof to the nucleus. In some embodiments, the modification or mutation is an amino acid deletion, insertion, substitution, or any combination thereof in a capsid polypeptide. In some embodiments, the capsid polypeptide comprises 1, 2, 3, 4, 5, up to 10, or more amino acid substitutions and/or deletions and/or insertions. In some embodiments, one or more amino acid substitutions are introduced into one or more of VP1, VP2 and VP3. In one embodiment, a modified capsid polypeptide comprises 1, 2, 3, 4, 5, 6, 7, 8, 9, 10, 11, 12, 13, 14, or 15 conservative or non-conservative substitutions relative to the wild-type polypeptide.

In another embodiment, the modified capsid polypeptide of the disclosure comprises modified sequences, wherein such modifications can comprise both conservative and non-conservative substitutions, deletions, and/or additions, and typically comprise peptides that share at least 60%, at least 65%, at least 70%, at least 75%, at least 80%, at least 85%, at least 87%, at least 89%, at least 90%, at least 91%, at least 92%, at least 93%, at least 94%, at least 95%, at least 96%, at least 97%, at least 98%, or at least 99% sequence identity to the corresponding wild-type capsid protein.

In some embodiments, the helper polynucleotides comprise reduced CpG dinucleotides as compared to a parental equivalent. In some embodiments, the CpG dinucleotides are reduced by at least about 5%, 10%, 15%, 20%, 25%, 30%, 35%, 40%, 45%, 50%, 55%, 60%, 65%, 70%, 75%, 80%, 85%, 90%, 95%, or more than 95% as compared to a parental equivalent. In some embodiments, the CpG dinucleotides are reduced in a range of about 5% to about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 10% to about 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 15% to about 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 20% to about 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 25% to about 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 30% to about 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 40% to about 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 50% to about 55%, 60%, 65%, 70%, 75%, 80%, 85%, 90%, 95%, 96%, 97%, 98%, 99%, or 100%. In some embodiments, the CpG dinucleotides are reduced in a range of about 60% to about 65%, 70%, 75%, 80%, 85%, 90%, 95%, 96%, 97%, 98%, 99%, or 100%. In some embodiments, the CpG dinucleotides are reduced in a range of about 70% to about 75%, 80%, 85%, 90%, 95%, 96%, 97%, 98%, 99%, or 100%. In some embodiments, the CpG dinucleotides are reduced in a range of about 80% to about 85%, 90%, 95%, 96%, 97%, 98%, 99%, or 100%. In some embodiments, the CpG dinucleotides are reduced in a range of about 90% to about 95%, 96%, 97%, 98%, 99%, or 100%. In some embodiments, the CpG dinucleotides are reduced by at least about 50%. In some embodiments, the CpG dinucleotides are reduced by at least about 75%.

In some embodiments, the helper polynucleotides comprise increased methylation of CpG dinucleotides as compared to a parental equivalent. In some embodiments, the methylation of CpG dinucleotides is increased by at least about 5%, 10%, 15%, 20%, 25%, 30%, 35%, 40%, 45%, 50%, 55%, 60%, 65%, 70%, 75%, 80%, 85%, 90%, 95%, or more than 95% as compared to a parental equivalent. In some embodiments, the number of CpG dinucleotides is increased in a range of about 5% to about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 10% to about 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 15% to about 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 20% to about 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 25% to about 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 30% to about 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 40% to about 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 50% to about 55%, 60%, 65%, 70%, 75%, 80%, 85%, 90%, 95%, 96%, 97%, 98%, 99%, or 100%. In some embodiments, the number of CpG dinucleotides is increased in a range of about 60% to about 65%, 70%, 75%, 80%, 85%, 90%, 95%, 96%, 97%, 98%, 99%, or 100%. In some embodiments, the number of CpG dinucleotides is increased in a range of about 70% to about 75%, 80%, 85%, 90%, 95%, 96%, 97%, 98%, 99%, or 100%. In some embodiments, the number of CpG dinucleotides is increased in a range of about 80% to about 85%, 90%, 95%, 96%, 97%, 98%, 99%, or 100%. In some embodiments, the number of CpG dinucleotides is increased in a range of about 90% to about 95%, 96%, 97%, 98%, 99%, or 100%.

In some embodiments, the helper polynucleotide comprises a promoter, an enhancer, an intron, a microRNA, a linker, a splicing element, a polyA signal sequence, or combinations thereof. In some embodiments, the helper polynucleotide comprises a promoter. In some embodiments, the helper polynucleotide comprises an enhancer. In some embodiments, the helper polynucleotide comprises an intron. In some embodiments, the helper polynucleotide comprises a microRNA. In some embodiments, the helper polynucleotide comprises a linker. In some embodiments, the helper polynucleotide comprises a splicing element. In some embodiments, the helper polynucleotide comprises a polyA signal sequence.

In some embodiments, the helper polynucleotide comprises a promoter. In some embodiments, the promoter is selected from the group consisting of CMV, CBA, EF1a, CAG, PGK, TRE, U6, UAS, T7, Sp6, lac, araBad, trp, Ptac, p5, p19, p40, Synapsin, CaMKII, GRK1, a mini promoter, an inducible promoter, and derivatives thereof. In some embodiments, the promoter is the CMV promoter or a derivative thereof. In some embodiments, the promoter is the CBA promoter or a derivative thereof. In some embodiments, the promoter is the EF1a promoter or a derivative thereof. In some embodiments, the promoter is the CAG promoter or a derivative thereof. In some embodiments, the promoter is the PGK promoter or a derivative thereof. In some embodiments, the promoter is the TRE promoter or a derivative thereof. In some embodiments, the promoter is the U6 promoter or a derivative thereof. In some embodiments, the promoter is the UAS promoter or a derivative thereof. In some embodiments, the promoter is the T7 promoter or a derivative thereof. In some embodiments, the promoter is the Sp6 promoter or a derivative thereof. In some embodiments, the promoter is the lac promoter or a derivative thereof. In some embodiments, the promoter is the araBad promoter or a derivative thereof. In some embodiments, the promoter is the trp promoter or a derivative thereof. In some embodiments, the promoter is the Ptac promoter or a derivative thereof. In some embodiments, the promoter is the p5 promoter or a derivative thereof. In some embodiments, the promoter is the p19 promoter or a derivative thereof. In some embodiments, the promoter is the p40 promoter or a derivative thereof. In some embodiments, the promoter is the Synapsin promoter or a derivative thereof. In some embodiments, the promoter is the CaMKII promoter or a derivative thereof. In some embodiments, the promoter is the GRK1 promoter or a derivative thereof. In some embodiments, the promoter is a mini promoter or a derivative thereof. In some embodiments, the promoter is an inducible promoter or a derivative thereof.

In some embodiments, the helper polynucleotide comprises a prokaryotic helper polynucleotide. In some embodiments, the helper polynucleotide comprises a eukaryotic helper polynucleotide. In some embodiments, the helper polynucleotide is comprised of a eukaryotic helper polynucleotide and prokaryotic helper polynucleotide.

In some embodiments, the helper polynucleotide comprises one or more components derived from a yeast (e.g., an autonomous replication sequence, centromere, or telomere). In some embodiments, the helper polynucleotide comprises one or more components derived from a plant (e.g., virA, virB, virD, virG, or virE).

In some embodiments, the helper polynucleotide comprises one or more components derived from a yeast (e.g., an autonomous replication sequence, centromere, or telomere). In some embodiments, the helper polynucleotide comprises one or more components derived from a plant (e.g., virA, virB, virD, virG, or virE).

In some embodiments, the helper polynucleotide comprises one or more components (e.g., promoter, Rep, Cap) derived from a virus. In some embodiments, the virus is an alphavirus, a parvovirus, an adenovirus, an AAV, a baculovirus, a Dengue virus, a lentivirus, a herpesvirus, a poxvirus, an anellovirus, a bocavirus, a vaccinia virus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV type 1, HSV-2, VZV, EBV, CMV, HHV-6, HHV-7, or HHV-8. In some embodiments, the virus is an alphavirus. In some embodiments, the virus is a parvovirus. In some embodiments, the virus is an adenovirus. In some embodiments, the virus is an AAV. In some embodiments, the virus is a baculovirus. In some embodiments, the virus is a Dengue virus. In some embodiments, the virus is a lentivirus. In some embodiments, the virus is a herpesvirus. In some embodiments, the virus is a poxvirus. In some embodiments, the virus is an anellovirus. In some embodiments, the virus is a bocavirus. In some embodiments, the virus is a vaccinia virus. In some embodiments, the virus is a retrovirus.

In some embodiments, the virus is AAV1 or a derivative thereof. In some embodiments, the virus is AAV2 or a derivative thereof. In some embodiments, the virus is AAV3 or a derivative thereof. In some embodiments, the virus is AAV4 or a derivative thereof. In some embodiments, the virus is AAV5 or a derivative thereof. In some embodiments, the virus is AAV6 or a derivative thereof. In some embodiments, the virus is AAV7 or a derivative thereof. In some embodiments, the virus is AAV8 or a derivative thereof. In some embodiments, the virus is AAV9 or a derivative thereof. In some embodiments, the virus is AAV10 or a derivative thereof. In some embodiments, the virus is AAV11 or a derivative thereof. In some embodiments, the virus is AAV12 or a derivative thereof. In some embodiments, the virus is AAV13 or a derivative thereof. In some embodiments, the virus is AAV14 or a derivative thereof. In some embodiments, the virus is AAV15 or a derivative thereof. In some embodiments, the virus is AAV16 or a derivative thereof. In some embodiments, the virus is AAV-rh8 or a derivative thereof. In some embodiments, the virus is AAV-rh10 or a derivative thereof. In some embodiments, the virus is AAV-rh20 or a derivative thereof. In some embodiments, the virus is AAV-rh39 or a derivative thereof. In some embodiments, the virus is AAV-rh74 or a derivative thereof. In some embodiments, the virus is AAV-rhM4-1 or a derivative thereof. In some embodiments, the virus is AAV-hu37 or a derivative thereof. In some embodiments, the virus is AAV-Anc80 or a derivative thereof. In some embodiments, the virus is AAV-Anc80L65 or a derivative thereof. In some embodiments, the virus is AAV-7m8 or a derivative thereof. In some embodiments, the virus is AAV-PHP-B or a derivative thereof. In some embodiments, the virus is AAV-PHP-EB or a derivative thereof. In some embodiments, the virus is AAV-2.5 or a derivative thereof. In some embodiments, the virus is AAV-2tYF or a derivative thereof. In some embodiments, the virus is AAV-3B or a derivative thereof. In some embodiments, the virus is AAV-LK03 or a derivative thereof. In some embodiments, the virus is AAV-HSC1 or a derivative thereof. In some embodiments, the virus is AAV-HSC2 or a derivative thereof. In some embodiments, the virus is AAV-HSC3 or a derivative thereof. In some embodiments, the virus is AAV-HSC4 or a derivative thereof. In some embodiments, the virus is AAV-HSC5 or a derivative thereof. In some embodiments, the virus is AAV-HSC6 or a derivative thereof. In some embodiments, the virus is AAV-HSC7 or a derivative thereof. In some embodiments, the virus is AAV-HSC8 or a derivative thereof. In some embodiments, the virus is AAV-HSC9 or a derivative thereof. In some embodiments, the virus is AAV-HSC10 or a derivative thereof. In some embodiments, the virus is AAV-HSC11 or a derivative thereof. In some embodiments, the virus is AAV-HSC12 or a derivative thereof. In some embodiments, the virus is AAV-HSC13 or a derivative thereof. In some embodiments, the virus is AAV-HSC14 or a derivative thereof. In some embodiments, the virus is AAV-HSC15 or a derivative thereof. In some embodiments, the virus is AAV-TT or a derivative thereof. In some embodiments, the virus is AAV-DJ/8 or a derivative thereof. In some embodiments, the virus is AAV-Myo or a derivative thereof. In some embodiments, the virus is AAV-NP40 or a derivative thereof. In some embodiments, the virus is AAV-NP59 or a derivative thereof. In some embodiments, the virus is AAV-NP22 or a derivative thereof. In some embodiments, the virus is AAV-NP66 or a derivative thereof. In some embodiments, the virus is AAV-HSC16 or a derivative thereof.

In some embodiments, the virus is HSV-1 or a derivative thereof. In some embodiments, the virus is HSV-2 or a derivative thereof. In some embodiments, the virus is VZV or a derivative thereof. In some embodiments, the virus is EBV or a derivative thereof. In some embodiments, the virus is CMV or a derivative thereof. In some embodiments, the virus is HHV-6 or a derivative thereof. In some embodiments, the virus is HHV-7 or a derivative thereof. In some embodiments, the virus is HHV-8 or a derivative thereof.

In some embodiments, the adenovirus or AAV helper polynucleotide is selected from the group consisting of: Rep, Cap, E1A, E1B, E4, E2A, and VA RNA. In some embodiments, the adenovirus or AAV helper polynucleotide is Rep. In some embodiments, the adenovirus or AAV helper polynucleotide is Cap. In some embodiments, the adenovirus or AAV helper polynucleotide is E1A. In some embodiments, the adenovirus or AAV helper polynucleotide is E1B. In some embodiments, the adenovirus or AAV helper polynucleotide is E4. In some embodiments, the adenovirus or AAV helper polynucleotide is E2A. In some embodiments, the adenovirus or AAV helper polynucleotide is VA RNA.

In some embodiments, the Rep is derived from AAV1 or a derivative thereof. In some embodiments, the Rep is derived from AAV2 or a derivative thereof. In some embodiments, the Rep is derived from AAV3 or a derivative thereof. In some embodiments, the Rep is derived from AAV4 or a derivative thereof. In some embodiments, the Rep is derived from AAV5 or a derivative thereof. In some embodiments, the Rep is derived from AAV6 or a derivative thereof. In some embodiments, the Rep is derived from AAV7 or a derivative thereof. In some embodiments, the Rep is derived from AAV8 or a derivative thereof. In some embodiments, the Rep is derived from AAV9 or a derivative thereof. In some embodiments, the Rep is derived from AAV10 or a derivative thereof. In some embodiments, the Rep is derived from AAV11 or a derivative thereof. In some embodiments, the Rep is derived from AAV12 or a derivative thereof. In some embodiments, the Rep is derived from AAV13 or a derivative thereof. In some embodiments, the Rep is derived from AAV14 or a derivative thereof. In some embodiments, the Rep is derived from AAV15 or a derivative thereof. In some embodiments, the Rep is derived from AAV16 or a derivative thereof. In some embodiments, the Rep is derived from AAV-rh8 or a derivative thereof. In some embodiments, the Rep is derived from AAV-rh10 or a derivative thereof. In some embodiments, the Rep is derived from AAV-rh20 or a derivative thereof. In some embodiments, the Rep is derived from AAV-rh39 or a derivative thereof. In some embodiments, the Rep is derived from AAV-rh74 or a derivative thereof. In some embodiments, the Rep is derived from AAV-rhM4-1 or a derivative thereof. In some embodiments, the Rep is derived from AAV-hu37 or a derivative thereof. In some embodiments, the Rep is derived from AAV-Anc80 or a derivative thereof. In some embodiments, the Rep is derived from AAV-Anc80L65 or a derivative thereof. In some embodiments, the Rep is derived from AAV-7m8 or a derivative thereof. In some embodiments, the Rep is derived from AAV-PHP-B or a derivative thereof. In some embodiments, the Rep is derived from AAV-PHP-EB or a derivative thereof. In some embodiments, the Rep is derived from AAV-2.5 or a derivative thereof. In some embodiments, the Rep is derived from AAV-2tYF or a derivative thereof. In some embodiments, the Rep is derived from AAV-3B or a derivative thereof. In some embodiments, the Rep is derived from AAV-LK03 or a derivative thereof. In some embodiments, the Rep is derived from AAV-HSC1 or a derivative thereof. In some embodiments, the Rep is derived from AAV-HSC2 or a derivative thereof. In some embodiments, the Rep is derived from AAV-HSC3 or a derivative thereof. In some embodiments, the Rep is derived from AAV-HSC4 or a derivative thereof. In some embodiments, the Rep is derived from AAV-HSC5 or a derivative thereof. In some embodiments, the Rep is derived from AAV-HSC6 or a derivative thereof. In some embodiments, the Rep is derived from AAV-HSC7 or a derivative thereof. In some embodiments, the Rep is derived from AAV-HSC8 or a derivative thereof. In some embodiments, the Rep is derived from AAV-HSC9 or a derivative thereof. In some embodiments, the Rep is derived from AAV-HSC10 or a derivative thereof. In some embodiments, the Rep is derived from AAV-HSC11 or a derivative thereof. In some embodiments, the Rep is derived from AAV-HSC12 or a derivative thereof. In some embodiments, the Rep is derived from AAV-HSC13 or a derivative thereof. In some embodiments, the Rep is derived from AAV-HSC14 or a derivative thereof. In some embodiments, the Rep is derived from AAV-HSC15 or a derivative thereof. In some embodiments, the Rep is derived from AAV-TT or a derivative thereof. In some embodiments, the Rep is derived from AAV-DJ/8 or a derivative thereof. In some embodiments, the Rep is derived from AAV-Myo or a derivative thereof. In some embodiments, the Rep is derived from AAV-NP40 or a derivative thereof. In some embodiments, the Rep is derived from AAV-NP59 or a derivative thereof. In some embodiments, the Rep is derived from AAV-NP22 or a derivative thereof. In some embodiments, the Rep is derived from AAV-NP66 or a derivative thereof. In some embodiments, the Rep is derived from AAV-HSC16 or a derivative thereof.

In some embodiments, the Rep comprises a nucleotide sequence having at least 70% (e.g., 75%, 80%, 90%, 95%, 97%, 98%, or 99%) sequence identity to the nucleic acid sequence of SEQ ID NOs: 7 or 10. In some embodiments, the Rep comprises a nucleotide sequence having at least 75% sequence identity to the nucleic acid sequence of SEQ ID NOs: 7 or 10. In some embodiments, the Rep comprises a nucleotide sequence having at least 80% sequence identity to the nucleic acid sequence of SEQ ID NOs: 7 or 10. In some embodiments, the Rep comprises a nucleotide sequence having at least 90% sequence identity to the nucleic acid sequence of SEQ ID NOs: 7 or 10. In some embodiments, the Rep comprises a nucleotide sequence having at least 95% sequence identity to the nucleic acid sequence of SEQ ID NOs: 7 or 10. In some embodiments, the Rep comprises a nucleotide sequence having at least 97% sequence identity to the nucleic acid sequence of SEQ ID NOs: 7 or 10. In some embodiments, the Rep comprises a nucleotide sequence having at least 98% sequence identity to the nucleic acid sequence of SEQ ID NOs: 7 or 10. In some embodiments, the Rep comprises a nucleotide sequence having at least 99% sequence identity to the nucleic acid sequence of SEQ ID NOs: 7 or 10. In some embodiments, the Rep comprises a nucleotide sequence having the nucleic acid sequence of SEQ ID NOs: 7 or 10.

In some embodiments, the Cap comprises a nucleotide sequence having at least 70% (e.g., 75%, 80%, 90%, 95%, 97%, 98%, or 99%) sequence identity to the nucleic acid sequence of SEQ ID NOs: 8 or 11. In some embodiments, the Cap comprises a nucleotide sequence having at least 70% sequence identity to the nucleic acid sequence of SEQ ID NOs: 8 or 11. In some embodiments, the Cap comprises a nucleotide sequence having at least 80% sequence identity to the nucleic acid sequence of SEQ ID NOs: 8 or 11. In some embodiments, the Cap comprises a nucleotide sequence having at least 90% sequence identity to the nucleic acid sequence of SEQ ID NOs: 8 or 11. In some embodiments, the Cap comprises a nucleotide sequence having at least 95% sequence identity to the nucleic acid sequence of SEQ ID NOs: 8 or 11. In some embodiments, the Cap comprises a nucleotide sequence having at least 97% sequence identity to the nucleic acid sequence of SEQ ID NOs: 8 or 11. In some embodiments, the Cap comprises a nucleotide sequence having at least 98% sequence identity to the nucleic acid sequence of SEQ ID NOs: 8 or 11. In some embodiments, the Cap comprises a nucleotide sequence having at least 99% sequence identity to the nucleic acid sequence of SEQ ID NOs: 8 or 11. In some embodiments, the Cap comprises a nucleotide sequence having the nucleic acid sequence of SEQ ID NOs: 8 or 11.

In some embodiments, the lentiviral helper polynucleotide is selected from the group consisting of: Gag, Pol, Tat, Rev, Env, and VSV-G. In some embodiments, the lentiviral helper polynucleotide is Gag. In some embodiments, the lentiviral helper polynucleotide is Pol. In some embodiments, the lentiviral helper polynucleotide is Tat. In some embodiments, the lentiviral helper polynucleotide is Rev. In some embodiments, the lentiviral helper polynucleotide is Env. In some embodiments, the lentiviral helper polynucleotide is VSV-G.

In some embodiments, the helper polynucleotide comprises a backbone polynucleotide comprising reduced CpG dinucleotides as compared to a parental equivalent. Further described herein are recombinant AAV vectors comprising a helper polynucleotide, wherein the helper polynucleotide comprises a backbone polynucleotide comprising increased methylation of CpG dinucleotides as compared to a parental equivalent. Further described herein are recombinant AAV vectors comprising a helper polynucleotide, wherein the helper polynucleotide comprises a backbone polynucleotide comprising reduced CpG dinucleotides and increased methylation of CpG dinucleotides as compared to a parental equivalent.

In some embodiments, the backbone polynucleotide comprises an antibiotic resistance gene, an origin of replication, an open reading frame, or combinations thereof. In some embodiments, the backbone polynucleotide comprises an antibiotic resistance gene, an origin of replication, and an open reading frame.

In some embodiments, the backbone polynucleotide comprises an antibiotic resistance gene. In some embodiments, the antibiotic resistance gene encodes an aminoglycoside, a beta-lactam, a glycopeptide, a macrolide, a polypeptide, a tetracycline, or a derivative thereof. In some embodiments, the antibiotic resistance gene encodes an aminoglycoside or a derivative thereof. In some embodiments, the antibiotic resistance gene encodes a beta-lactam or a derivative thereof. In some embodiments, the antibiotic resistance gene encodes a glycopeptide or a derivative thereof. In some embodiments, the antibiotic resistance gene encodes a macrolide or a derivative thereof. In some embodiments, the antibiotic resistance gene encodes a polypeptide or a derivative thereof. In some embodiments, the antibiotic resistance gene encodes a tetracycline or a derivative thereof. In some embodiments, the antibiotic resistance gene encodes kanamycin, spectinomycin, streptomycin, ampicillin, carbenicillin, bleomycin, erythromycin, polymyxin B, tetracycline, chloramphenicol, neomycin, zeocin, or a derivative thereof. In some embodiments, the antibiotic resistance gene encodes kanamycin or a derivative thereof.

In some embodiments, the kanamycin comprises a nucleotide sequence having at least 70% (e.g., 75%, 80%, 90%, 95%, 97%, 98%, or 99%) sequence identity to the nucleic acid sequence of SEQ ID NOs: 9 or 12. In some embodiments, the kanamycin comprises a nucleotide sequence having at least 75% sequence identity to the nucleic acid sequence of SEQ ID NOs: 9 or 12. In some embodiments, the kanamycin comprises a nucleotide sequence having at least 80% sequence identity to the nucleic acid sequence of SEQ ID NOs: 9 or 12. In some embodiments, the kanamycin comprises a nucleotide sequence having at least 90% sequence identity to the nucleic acid sequence of SEQ ID NOs: 9 or 12. In some embodiments, the kanamycin comprises a nucleotide sequence having at least 95% sequence identity to the nucleic acid sequence of SEQ ID NOs: 9 or 12. In some embodiments, the kanamycin comprises a nucleotide sequence having at least 97% sequence identity to the nucleic acid sequence of SEQ ID NOs: 9 or 12. In some embodiments, the kanamycin comprises a nucleotide sequence having at least 98% sequence identity to the nucleic acid sequence of SEQ ID NOs: 9 or 12. In some embodiments, the kanamycin comprises a nucleotide sequence having at least 99% sequence identity to the nucleic acid sequence of SEQ ID NOs: 9 or 12. In some embodiments, the kanamycin comprises a nucleotide sequence having the nucleic acid sequence of SEQ ID NOs: 9 or 12.

In some embodiments, the backbone polynucleotide comprises an origin of replication. In some embodiments, the origin of replication is pMB1, pBR322, ColE1, R6K, p15A, pSC101, ColE2, F1, pUC, combinations or a derivative thereof. In some embodiments, the origin of replication is pMB1 or a derivative thereof. In some embodiments, the origin of replication is pBR322 or a derivative thereof. In some embodiments, the origin of replication is ColE1 or a derivative thereof. In some embodiments, the origin of replication is R6K or a derivative thereof. In some embodiments, the origin of replication is p15A or a derivative thereof. In some embodiments, the origin of replication is pSC101 or a derivative thereof. In some embodiments, the origin of replication is ColE2 or a derivative thereof. In some embodiments, the origin of replication is F1 or a derivative thereof. In some embodiments, the origin of replication is pUC or a derivative thereof.

Described herein are recombinant AAV vectors comprising helper polynucleotides, wherein any two or more helper polynucleotides of the disclosure is provided in the same plasmid or in different plasmids (e.g., a packaging plasmid, a transfer plasmid, or a helper plasmid).

Methyltransferase Compositions

Described herein, in some embodiments, are methods and compositions for increasing methylation of CpG dinucleotides. In some embodiments, methods and compositions for increasing methylation of CpG dinucleotides comprise a methyltransferase. Described herein, in some embodiments, are compositions comprising: a nuclease fused to a methyltransferase (e.g., an RNA methyltransferase or a DNA methyltransferase) for generating vectors with increased methylation of unmethylated CpGs. Further described herein, in some embodiments, are compositions comprising a) a nuclease fused to a methyltransferase; and b) a nucleic acid targeting a sequence comprising at least 97% sequence identity to any one of the nucleic acid sequences of SEQ ID NOs: 2-6 or a reverse complement thereof. Further described herein, in some embodiments, are compositions comprising a) a Clustered Regularly Interspaced Short Palindromic Repeat (CRISPR)-associated endonuclease fused to an RNA methyltransferase or a nucleic acid encoding the CRISPR-associated endonuclease fused to an RNA methyltransferase; and b) one or more guide RNAs or a nucleic acid encoding the one or more guide RNAs, the one or more guide RNAs targeting a sequence for methylating a cytosine in a CpG dinucleotide.

Described herein are compositions comprising a nuclease fused to a methyltransferase, wherein the methyltransferase is a RNA methyltransferase. In some embodiments, the RNA methyltransferase is a 5-methylcytosine (m5C) RNA methyltransferase. In some embodiments, the RNA methyltransferase is a prokaryotic RNA methyltransferase (e.g., Fmu, YebU, RsmF, or a derivative thereof). In some embodiments, the prokaryotic RNA methyltransferase is Fmu, YebU, RsmF, or a derivative thereof. In some embodiments, the prokaryotic RNA methyltransferase is Fmu or a derivative thereof. In some embodiments, the prokaryotic RNA methyltransferase is YebU or a derivative thereof. In some embodiments, the prokaryotic RNA methyltransferase is RsmF or a derivative thereof.

In some embodiments, the RNA methyltransferase is a eukaryotic RNA methyltransferase (e.g., TRM4B, TRDMT1, NOP2A (OL12), NSUN1 (NOP2), NSUN2, NSUN3, NSUN4, NSUN5, NSUN6, NSUN7, or a derivative thereof). In some embodiments, the eukaryotic RNA methyltransferase is TRM4B, TRDMT1, NOP2A (OL12), NSUN1 (NOP2), NSUN2, NSUN3, NSUN4, NSUN5, NSUN6, NSUN7, or a derivative thereof. In some embodiments, the eukaryotic RNA methyltransferase is TRM4B or a derivative thereof. In some embodiments, the eukaryotic RNA methyltransferase is TRDMT1 or a derivative thereof. In some embodiments, the eukaryotic RNA methyltransferase is NOP2A (OL12) or a derivative thereof. In some embodiments, the eukaryotic RNA methyltransferase is NSUN1 (NOP2) or a derivative thereof. In some embodiments, the eukaryotic RNA methyltransferase is NSUN2 or a derivative thereof. In some embodiments, the eukaryotic RNA methyltransferase is NSUN3 or a derivative thereof. In some embodiments, the eukaryotic RNA methyltransferase is NSUN4 or a derivative thereof. In some embodiments, the eukaryotic RNA methyltransferase is NSUN5 or a derivative thereof. In some embodiments, the eukaryotic RNA methyltransferase is NSUN6 or a derivative thereof. In some embodiments, the eukaryotic RNA methyltransferase is NSUN7 or a derivative thereof.

In some embodiments, the methyltransferase is a DNA methyltransferase. In some embodiments, the DNA methyltransferase is DNMT1, DNMT2, or DNMT3a. In some embodiments, the DNA methyltransferase is DNMT1. In some embodiments, the DNA methyltransferase is DNMT2. In some embodiments, the DNA methyltransferase is DNMT3a. In some embodiments, the DNA methyltransferase is a prokaryotic DNA methyltransferase (e.g., a CcrM, Dcm, M.HhaI, M.HhaI, methyltransferase or a derivative thereof). In some embodiments, the prokaryotic DNA methyltransferase is a CcrM methyltransferase or a derivative thereof. In some embodiments, the prokaryotic DNA methyltransferase is a Dcm methyltransferase or a derivative thereof. In some embodiments, the prokaryotic DNA methyltransferase is a M.HhaI methyltransferase or a derivative thereof. In some embodiments, the prokaryotic DNA methyltransferase is a M.HhaI methyltransferase or a derivative thereof.

In some embodiments, the DNA methyltransferase is a eukaryotic DNA methyltransferase (e.g., a MET1, CMT, or DRM methyltransferase). In some embodiments, the eukaryotic DNA methyltransferase is a MET1 methyltransferase. In some embodiments, the eukaryotic DNA methyltransferase is a CMT methyltransferase. In some embodiments, the eukaryotic DNA methyltransferase is a DRM methyltransferase.

In some embodiments, the eukaryotic DNA methyltransferase is MET1, METIIa, METIII, METIIb, PMET, CMET5, CMET21, ZMET1, Masc1, or a derivative thereof. In some embodiments, the eukaryotic DNA methyltransferase is MET1 or a derivative thereof. In some embodiments, the eukaryotic DNA methyltransferase is METIIa or a derivative thereof. In some embodiments, the eukaryotic DNA methyltransferase is METIII or a derivative thereof. In some embodiments, the eukaryotic DNA methyltransferase is METIIb or a derivative thereof. In some embodiments, the eukaryotic DNA methyltransferase is PMET or a derivative thereof. In some embodiments, the eukaryotic DNA methyltransferase is CMET5 or a derivative thereof. In some embodiments, the eukaryotic DNA methyltransferase is CMET21 or a derivative thereof. In some embodiments, the eukaryotic DNA methyltransferase is ZMET1 or a derivative thereof. In some embodiments, the eukaryotic DNA methyltransferase is Masc1 or a derivative thereof.

In some embodiments, the nuclease is a zinc finger nuclease (ZFN), a transcription activator-like effector nuclease, or a CRISPR-associated endonuclease.

Exemplary CRISPR-associated endonucleases comprise, but are not limited to, Cas3, Cas4, Cas5, Cas5e (or CasD), Cas6, Cas6e, Cas6f, Cas7, Cas8a1, Cas8a2, Cas8b, Cas8c, Cas9, Casio, CaslOd, CasF, CasG, CasH, CasX, CasΦ, Csy1, Csy2, Csy3, Cse1 (or CasA), Cse2 (or CasB), Cse3 (or CasE), Cse4 (or CasC), Csc1, Csc2, Csa5, Csn2, Csm2, Csm3, Csm4, Csm5, Csm6, Cmrl, Cmr3, Cmr4, Cmr5, Cmr6, Csb1, Csb2, Csb3, Csxl7, Csxl4, CsxlO, Csxl6, CsaX, Csx3, Cszl, Csxl5, Csf1, Csf2, Csf3, Csf4, and Cul966. In some embodiments, the CRISPR-associated endonuclease is a Cas1, CaslB, Cas2, Cas3, Cas4, Cas5, Cash, Cas7, Cas8, Casio, Csy1, Csy2, Csy3, Cse1, Cse2, Csc1, Csc2, Csa5, Csn2, Csm2, Csm3, Csm4, Csm5, Csm6, Cmrl, Cmr3, Cmr4, Cmr5, Cmr6, Csb1, Csb2, Csb3, Csxl7, Csxl4, Csxl6, CsaX, Csx3, Csxl, Csxl5, Csf1, Csf2, Csf3, Csf4, Cas9, Casl2 (e.g., Casl2a, Casl2b, Casl2c, Casl2d, Casl2k, Casl2J, Casl2L etc.), Casl3 (e.g., Casl3a, Casl3b (e.g., Casl3b-t1, Casl3b-t2, Casl3b-t3), Casl3c, Casl3d, etc.), Casl4, CasX, CasY, or an engineered form of the Cas protein. In some embodiments, the CRISPR-associated endonuclease is Cas9. In some embodiments, the CRISPR-associated endonuclease is catalytically dead. In some embodiments, the CRISPR-associated endonuclease is catalytically dead Cas9 (dCas9) or a derivative thereof.

In some embodiments, the CRISPR-associated endonuclease (e.g., Cas9) is from or derived from *Staphylococcus aureus, Streptococcus pyogenes, Streptococcus thermophilus, Streptococcus* sp., *Nocardiopsis dassonvillei, Streptomyces pristinaespiralis, Streptomyces viridochromogenes, Streptomyces viridochromogenes, Streptosporangium roseum, Alicyclobacillus acidocaldarius, Bacillus pseudomycoides, Bacillus selenitireducens, Exiguobacterium sibiricum, Lactobacillus delbrueckii, Lactobacillus salivarius, Microscilla marina, Burkholderiales bacterium, Polaromonas naphthalenivorans, Polaromonas* sp., *Crocosphaera watsonii, Cyanothece* sp., *Microcystis aeruginosa, Synechococcus* sp., *Acetohalobium arabaticum, Ammonifex degensii, Caldicelulosiruptor becscii, Candidates Desulforudis, Clostridium botubnum, Clostridium difficile, Fine goldia magna, Natranaerobius thermophilus, Pelotomaculum the rmopropionicum, Acidithiobacillus caldus, Acidithiobacillus ferrooxidans, Allochromatium vinosum, Marinobacter* sp., *Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc* sp., *Arthrospira maxima, Arthrospira platensis, Arthrospira* sp., *Lyngbya* sp., *Microcoleus chthonoplastes, Oscillatoria* sp., *Petrotoga mobilis, Thermosipho africanus*, or *Acaryochloris marina*.

In some embodiments, the CRISPR-associated endonuclease (e.g., Cas9) is wild-type, modified, or fragment thereof. In some embodiments, the CRISPR-associated endonuclease (e.g., Cas9) comprises an amino acid sequence identical to the wild-type *Streptococcus pyogenes* or *Staphylococcus aureus* amino acid sequence. In some embodiments, the CRISPR-associated endonuclease (e.g., Cas9) is modified to alter one or more properties (e.g., nuclease activity, affinity, stability, etc.) of the protein relative to wild-type or another Cas protein. In some embodiments, domains of the CRISPR-associated endonuclease (e.g., Cas9) not involved in RNA-guided cleavage are eliminated from the protein such that the modified Cas protein is smaller than the wild-type Cas protein.

In some embodiments, the CRISPR-associated endonuclease comprises at least one RNA recognition and/or RNA binding domain. In some embodiments, the RNA recognition and/or RNA binding domains interact with guide RNAs (gRNAs). In some embodiments, the CRISPR-associated endonuclease comprises nuclease domains (e.g., DNase or RNase domains), DNA binding domains, helicase domains, RNAse domains, protein-protein interaction domains, dimerization domains, or combinations thereof.

In some embodiments, the CRISPR-associated endonuclease used herein is substantially homologous to a Cas protein (e.g., Cas9, saCas9, spCas9) disclosed herein. In some embodiments, a protein which is "substantially homologous" is about 50% homologous, about 70% homologous, about 80% homologous, about 90% homologous, about 95% homologous, or about 99% homologous to an amino acid sequence of a Cas protein disclosed herein.

In some embodiments, the CRISPR-associated endonuclease is Cas9.

In some embodiments, the CRISPR-associated endonuclease is catalytically dead (e.g., nuclease-deficient variant of a Cas nuclease (dCas)).

In some embodiments, the CRISPR-associated endonuclease is catalytically dead Cas9 (dCas9) or a derivative thereof. For example, a nuclease-deficient variant of a Cas nuclease (dCas), which is an engineered nuclease-deficient variant of a Cas nuclease (e.g., dCas9, dCas9-KRAB, or dCs9-SID4X) that can pair with a guide RNA (gRNA), is fused to an RNA methyltransferase to methylate unmethylated CpGs.

Described herein, in some embodiments, are compositions comprising: a CRISPR-associated endonuclease fused to a RNA methyltransferase or a nucleic acid encoding the CRISPR-associated endonuclease fused to the RNA methyltransferase; and one or more guide RNAs or a nucleic acid encoding the one or more guide RNAs, the one or more guide RNAs targeting a sequence for methylating a cytosine in a CpG dinucleotide, wherein the sequence comprises a portion of the nucleic acid sequence of SEQ ID NO: 1. In some embodiments, the sequence is a portion of the nucleic acid sequence of SEQ ID NO: 1. In some embodiments, the sequence comprises at least 5, 6, 7, 8, 9, 10, 11, 12, 13, 14, 15, 16, 17, 18, 19, 20, 21, 22, 23, 24, 25, or more than 25 nucleotides of the nucleic acid sequence of SEQ ID NO: 1. In some embodiments, the sequence comprises at least 5, 6, 7, 8, 9, 10, 11, 12, 13, 14, 15, 16, 17, 18, 19, 20, 21, 22, 23, 24, 25, or more than 25 consecutive nucleotides of the nucleic acid sequence of SEQ ID NO: 1. In some embodiments, the sequence comprises about 15 nucleotides to about 28 nucleotides. In some embodiments, the sequence comprises at least about 15 nucleotides. In some embodiments, the sequence comprises at most about 28 nucleotides. In some embodiments, the sequence comprises about 15 nucleotides to about 18 nucleotides, about 15 nucleotides to about 19 nucleotides, about 15 nucleotides to about 20 nucleotides, about 15 nucleotides to about 21 nucleotides, about 15 nucleotides to about 22 nucleotides, about 15 nucleotides to about 23 nucleotides, about 15 nucleotides to about 24 nucleotides, about 15 nucleotides to about 25 nucleotides, about 15 nucleotides to about 28 nucleotides, about 16 nucleotides to about 21 nucleotides, about 16 nucleotides to about 22 nucleotides, about 16 nucleotides to about 23 nucleotides, about 16 nucleotides to about 24 nucleotides, about 16 nucleotides to about 25 nucleotides, about 16 nucleotides to about 28 nucleotides, about 17 nucleotides to about 22 nucleotides, about 17 nucleotides to about 23 nucleotides, about 17 nucleotides to about 24 nucleotides, about 17 nucleotides to about 25 nucleotides, about 17 nucleotides to about 28 nucleotides, about 18 nucleotides to about 23 nucleotides, about 18 nucleotides to about 24 nucleotides, about 18 nucleotides to about 25 nucleotides, about 18 nucleotides to about 28 nucleotides, about 19 nucleotides to about 24 nucleotides, about 19 nucleotides to about 25 nucleotides, about 19 nucleotides to about 28 nucleotides, about 20 nucleotides to about 21 nucleotides, about 20 nucleotides to about 22 nucleotides, about 20 nucleotides to about 25 nucleotides, about 20 nucleotides to about 28 nucleotides, or about 21 nucleotides to about 28 nucleotides of the nucleic acid sequence of SEQ ID NO: 1.

Described herein are compositions comprising: a nuclease fused to a methyltransferase; and nucleic acids targeting a sequence comprising at least 97% (e.g., 98% or 99%) sequence identity to any one of the nucleic acid sequences of SEQ ID NOs: 2-6 or a reverse complement thereof. In some embodiments, the sequence comprises at least 80%, 85%, 90%, 95%, 97%, 98%, or 99% sequence identity to any one of the nucleic acid sequences of SEQ ID NOs: 2-6 or a reverse complement thereof. In some embodiments, the sequence comprises at least 80% sequence identity to any one of the nucleic acid sequences of SEQ ID NOs: 2-6 or a reverse complement thereof. In some embodiments, the sequence comprises at least 85% sequence identity to any one of the nucleic acid sequences of SEQ ID NOs: 2-6 or a reverse complement thereof. In some embodiments, the sequence comprises at least 90% sequence identity to any one of the nucleic acid sequences of SEQ ID NOs: 2-6 or a reverse complement thereof. In some embodiments, the sequence comprises at least 97% sequence identity to any one of the nucleic acid sequences of SEQ ID NOs: 2-6 or a reverse complement thereof. In some embodiments, the sequence comprises at least 80% sequence identity to any one of the nucleic acid sequences of SEQ ID NOs: 2-6 or a reverse complement thereof. In some embodiments, the sequence comprises at least 98% sequence identity to any one of the nucleic acid sequences of SEQ ID NOs: 2-6 or a reverse complement thereof. In some embodiments, the sequence comprises at least 99% sequence identity to any one of the nucleic acid sequences of SEQ ID NOs: 2-6 or a reverse complement thereof. In some embodiments, the sequence comprises any one of the nucleic acid sequences of SEQ ID NOs: 2-6 or a reverse complement thereof.

TABLE 1

Sequences

| Name | Sequence | SEQ ID NO. |
|---|---|---|
| WPRE | AATCAACCTCTGGATTACAAAATTTGTGAAAGA TTGACTGGTATTCTTAACTATGTTGCTCCTTTT ACGCTATGTGGATACGCTGCTTTAATGCCTTTG TATCATGCTATTGCTTCCCGTATGGCTTTCATT TTCTCCTCCTTGTATAAATCCTGGTTGCTGTCT CTTTATGAGGAGTTGTGGCCCGTTGTCAGGCAA CGTGGCGTGGTGTGCACTGTGTTTGCTGACGCA ACCCCCACTGGTTGGGGCATTGCCACCACCTGT CAGCTCCTTTCCGGGACTTTCGCTTTCCCCCTC CCTATTGCCACGGCGGAACTCATCGCCGCCTGC CTTGCCCGCTGCTGGACAGGGGCTCGGCTGTTG GGCACTGACAATTCCGTGGTGTTGTCGGGGAAA TCATCGTCCTTTCCTTGGCTGCTCGCCTGTGTT GCCACCTGGATTCTGCGCGGGACGTCCTTCTGC TACGTCCCTTCGGCCCTCAATCCAGCGGACCTT CCTTCCCGCGGCCTGCTGCCGGCTCTGCGGCCT CTTCCGCGTCTTCGCCTTCGCCCTCAGACGAGT CGGATCTCCCTTTGGGCCGCCTCCCCGC | 1 |
| Guide 1 | CGTTGTCAGGCAACGTGGCG | 2 |
| Guide 2 | GCCTTCGCCCTCAGACGAGT | 3 |
| Guide 3 | TGGCCCGTTGTCAGGCAACG | 4 |
| Guide 4 | TCCGACTCGTCTGAGGGCGA | 5 |
| Guide 5 | GCGTATCCACATAGCGTAAA | 6 |

In some embodiments, compositions and methods comprise one or more guide RNAs. In some embodiments, the guide RNA comprises a sense sequence. In some embodiments, the guide RNA comprises an anti-sense sequence. In some embodiments, the guide RNA comprises nucleotide sequences other than the region complementary or substantially complementary to a region of a target sequence. For example, a guide RNA is part or considered part of a crRNA or comprised in a crRNA, e.g., a crRNA:tracrRNA chimera.

In some embodiments, the guide RNA (e.g., gRNA) comprises synthetic nucleotides or modified nucleotides. In some embodiments, the guide RNA comprises one or more inter-nucleoside linkers modified from the natural phosphodiester. In some embodiments, all of the inter-nucleoside linkers of the guide RNA, or contiguous nucleotide sequence thereof, are modified. For example, In some embodiments, the inter nucleoside linkage comprises Sulphur (S), such as a phosphorothioate inter-nucleoside linkage.

In some embodiments, the guide RNA (e.g., gRNA) comprises modifications to a ribose sugar or nucleobase. In some embodiments, the guide RNA comprises one or more nucleosides comprising a modified sugar moiety, wherein the modified sugar moiety is a modification of the sugar moiety when compared to the ribose sugar moiety found in deoxyribose nucleic acid (DNA) and RNA. In some embodiments, the modification is within the ribose ring structure. Exemplary modifications comprise, but are not limited to, replacement with a hexose ring (HNA), a bicyclic ring having a biradical bridge between the C2 and C4 carbons on the ribose ring (e.g., locked nucleic acids (LNA)), or an unlinked ribose ring which typically lacks a bond between the C2 and C3 carbons (e.g., UNA). In some embodiments, the sugar modified nucleosides comprises bicyclohexose nucleic acids or tricyclic nucleic acids. In some embodiments, the modified nucleosides comprise nucleosides where the sugar moiety is replaced with a non-sugar moiety, for example in the case of peptide nucleic acids (PNA), or morpholino nucleic acids.

In some embodiments, the guide RNA comprises one or more modified sugars. In some embodiments, the sugar modifications comprise modifications made by altering the substituent groups on the ribose ring to groups other than hydrogen, or the 2'-OH group naturally found in DNA and RNA nucleosides. In some embodiments, substituents are introduced at the 2', 3', 4', 5' positions or combinations thereof. In some embodiments, nucleosides with modified sugar moieties comprise 2' modified nucleosides, e.g., 2' substituted nucleosides. A 2' sugar modified nucleoside, in some embodiments, is a nucleoside that has a substituent other than H or —OH at the 2' position (2' substituted nucleoside) or comprises a 2' linked biradical, and comprises 2' substituted nucleosides and LNA (2'-4' biradical bridged) nucleosides. Examples of 2' substituted modified nucleosides comprise, but are not limited to, 2'-0-alkyl-RNA, 2'-0-methyl-RNA, 2'-alkoxy-RNA, 2'-0-methoxyethyl-RNA (MOE), 2'-amino-DNA, 2'-Fluoro-RNA, and 2'-F-ANA nucleoside. In some embodiments, the modification in the ribose group comprises a modification at the 2' position of the ribose group. In some embodiments, the modification at the 2' position of the ribose group is selected from the group consisting of 2'-0-methyl, 2'-fluoro, 2'-deoxy, and 2'-0-(2-methoxyethyl).

In some embodiments, the guide RNA comprises one or more modified sugars. In some embodiments, the guide RNA comprises only modified sugars. In certain embodiments, the guide RNA comprises greater than about 10%, 25%, 50%, 75%, or 90% modified sugars. In some embodiments, the modified sugar is a bicyclic sugar. In some embodiments, the modified sugar comprises a 2'-0-methoxyethyl group. In some embodiments, the guide RNA comprises both inter-nucleoside linker modifications and nucleoside modifications.

In some embodiments, the guide RNA comprises about 15 nucleotides to about 28 nucleotides. In some embodiments, the guide RNA comprises at least about 15 nucleotides. In some embodiments, the guide RNA comprises at most about 28 nucleotides. In some embodiments, the guide RNA comprises about 15 nucleotides to about 16 nucleotides, about 15 nucleotides to about 17 nucleotides, about 15 nucleotides to about 18 nucleotides, about 15 nucleotides to about 19 nucleotides, about 15 nucleotides to about 20 nucleotides, about 15 nucleotides to about 21 nucleotides, about 15 nucleotides to about 22 nucleotides, about 15 nucleotides to about 23 nucleotides, about 15 nucleotides to about 24 nucleotides, about 15 nucleotides to about 25 nucleotides, about 15 nucleotides to about 28 nucleotides, about 16 nucleotides to about 17 nucleotides, about 16 nucleotides to about 18 nucleotides, about 16 nucleotides to about 19 nucleotides, about 16 nucleotides to about 20 nucleotides, about 16 nucleotides to about 21 nucleotides, about 16 nucleotides to about 22 nucleotides, about 16 nucleotides to about 23 nucleotides, about 16 nucleotides to about 24 nucleotides, about 16 nucleotides to about 25 nucleotides, about 16 nucleotides to about 28 nucleotides, about 17 nucleotides to about 18 nucleotides, about 17 nucleotides to about 19 nucleotides, about 17 nucleotides to about 20 nucleotides, about 17 nucleotides to about 21 nucleotides, about 17 nucleotides to about 22 nucleotides, about 17 nucleotides to about 23 nucleotides, about 17 nucleotides to about 24 nucleotides, about 17 nucleotides to about 25 nucleotides, about 17 nucleotides to about 28 nucleotides, about 18 nucleotides to about 19 nucleotides, about 18 nucleotides to about 20 nucleotides, about 18 nucleotides to about 21 nucleotides, about 18 nucleotides to about 22 nucleotides, about 18 nucleotides to about 23 nucleotides, about 18 nucleotides to about 24 nucleotides, about 18 nucleotides to about 25 nucleotides, about 18 nucleotides to about 28 nucleotides, about 19 nucleotides to about 20 nucleotides, about 19 nucleotides to about 21 nucleotides, about 19 nucleotides to about 22 nucleotides, about 19 nucleotides to about 23 nucleotides, about 19 nucleotides to about 24 nucleotides, about 19 nucleotides to about 25 nucleotides, about 19 nucleotides to about 28 nucleotides, about 20 nucleotides to about 21 nucleotides, about 20 nucleotides to about 22 nucleotides, about 20 nucleotides to about 23 nucleotides, about 20 nucleotides to about 24 nucleotides, about 20 nucleotides to about 25 nucleotides, about 20 nucleotides to about 28 nucleotides, about 21 nucleotides to about 22 nucleotides, about 21 nucleotides to about 23 nucleotides, about 21 nucleotides to about 24 nucleotides, about 21 nucleotides to about 25 nucleotides, about 21 nucleotides to about 28 nucleotides, about 22 nucleotides to about 23 nucleotides, about 22 nucleotides to about 24 nucleotides, about 22 nucleotides to about 25 nucleotides, about 22 nucleotides to about 28 nucleotides, about 23 nucleotides to about 24 nucleotides, about 23 nucleotides to about 25 nucleotides, about 23 nucleotides to about 28 nucleotides, about 24 nucleotides to about 25 nucleotides, about 24 nucleotides to about 28 nucleotides, or about 25 nucleotides to about 28 nucleotides. In some embodiments, the guide RNA comprises about 15 nucleotides, about 16 nucleotides, about 17 nucleotides, about 18 nucleotides, about 19 nucleotides, about 20 nucleotides, about 21 nucleotides, about 22 nucleotides, about 23 nucleotides, about 24 nucleotides, about 25 nucleotides, or about 28 nucleotides.

In some embodiments, the guide RNA (e.g., gRNA) is encoded by any one of the nucleic acid sequences of SEQ ID NOs: 2-6 or a sequence having at least about 80%, 85%, 90%, 95%, 97%, 98%, or 99% sequence identity to any one of the nucleic acid sequences of SEQ ID NOs: 2-6 or a reverse complement thereof. In some embodiments, the guide RNA is encoded by a sequence at least about 80% sequence identity to any one of the nucleic acid sequences of SEQ ID NOs: 2-6 or a reverse complement thereof. In some embodiments, the guide RNA is encoded by a sequence at least about 85% sequence identity to any one of the nucleic acid sequences of SEQ ID NOs: 2-6 or a reverse complement thereof. In some embodiments, the guide RNA is encoded by a sequence at least about 90% sequence identity to any one of the nucleic acid sequences of SEQ ID NOs: 2-6 or a reverse complement thereof. In some embodiments, the guide RNA is encoded by a sequence at least about 95% sequence identity to any one of the nucleic acid sequences of SEQ ID NOs: 2-6 or a reverse complement thereof. In some embodiments, the guide RNA is encoded by a sequence at least about 97% sequence identity to any one of the nucleic acid sequences of SEQ ID NOs: 2-6 or a reverse complement thereof. In some embodiments, the guide RNA is encoded by a sequence at least about 98% sequence identity to any one of the nucleic acid sequences of SEQ ID NOs: 2-6 or a reverse complement thereof. In some embodiments, the guide RNA is encoded by a sequence at least about 99% sequence identity to any one of the nucleic acid sequences of SEQ ID NOs: 2-6 or a reverse complement thereof. In some embodiments, the guide RNA is encoded by a sequence according to any one of the nucleic acid sequences of SEQ ID NOs: 2-6 or a reverse complement thereof, or a reverse complement thereof.

In some embodiments, the one or more guide RNAs are encoded by a sequence comprising at least about 80%, 85%, 90%, 95%, 97%, 98%, or 99% sequence identity to any one of the nucleic acid sequences of SEQ ID NOs: 2-6 or a reverse complement thereof. In some embodiments, the one or more guide RNAs are encoded by a sequence comprising at least about 80% sequence identity to any one of the nucleic acid sequences of SEQ ID NOs: 2-6 or a reverse complement thereof. In some embodiments, the one or more guide RNAs are encoded by a sequence comprising at least about 85% sequence identity to any one of the nucleic acid sequences of SEQ ID NOs: 2-6 or a reverse complement thereof. In some embodiments, the one or more guide RNAs are encoded by a sequence comprising at least about 90% sequence identity to any one of the nucleic acid sequences of SEQ ID NOs: 2-6 or a reverse complement thereof. In some embodiments, the one or more guide RNAs are encoded by a sequence comprising at least about 95% sequence identity to any one of the nucleic acid sequences of SEQ ID NOs: 2-6 or a reverse complement thereof. In some embodiments, the one or more guide RNAs are encoded by a sequence comprising at least about 97% sequence identity to any one of the nucleic acid sequences of SEQ ID NOs: 2-6 or a reverse complement thereof. In some embodiments, the one or more guide RNAs are encoded by a sequence comprising at least about 98% sequence identity to any one of the nucleic acid sequences of SEQ ID NOs: 2-6 or a reverse complement thereof. In some embodiments, the one or more guide RNAs are encoded by a sequence comprising at least about 99% sequence identity to any one of the nucleic acid sequences of SEQ ID NOs: 2-6 or a reverse complement thereof. In some embodiments, the guide RNA is encoded by a sequence according to any one of the nucleic acid sequences of SEQ ID NOs: 2-6 or a reverse complement thereof, or a reverse complement thereof.

Described herein, in some embodiments, are compositions comprising: a nuclease (e.g., Cas9 or dCas9) fused to a methyltransferase (e.g, RNA methyltransferase) wherein at least 100 (e.g., at least 200, 300, 400, 500, or 1000) CpG dinucleotides are methylated. In some embodiments, at least 200 CpG dinucleotides are methylated. In some embodiments, at least 300 CpG dinucleotides are methylated. In some embodiments, at least 400 CpG dinucleotides are methylated. In some embodiments, at least 500 CpG dinucleotides are methylated. In some embodiments, at least 1000 CpG dinucleotides are methylated.

In some embodiments, one or more CpG dinucleotides are methylated within at most about 200 base pairs of the sequence. In some embodiments, one or more CpG dinucleotides are methylated within at most about 1000 base pairs of the sequence. In some embodiments, one or more CpG dinucleotides are methylated within at most about 5000 base pairs of the sequence. In some embodiments, one or more CpG dinucleotides are methylated within at most about 10000 base pairs of the sequence. In some embodiments, one or more CpG dinucleotides are methylated within at most about 20000 base pairs of the sequence.

In some embodiments, at least 100 (e.g., at least 200, 300, 400, 500, or 1000) CpG dinucleotides are methylated. In some embodiments, at least 200 CpG dinucleotides are methylated. In some embodiments, at least 300 CpG dinucleotides are methylated. In some embodiments, at least 400 CpG dinucleotides are methylated. In some embodiments, at least 500 CpG dinucleotides are methylated. In some embodiments, at least 1000 CpG dinucleotides are methylated.

In some embodiments, one or more CpG dinucleotides are methylated within at most about 200 base pairs of the sequence. In some embodiments, one or more CpG dinucleotides are methylated within at most about 1000 base pairs of the sequence. In some embodiments, one or more CpG dinucleotides are methylated within at most about 5000 base pairs of the sequence. In some embodiments, one or more CpG dinucleotides are methylated within at most about 10000 base pairs of the sequence. In some embodiments, one or more CpG dinucleotides are methylated within at most about 20000 base pairs of the sequence.

Methods of the Disclosure

Described herein, in some embodiments, are methods for generating recombinant AAV vectors, comprising: providing cells with a nucleic acid comprising a payload of interest; and culturing the cells in a growth medium comprising cytosine or a derivative thereof to generate the recombinant AAV vector comprising methylation of at least about 25% (e.g., at least about 30%, 35%, 40%, 50%, 60%, 70%, 80%, or 90%) of CpG dinucleotides.

Described herein, are methods for generating rAAV vectors, comprising: culturing the cells in a growth medium comprising cytosine or a derivative thereof selected from the group consisting of methylcytosine, phosphorylated cytosine, and phosphorothioate cytosine. In some embodiments, the cytosine or the derivative thereof is methylcytosine. In some embodiments, the cytosine or the derivative thereof is phosphorylated cytosine. In some embodiments, the cytosine or the derivative thereof is phosphorothioate cytosine.

In some embodiments, the cells are cultured in a growth medium comprising cytosine or a derivative thereof at various concentrations. In some embodiments, the concentration of the cytosine or the derivative thereof is in a range of about 100 m to about 5 mM (e.g., about 200 m to about 4 mM, about 300 m to about 3 mM, about 400 m to about 2 mM, or about 500 m to about 1 mM). In some embodiments, the concentration of the cytosine or the derivative thereof is in a range of about 200 m to about 4 mM. In some embodiments, the concentration of the cytosine or the derivative thereof is in a range of about 300 m to about 3 mM. In some embodiments, the concentration of the cytosine or the derivative thereof is in a range of about 400 m to about 2 mM. In some embodiments, the concentration of the cytosine or the derivative thereof is in a range of about 500 m to about 1 mM.

In some embodiments, the concentration of the cytosine or the derivative thereof is up to 3 mM (e.g., up to 100 m, 200 m, 300 m, 400 m, 500 m, 1 mM, 2 mM, or 3 mM). In some embodiments, a concentration of the cytosine or the derivative thereof is up to 100 m. In some embodiments, a concentration of the cytosine or the derivative thereof is up to 200 m. In some embodiments, a concentration of the cytosine or the derivative thereof is up to 300 m. In some embodiments, a concentration of the cytosine or the derivative thereof is up to 400 m. In some embodiments, a concentration of the cytosine or the derivative thereof is up to 500 m. In some embodiments, a concentration of the cytosine or the derivative thereof is up to 1 mM. In some embodiments, a concentration of the cytosine or the derivative thereof is up to 2 mM.

In some embodiments, the nucleic acid comprises reduced CpG dinucleotides. In some embodiments, the nucleic acid comprises increased methylation of CpG dinucleotides. In some embodiments, the nucleic acid comprises reduced CpG dinucleotides and increased methylation of CpG dinucleotides.

Described herein, in some embodiments, are methods for generating recombinant AAV vectors, comprising: providing cells with a nucleic acid comprising a payload of interest, wherein the nucleic acid comprises reduced CpG dinucleotides and further comprising providing the cells with a nucleic acid, comprising: a helper polynucleotide comprising reduced CpG dinucleotides as compared to a parental equivalent.

Described herein, in some embodiments, are methods for generating recombinant AAV vectors, comprising: providing cells with a nucleic acid comprising a payload of interest, wherein the nucleic acid comprises reduced CpG dinucleotides and further comprising providing the cells a nucleic acid, comprising: a helper polynucleotide comprising increased methylation of CpG dinucleotides as compared to a parental equivalent.

Described herein, in some embodiments, are methods for generating recombinant AAV vectors, comprising: providing cells with a nucleic acid comprising a payload of interest, wherein the nucleic acid comprises reduced CpG dinucleotides and further comprising providing a composition comprising: a) a CRISPR-associated endonuclease fused to an RNA methyltransferase or a nucleic acid encoding the CRISPR-associated endonuclease fused to an RNA methyltransferase; and b) one or more guide RNAs or a nucleic acid encoding the one or more guide RNAs, the one or more guide RNAs targeting a sequence for methylating a cytosine in a CpG dinucleotide.

Described herein, in some embodiments, are methods for generating recombinant AAV vectors, comprising: providing cells with a nucleic acid comprising a payload of interest, wherein the nucleic acid comprises reduced CpG dinucleotides and further comprising providing a composition comprising: a) a nuclease fused to a methyltransferase; and b) a nucleic acid targeting a sequence comprising at least 97% sequence identity to any one of the nucleic acid sequences of SEQ ID NOs: 2-6 or a reverse complement thereof.

Described herein, are methods for generating rAAV vectors, comprising: providing cells with a nucleic acid, wherein the cells are transfected with the nucleic acid. In some embodiments, the cells are infected with the nucleic acid. In some embodiments, the cells are in suspension. In some embodiments, the cells are adherent. In some embodiments, the cells are engineered stable cell lines.

In some embodiments, the cell is a eukaryotic cell (e.g., a plant cell, an animal cell, a protist cell, or a fungi cell), a cell (a Chinese hamster ovary (CHO) cell, baby hamster kidney (BHK), human embryo kidney (HEK), mouse myeloma (NS0), or human retinal cells), an immortalized cell (e.g., a HeLa cell, a COS cell, a HEK-293T cell, a MDCK cell, a 3T3 cell, a PC12 cell, a Huh7 cell, a HepG2 cell, a K562 cell, a N2a cell, or a SY5Y cell), an insect cell (e.g., a *Spodoptera frugiperda* cell, a *Trichoplusia ni* cell, a *Drosophila melanogaster* cell, a S2 cell, or a *Heliothis virescens* cell), a yeast cell (e.g., a *Saccharomyces cerevisiae* cell, a *Cryptococcus* cell, or a *Candida* cell), a plant cell (e.g., a parenchyma cell, a collenchyma cell, or a sclerenchyma cell), a fungal cell (e.g., a *Saccharomyces cerevisiae* cell, a *Cryptococcus* cell, or a *Candida* cell), or a prokaryotic cell (e.g., a *E. coli* cell, a *streptococcus* bacterium cell, a *streptomyces* soil bacteria cell, or an archaea cell). In some embodiments, the cell is a eukaryotic cell. In some embodiments, the cell is a cell. In some embodiments, the cell is an immortalized cell. In some embodiments, the cell is an insect cell. In some embodiments, the cell is a yeast cell. In some embodiments, the cell is a plant cell. In some embodiments, the cell is a fungal cell. In some embodiments, the cell is a prokaryotic cell.

In some embodiments, the cell is an A549, HEK-293, HEK-293T, BHK, CHO, HeLa, MRC5, Sf9, Cos-1, Cos-7, Vero, BSC 1, BSC 40, BMT 10, WI38, HeLa, Saos, C2C12, L cell, HT1080, HepG2, Huh7, K562, a primary cell, or derivative thereof. In some embodiments, the cell is a A549 cell or a derivative thereof. In some embodiments, the cell is a HEK-293 cell or a derivative thereof. In some embodiments, the cell is a HEK-293T cell or a derivative thereof. In some embodiments, the cell is a BHK cell or a derivative thereof. In some embodiments, the cell is a CHO cell or a derivative thereof. In some embodiments, the cell is a HeLa cell or a derivative thereof. In some embodiments, the cell is a MRC5 cell or a derivative thereof. In some embodiments, the cell is a Sf9 cell or a derivative thereof. In some embodiments, the cell is a Cos-1 cell or a derivative thereof. In some embodiments, the cell is a Cos-7 cell or a derivative thereof. In some embodiments, the cell is a Vero cell or a derivative thereof. In some embodiments, the cell is a BSC 1 cell or a derivative thereof. In some embodiments, the cell is a BSC 40 cell or a derivative thereof. In some embodiments, the cell is a BMT 10 cell or a derivative thereof. In some embodiments, the cell is a WI38 cell or a derivative thereof. In some embodiments, the cell is a HeLa cell or a derivative thereof. In some embodiments, the cell is a Saos cell or a derivative thereof. In some embodiments, the cell is a C2C12 cell or a derivative thereof. In some embodiments, the cell is a L cell or a derivative thereof. In some embodiments, the cell is a HT1080 cell or a derivative thereof. In some embodiments, the cell is a HepG2 cell or a derivative thereof. In some embodiments, the cell is a Huh7 cell or a derivative thereof. In some embodiments, the cell is a K562 cell or a derivative thereof. In some embodiments, the cell is a primary cell.

In some embodiments, the nucleic acids or compositions described herein are expressed transiently. In some embodiments, the nucleic acids or compositions are expressed transiently from an inducible system. In some embodiments, the nucleic acids or compositions are stably expressed. In some embodiments, the nucleic acids or compositions are expressed stably from an inducible system.

In some embodiments, the recombinant viral vectors are produced by a producer cell line method. Briefly, for example, a cell line (e.g., a HeLa cell line) is stably transfected with a plasmid containing a Rep gene, a Cap gene, and a promoter-payload sequence. Cell lines are screened to select a lead clone for recombinant vector production, which In some embodiments, are expanded to a production bioreactor and infected with, a helper polynucleotide (e.g., a wild-type adenovirus) as a helper to initiate vector production. In some embodiments, the recombinant viral vector (e.g., rAAV) is subsequently harvested, adenovirus is inactivated (e.g., by heat) and/or removed, and the viral particles are purified. In some embodiments, recombinant viral vectors are purified and formulated.

In some embodiments, suitable media is used for the production of recombinant vectors. These media comprise, without limitation, media produced by Hyclone Laboratories and JRH comprising Modified Eagle Medium (MEM), Roswell Park Memorial Institute (RPMI) 1640, Eagle's Minimal Essential Medium (EMEM), Dulbecco's Modified Eagle Medium (DMEM), custom formulations, particularly with respect to custom media formulations for use in production of recombinant vectors.

In some embodiments, suitable production culture media of the present disclosure is supplemented with serum or serum-derived recombinant proteins at a level of 0.5-20 (v/v or w/v). In some embodiments, vectors are produced in serum-free conditions which are also referred to as media with no animal-derived products. In some embodiments, commercial or custom media is designed to support production of vectors, comprising supplementation of without limitation glucose, vitamins, amino acids, and or growth factors, in order to increase the titer and/or yield of vector in production cultures.

Vector production cultures comprise a variety of conditions (over a wide temperature range, for varying lengths of time, and the like) suitable to the particular host cell being utilized. Vector production cultures comprise attachment-dependent cultures which are cultured in suitable attachment-dependent vessels such as, for example, plates, flasks, cell stacks, roller bottles, hollow fiber filters, microcarriers, and packed-bed or fluidized-bed bioreactors. In some embodiments, vector production cultures comprise suspension-adapted host cells such as HeLa, HEK-293, and SF-9 cells which is cultured in a variety of ways comprising, for example, spinner flasks, stirred tank bioreactors, single use bioreactors such as Cytiva Xcellerex and Sartorius, and disposable systems such as the Wave bag system.

In some embodiments, viral particles of the disclosure are harvested from vector production cultures by lysis of the host cells of the production culture or by harvest of the spent media from the production culture, provided the cells are cultured under conditions to cause release of viral particles into the media from intact cells. Suitable methods of lysing cells comprise for example multiple freeze/thaw cycles, sonication, microfluidization, and treatment with chemicals, such as detergents and/or proteases.

In a further embodiment, the viral particles are purified. The term "purified" as used herein comprises a preparation of viral particles devoid of at least some of the other components that are present where the viral particles naturally occur or are initially prepared from. Thus, for example, in some embodiments, isolated viral particles are prepared using a purification technique to enrich it from a source mixture, such as a culture lysate or production culture supernatant. In some embodiments, enrichment is measured in a variety of ways, such as, for example, by the proportion of DNase-resistant particles (DRPs) or genome copies (gc) present in a solution, or by infectivity, or measured in relation to a second, potentially interfering substance present in the source mixture, such as contaminants, comprising production culture contaminants or in-process contaminants, comprising helper virus, media components, and the like.

In some embodiments, the vector production culture harvest is clarified to remove host cell debris. In some embodiments, the production culture harvest is clarified by filtration through a series of depth filters comprising, for example, a grade DOHC Millipore Millistak+HC Pod Filter, a grade A1HC Millipore Millistak+HC Pod Filter, and a 0.2 m Filter Opticap XL 10 Millipore Express SHC Hydrophilic Membrane filter. Clarification can also be achieved by a variety of other standard techniques, such as, centrifugation or filtration through any cellulose acetate filter of 0.2 m or greater pore size.

In some embodiments, the vector production culture harvest is further treated with Benzonase® to digest any high molecular weight DNA present in the production culture. In some embodiments, the Benzonase® digestion is performed under standard conditions comprising, for example, a final concentration of 1-2.5 units/ml of Benzonase® at a temperature ranging from ambient to 37° C. for a period of 30 minutes to several hours.

In some embodiments, viral particles are isolated or purified using one or more of the following purification steps: equilibrium centrifugation; flow-through anion exchange filtration; tangential flow filtration (TFF) for concentrating the viral particles; vector capture by apatite chromatography; heat inactivation of helper virus; vector capture by hydrophobic interaction chromatography; buffer exchange by size exclusion chromatography (SEC); nanofiltration; and vector capture by anion exchange chromatography, cation exchange chromatography, or affinity chromatography. In some embodiments, these steps are used alone, in various combinations, or in different orders. In some embodiments, the method comprises all the steps in the order as described below.

Described herein, are methods for generating a recombinant vector, wherein the methods comprise providing cells transfected with a helper polynucleotide. In some embodiments, the cells are transfected with a helper polynucleotide that provides helper functions to the AAV. In some embodiments, the helper polynucleotide provides adenovirus functions, comprising, e.g., E1a, E1b, E2a, E40RF6. The sequences of adenovirus gene providing these functions, in some embodiments, are obtained from any known adenovirus serotype, such as serotypes 2, 3, 4, 7, 12 and 40, and further comprising any of the presently identified human types. In some embodiments, the methods involve transfecting the cell with vectors expressing one or more genes necessary for AAV replication, AAV gene transcription, and/or AAV packaging.

Described herein, are methods for generating a recombinant vector, wherein the methods comprise providing cells transfected with a helper polynucleotide that is under the control of a promoter. In some embodiments, the cells are stable host cells comprising the required component(s) under the control of an inducible promoter. In some embodiments, the cells are stable host cells comprising the required component(s) under the control of a constitutive promoter. In some embodiments, the cells are stable host cells comprising the selected components under the control of a constitutive promoter and other selected components under the control of one or more inducible promoters. For example, a stable host cell is generated which is derived from HEK-293 cells (which contain E1 helper functions under the control of a constitutive promoter), but which contains the Rep and/or Cap proteins under the control of inducible promoters.

In some embodiments, the minigene, Rep sequences, Cap sequences, and helper functions required for producing the rAAV of the disclosure are delivered to the packaging host cell in the form of any genetic element which transfers the sequences. In some embodiments, the selected genetic elements are delivered by any suitable method.

Production of recombinant vectors, such as rAAV vectors, in some embodiments, comprises transfection, stable cell line production, and infectious hybrid virus production systems which comprise adenovirus-AAV hybrids, herpesvirus-AAV hybrids, and baculovirus-AAV hybrids.

Methods comprising transfection, stable cell line production, and infectious hybrid virus production systems, in some embodiments, are used for production of rAAV vectors. In some embodiments, the methods described herein comprise adenovirus-AAV hybrids, herpesvirus-AAV hybrids and baculovirus-AAV hybrids. rAAV production cultures for the production of rAAV virus particles all require; 1) suitable host cells, comprising, for example, human-derived cell lines such as HeLa, A549, or 293 cells, or insect-derived cell lines such as SF-9, in the case of baculovirus production systems, or transgenic plant cells; 2) suitable helper virus function, provided by wild-type or mutant adenovirus (such as temperature sensitive adenovirus), herpes virus, baculovirus, or a plasmid construct providing helper functions; 3) AAV Rep and Cap genes and gene products; 4) a desired genomic payload (such as a heterologous sequence encoding any desired sequence or fragment or variant thereof) flanked by at least one AAV ITR sequence; and 5) suitable media and media components to support rAAV production. Suitable media for the production of rAAV vectors comprise, without limitation, media produced by Hyclone Laboratories and JRH comprising Modified Eagle Medium (MEM), Roswell Park Memorial Institute (RPMI) 1640, Eagle's Minimal Essential Medium (EMEM), Dulbecco's Modified Eagle Medium (DMEM), custom formulations such as those described in U.S. Pat. No. 6,566,118, and Sf-900 II SFM media as described in U.S. Pat. No. 6,723,551, each of which is incorporated herein by reference in its entirety, particularly with respect to custom media formulations for use in production of recombinant AAV vectors.

In some embodiments, recombinant AAV particles are generated by transfecting producer cells with a plasmid (cis-plasmid) containing a rAAV genome comprising a payload flanked by one or more AAV ITRs and a separate construct expressing the AAV Rep and Cap genes in trans. In some embodiments, adenovirus helper factors such as E1A, E1B, E2A, E40RF6 and VA RNAs re provided by either adenovirus infection or by transfecting a third plasmid providing adenovirus helper polynucleotides into the producer cells. In some embodiments, producer cells are HEK-293 cells. In some embodiments, the helper polynucleotides provided will vary depending on the producer cells used and whether the producer cells already carry some of these helper polynucleotides.

In some embodiments, the rAAV vectors described herein are produced by a triple transfection method, such as the exemplary triple transfection method provided infra. In some embodiments, the plasmid containing a Rep gene and a Cap gene, along with a helper adenoviral plasmid, is transfected (e.g., using squeeze-poration, lipofection, optical transfection, the calcium phosphate method, or polyethylenimine (PEI)) into a cell line (e.g., HEK-293 cells), and virus is collected and optionally purified.

In some embodiments, rAAV vectors are produced by a producer cell line method, such as the exemplary producer cell line method provided infra. Briefly, a cell line (e.g., a HeLa cell line) is stably transfected with a plasmid containing a Rep gene, a Cap gene, and a promoter-payload sequence. Cell lines are screened to select a lead clone for rAAV production, which are then expanded to a production bioreactor and infected with an adenovirus (e.g., a wild-type adenovirus) as helper to initiate rAAV production. Virus is subsequently harvested, adenovirus may be inactivated (e.g., by heat) and/or removed, and the rAAV vectors are purified.

In some embodiments, a method is provided for producing any rAAV vector as disclosed herein comprising (a) culturing a host cell under a condition that rAAV vectors are produced, wherein the host cell comprises (i) one or more AAV packaging genes, wherein each said AAV packaging gene encodes an AAV replication and/or encapsidation protein; (ii) a rAAV pro-vector comprising nucleic acids encoding a therapeutic polypeptide and/or nucleic acid as described herein flanked by at least one AAV ITR, and (iii) an AAV helper function; and (b) recovering the rAAV vectors produced by the host cell. In some embodiments, said at least one AAV ITR is selected from the group consisting of AAV ITRs are AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, AAV-HSC16, a goat AAV, bovine AAV, or mouse AAV or the like. In some embodiments, the encapsidation protein is an AAV2 encapsidation protein.

Described herein, are method for generating rAAV vectors, comprising: providing cells with nucleic acids comprising a payload of interest; and culturing the cells in a growth medium comprising cytosine or a derivative thereof to generate the rAAV vectors of the disclosure to generate the recombinant AAV vector comprising methylation of at least about 30% of CpG dinucleotides. In some embodiments, the recombinant AAV vector comprises methylation of at least about 35% of CpG dinucleotides. In some embodiments, the recombinant AAV vector comprises methylation of at least about 40% of CpG dinucleotides. In some embodiments, the recombinant AAV vector comprises methylation of at least about 45% of CpG dinucleotides. In some embodiments, the recombinant AAV vector comprises methylation of at least about 50% of CpG dinucleotides. In some embodiments, the recombinant AAV vector comprises methylation of at least about 60% of CpG dinucleotides. In some embodiments, the recombinant AAV vector comprises methylation of at least about 70% of CpG dinucleotides. In some embodiments, the recombinant AAV vector comprises methylation of at least about 80% of CpG dinucleotides. In some embodiments, the recombinant AAV vector comprises methylation of at least about 90% of CpG dinucleotides.

Pharmaceutical Compositions

Described herein, in some embodiments, area pharmaceutical compositions comprising: a recombinant AAV vector comprising a payload of interest; a plurality of helper polynucleotides comprising reduced CpG dinucleotides; and a pharmaceutically acceptable excipient. Further described herein, in some embodiments, are pharmaceutical compositions comprising: a recombinant AAV vector comprising a payload of interest; a plurality of helper polynucleotides comprising increased methylation of CpG dinucleotides; and a pharmaceutically acceptable excipient. Further described herein, in some embodiments, are pharmaceutical compositions having less than about 50% (e.g., less than about 49%, 48%, 47%, 46%, 45%, 40%, 35%, 30% 25%, 20%, 15%, 10%, or 5%) CpG dinucleotides, the pharmaceutical compositions comprising a recombinant AAV vector comprising a payload of interest; a plurality of helper polynucleotides; and a pharmaceutically acceptable excipient, wherein the pharmaceutical compositions comprises less than about 50% CpG dinucleotides A composition or a medicament of the disclosure is in a form suitable for administration to an individual in need thereof.

According to a particular embodiment, the pharmaceutically acceptable excipient compositions of the disclosure are suitably selected from the group consisting of an injectable excipient liquid such as sterile water for injection; and an aqueous solution such as saline.

Acceptable excipients are physiologically acceptable to the administered subject and retain the therapeutic properties of the compounds with/in which it is administered. Acceptable excipients and their formulations are and generally described in, for example, Remington's Pharmaceutical Sciences, supra. One exemplary excipient is physiological saline. The phrase "pharmaceutically acceptable excipient" as used herein means a pharmaceutically acceptable material, composition or vehicle, such as a liquid or solid filler, diluent, excipient, solvent or encapsulating material, involved in carrying or transporting the subject compounds from the administration site of one organ, or portion of the body, to another organ, or portion of the body, or in an in vitro assay system. Each excipient is acceptable in the sense of being compatible with the other ingredients of the formulation and not injurious to a subject to whom it is administered. Nor should an acceptable excipient alter the specific activity of the subject compounds.

In another embodiment, pharmaceutical compositions disclosed herein further comprise an acceptable additive to improve the stability of the compounds in composition and/or to control the release rate of the compositions. Acceptable additives do not alter the specific activity of the subject compounds. Exemplary acceptable additives include, but are not limited to, a sugar such as mannitol, sorbitol, glucose, xylitol, trehalose, sorbose, sucrose, galactose, dextran, dextrose, fructose, lactose, and mixtures thereof. Acceptable additives are combined with acceptable carriers and/or excipients such as dextrose in some embodiments. Alternatively, exemplary acceptable additives include, but are not limited to, a surfactant such as polysorbate 20 or polysorbate 80 to increase stability of the peptide and decrease gelling of the solution. In some embodiments, the surfactant is added to the composition in an amount of 0.01% to 5% of the solution. Addition of such acceptable additives increases the stability and half-life of the composition in storage.

Suspensions, lyophilized, and crystal forms of nucleic acids or compositions herein are also contemplated herein; methods to make suspensions, lyophilizations, and crystal forms are known to one of skill in the art.

In some embodiments, pharmaceutical compositions disclosed herein are sterile. In some embodiments, pharmaceutical compositions disclosed herein are sterilized by conventional, well known sterilization techniques. For example, sterilization is readily accomplished by filtration through sterile filtration membranes. In some embodiments, the resulting solution is packaged for use or filtered under aseptic conditions and lyophilized, the lyophilized preparation being combined with a sterile solution prior to administration.

Freeze-drying is employed to stabilize polypeptides for long-term storage, such as when a polypeptide is relatively unstable in liquid compositions, in some embodiments.

In some embodiments, some excipients such as, for example, polyols (including mannitol, sorbitol, and glycerol); sugars (including glucose and sucrose); and amino acids (including alanine, glycine, and glutamic acid), act as stabilizers for freeze-dried products. Polyols and sugars are also used to protect polypeptides from freezing and drying-induced damage and to enhance the stability during storage in the dried state in some embodiments. Sugars are, in some embodiments, effective in both the freeze-drying process and during storage. Other classes of molecules, including mono- and disaccharides and polymers such as PVP, have also been reported as stabilizers of lyophilized products.

For injection, in some embodiments, pharmaceutical compositions disclosed herein are in a powder suitable for reconstitution with an appropriate solution as described above. Examples of these include, but are not limited to, freeze dried, rotary dried or spray dried powders, amorphous powders, granules, precipitates, or particulates. For injection, the compositions optionally contain stabilizers, pH modifiers, surfactants, bioavailability modifiers and combinations of these.

Sustained-release preparations are prepared in some embodiments. Suitable examples of sustained-release preparations include semipermeable matrices of solid hydrophobic polymers containing pharmaceutical compositions herein, which matrices are in the form of shaped articles, e.g., films, or microcapsule. Examples of sustained-release matrices include polyesters, hydrogels (for example, poly (2-hydroxyethyl-methacrylate), or poly(vinylalcohol)), polylactides (see, e.g., U.S. Pat. No. 3,773,919), copolymers of L-glutamic acid and y ethyl-L-glutamate, non-degradable ethylene-vinyl acetate, degradable lactic acid-glycolic acid copolymers such as the Lupron Depot™ (injectable microspheres composed of lactic acid-glycolic acid copolymer and leuprolide acetate), and poly-D-(−)-3-hydroxybutyric acid. While polymers such as ethylene-vinyl acetate and lactic acid-glycolic acid enable release of molecules for over 100 days, certain hydrogels release proteins for shorter time periods.

In some embodiments, pharmaceutical compositions disclosed herein are designed to be short-acting, fast-releasing, long-acting, or sustained-releasing as described herein. In one embodiment, pharmaceutical compositions disclosed herein are formulated for controlled release or for slow release.

In some embodiments, the pharmaceutical compositions are comprised in a container, pack, or dispenser together with instructions for administration.

In some embodiments, the pharmaceutical composition comprises less than about 50% (e.g., less than about 49%, 48%, 47%, 46%, 45%, 40%, 35%, 30% 25%, 20%, 15%, 10%, or 5%) CpG dinucleotides. In some embodiments, the pharmaceutical composition comprises less than about 49% CpG dinucleotides. In some embodiments, the pharmaceutical composition comprises less than about 48% CpG dinucleotides. In some embodiments, the pharmaceutical composition comprises less than about 47% CpG dinucleotides. In some embodiments, the pharmaceutical composition comprises less than about 46% CpG dinucleotides. In some embodiments, the pharmaceutical composition comprises less than about 45% CpG dinucleotides. In some embodiments, the pharmaceutical composition comprises less than about 40% CpG dinucleotides. In some embodiments, the pharmaceutical composition comprises less than about 35% CpG dinucleotides. In some embodiments, the pharmaceutical composition comprises less than about 30% CpG dinucleotides. In some embodiments, the pharmaceutical composition comprises less than about 25% CpG dinucleotides. In some embodiments, the pharmaceutical composition comprises less than about 20% CpG dinucleotides. In some embodiments, the pharmaceutical composition comprises less than about 15% CpG dinucleotides. In some embodiments, the pharmaceutical composition comprises less than about 10% CpG dinucleotides. In some embodiments, the pharmaceutical composition comprises less than about 5% CpG dinucleotides.

In some embodiments, the pharmaceutical composition comprises a recombinant AAV vector, in which the recombinant AAV vector comprises less than about 50% (e.g., less than about 49%, 48%, 47%, 46%, 45%, 40%, 35%, 30% 25%, 20%, 15%, 10%, or 5%) CpG dinucleotides. In some embodiments, the recombinant AAV vector comprises less than about 49% CpG dinucleotides. In some embodiments, the recombinant AAV vector comprises less than about 48% CpG dinucleotides. In some embodiments, the recombinant AAV vector comprises less than about 47% CpG dinucleotides. In some embodiments, the recombinant AAV vector comprises less than about 46% CpG dinucleotides. In some embodiments, the recombinant AAV vector comprises less than about 45% CpG dinucleotides. In some embodiments, the recombinant AAV vector comprises less than about 40% CpG dinucleotides. In some embodiments, the recombinant AAV vector comprises less than about 35% CpG dinucleotides. In some embodiments, the recombinant AAV vector comprises less than about 30% CpG dinucleotides. In some embodiments, the recombinant AAV vector comprises less than about 25% CpG dinucleotides. In some embodiments, the recombinant AAV vector comprises less than about 20% CpG dinucleotides. In some embodiments, the recombinant AAV vector comprises less than about 15% CpG dinucleotides. In some embodiments, the recombinant AAV vector comprises less than about 10% CpG dinucleotides. In some embodiments, the recombinant AAV vector comprises less than about 5% CpG dinucleotides.

Described herein, are pharmaceutical compositions comprising a plurality of helper polynucleotides comprising reduced CpG dinucleotides. In some embodiments, the plurality of helper polynucleotides comprise less than about 50% (e.g., less than about 49%, 48%, 47%, 46%, 45%, 40%, 35%, 30% 25%, 20%, 15%, 10%, or 5%) CpG dinucleotides. In some embodiments, the plurality of helper polynucleotides comprise less than about 49% CpG dinucleotides. In some embodiments, the plurality of helper polynucleotides comprise less than about 48% CpG dinucleotides. In some embodiments, the plurality of helper polynucleotides comprise less than about 47% CpG dinucleotides. In some embodiments, the plurality of helper polynucleotides comprise less than about 46% CpG dinucleotides. In some embodiments, the plurality of helper polynucleotides comprise less than about 45% CpG dinucleotides. In some embodiments, the plurality of helper polynucleotides comprise less than about 40% CpG dinucleotides. In some embodiments, the plurality of helper polynucleotides comprise less than about 35% CpG dinucleotides. In some embodiments, the plurality of helper polynucleotides comprise less than about 30% CpG dinucleotides. In some embodiments, the plurality of helper polynucleotides comprise less than about 25% CpG dinucleotides. In some embodiments, the plurality of helper polynucleotides comprise less than about 20% CpG dinucleotides. In some embodiments, the plurality of helper polynucleotides comprise less than about 15% CpG dinucleotides. In some embodiments, the plurality of helper polynucleotides comprise less than about 10% CpG dinucleotides. In some embodiments, the plurality of helper polynucleotides comprise less than about 5% CpG dinucleotides.

In some embodiments, the plurality of helper polynucleotides comprises reduced CpG dinucleotides as compared to a parental equivalent. In some embodiments, the CpG dinucleotides are reduced by at least about 5%, 10%, 15%, 20%, 25%, 30%, 35%, 40%, 45%, 50%, 55%, 60%, 65%, 70%, 75%, 80%, 85%, 90%, 95%, or more than 95% as compared to a parental equivalent. In some embodiments, the CpG dinucleotides are reduced in a range of about 5% to about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 10% to about 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 15% to about 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 20% to about 25%, 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 25% to about 30%, 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 30% to about 35%, 40%, 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 40% to about 45%, 50%, 55%, 60%, 65%, 70%, 75%, 80%, 85%, 90%, 95%, 96%, 97%, 98%, 99%, or 100%. In some embodiments, the CpG dinucleotides are reduced in a range of about 50% to about 55%, 60%, 65%, 70%, 75%, 80%, 85%, 90%, 95%, 96%, 97%, 98%, 99%, or 100%. In some embodiments, the CpG dinucleotides are reduced in a range of about 60% to about 65%, 70%, 75%, 80%, 85%, 90%, 95%, 96%, 97%, 98%, 99%, or 100%. In some embodiments, the CpG dinucleotides are reduced in a range of about 70% to about 75%, 80%, 85%, 90%, 95%, 96%, 97%, 98%, 99%, or 100%. In some embodiments, the CpG dinucleotides are reduced in a range of about 80% to about 85%, 90%, 95%, 96%, 97%, 98%, 99%, or 100%. In some embodiments, the CpG dinucleotides are reduced in a range of about 90% to about 95%, 96%, 97%, 98%, 99%, or 100%. In some embodiments, the CpG dinucleotides are reduced by at least about 50%. In some embodiments, the CpG dinucleotides are reduced by at least about 75%.

In some embodiments, the plurality of helper polynucleotides comprises increased methylation of CpG dinucleotides as compared to a parental equivalent. In some embodiments, the methylation of CpG dinucleotides is increased by at least about 5%, 10%, 15%, 20%, 25%, 30%, 35%, 40%, 45%, 50%, 55%, 60%, 65%, 70%, 75%, 80%, 85%, 90%, 95%, or more than 95% as compared to a parental equivalent. In some embodiments, the number of CpG dinucleotides is increased in a range of about 5% to about 10%, 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 10% to about 15%, 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 15% to about 20%, 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 20% to about 25%, 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 25% to about 30%, 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 30% to about 35%, 40%, 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 40% to about 45%, 50%, 55%, 60%, 65%, 70%, 75%, 80%, 85%, 90%, 95%, 96%, 97%, 98%, 99%, or 100%. In some embodiments, the number of CpG dinucleotides is increased in a range of about 50% to about 55%, 60%, 65%, 70%, 75%, 80%, 85%, 90%, 95%, 96%, 97%, 98%, 99%, or 100%. In some embodiments, the number of CpG dinucleotides is increased in a range of about 60% to about 65%, 70%, 75%, 80%, 85%, 90%, 95%, 96%, 97%, 98%, 99%, or 100%. In some embodiments, the number of CpG dinucleotides is increased in a range of about 70% to about 75%, 80%, 85%, 90%, 95%, 96%, 97%, 98%, 99%, or 100%. In some embodiments, the number of CpG dinucleotides is increased in a range of about 80% to about 85%, 90%, 95%, 96%, 97%, 98%, 99%, or 100%. In some embodiments, the number of CpG dinucleotides is increased in a range of about 90% to about 95%, 96%, 97%, 98%, 99%, or 100%.

In some embodiments, the helper polynucleotide comprises a promoter, an enhancer, an intron, a microRNA, a linker, a splicing element, a polyA signal sequence, or combinations thereof. In some embodiments, the promoter is the CMV promoter or a derivative thereof. In some embodiments, the promoter is the CBA promoter or a derivative thereof. In some embodiments, the promoter is the EF1a promoter or a derivative thereof. In some embodiments, the promoter is the CAG promoter or a derivative thereof. In some embodiments, the promoter is the PGK promoter or a derivative thereof. In some embodiments, the promoter is the TRE promoter or a derivative thereof. In some embodiments, the promoter is the U6 promoter or a derivative thereof. In some embodiments, the promoter is the UAS promoter or a derivative thereof. In some embodiments, the promoter is the T7 promoter or a derivative thereof. In some embodiments, the promoter is the Sp6 promoter or a derivative thereof. In some embodiments, the promoter is the lac promoter or a derivative thereof. In some embodiments, the promoter is the araBad promoter or a derivative thereof. In some embodiments, the promoter is the trp promoter or a derivative thereof. In some embodiments, the promoter is the Ptac promoter or a derivative thereof. In some embodiments, the promoter is the p5 promoter or a derivative thereof. In some embodiments, the promoter is the p19 promoter or a derivative thereof. In some embodiments, the promoter is the p40 promoter or a derivative thereof. In some embodiments, the promoter is the Synapsin promoter or a derivative thereof. In some embodiments, the promoter is the CaMKII promoter or a derivative thereof. In some embodiments, the promoter is the GRK1 promoter or a derivative thereof. In some embodiments, the promoter is a mini promoter or a derivative thereof. In some embodiments, the promoter is an inducible promoter or a derivative thereof.

In some embodiments, the helper polynucleotide comprises a prokaryotic helper polynucleotide. In some embodiments, the helper polynucleotide comprises a eukaryotic helper polynucleotide. In some embodiments, the helper polynucleotide is comprised of a eukaryotic helper polynucleotide and prokaryotic helper polynucleotide.

In some embodiments, the helper polynucleotide comprises one or more components derived from a yeast (e.g., an autonomous replication sequence, centromere, or telomere). In some embodiments, the helper polynucleotide comprises one or more components derived from a plant (e.g., virA, virB, virD, virG, or virE).

In some embodiments, the helper polynucleotide comprises one or more components (e.g., promoter, Rep, Cap) derived from a virus. In some embodiments, the virus is an alphavirus, a parvovirus, an adenovirus, an AAV, a baculovirus, a Dengue virus, a lentivirus, a herpesvirus, a poxvirus, an anellovirus, a bocavirus, a vaccinia virus, or a retrovirus. In some embodiments, the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof. In some embodiments, the herpesvirus is HSV type 1, HSV-2, VZV, EBV, CMV, HHV-6, HHV-7, or HHV-8. In some embodiments, the virus is an alphavirus. In some embodiments, the virus is a parvovirus. In some embodiments, the virus is an adenovirus. In some embodiments, the virus is an AAV. In some embodiments, the virus is a baculovirus. In some embodiments, the virus is a Dengue virus. In some embodiments, the virus is a lentivirus. In some embodiments, the virus is a herpesvirus. In some embodiments, the virus is a poxvirus. In some embodiments, the virus is an anellovirus. In some embodiments, the virus is a bocavirus. In some embodiments, the virus is a vaccinia virus. In some embodiments, the virus is a retrovirus.

In some embodiments, the virus is AAV1 or a derivative thereof. In some embodiments, the virus is AAV2 or a derivative thereof. In some embodiments, the virus is AAV3 or a derivative thereof. In some embodiments, the virus is AAV4 or a derivative thereof. In some embodiments, the virus is AAV5 or a derivative thereof. In some embodiments, the virus is AAV6 or a derivative thereof. In some embodiments, the virus is AAV7 or a derivative thereof. In some embodiments, the virus is AAV8 or a derivative thereof. In some embodiments, the virus is AAV9 or a derivative thereof. In some embodiments, the virus is AAV10 or a derivative thereof. In some embodiments, the virus is AAV11 or a derivative thereof. In some embodiments, the virus is AAV12 or a derivative thereof. In some embodiments, the virus is AAV13 or a derivative thereof. In some embodiments, the virus is AAV14 or a derivative thereof. In some embodiments, the virus is AAV15 or a derivative thereof. In some embodiments, the virus is AAV16 or a derivative thereof. In some embodiments, the virus is AAV-rh8 or a derivative thereof. In some embodiments, the virus is AAV-rh10 or a derivative thereof. In some embodiments, the virus is AAV-rh20 or a derivative thereof. In some embodiments, the virus is AAV-rh39 or a derivative thereof. In some embodiments, the virus is AAV-rh74 or a derivative thereof. In some embodiments, the virus is AAV-rhM4-1 or a derivative thereof. In some embodiments, the virus is AAV-hu37 or a derivative thereof. In some embodiments, the virus is AAV-Anc80 or a derivative thereof. In some embodiments, the virus is AAV-Anc80L65 or a derivative thereof. In some embodiments, the virus is AAV-7m8 or a derivative thereof. In some embodiments, the virus is AAV-PHP-B or a derivative thereof. In some embodiments, the virus is AAV-PHP-EB or a derivative thereof. In some embodiments, the virus is AAV-2.5 or a derivative thereof. In some embodiments, the virus is AAV-2tYF or a derivative thereof. In some embodiments, the virus is AAV-3B or a derivative thereof. In some embodiments, the virus is AAV-LK03 or a derivative thereof. In some embodiments, the virus is AAV-HSC1 or a derivative thereof. In some embodiments, the virus is AAV-HSC2 or a derivative thereof. In some embodiments, the virus is AAV-HSC3 or a derivative thereof. In some embodiments, the virus is AAV-HSC4 or a derivative thereof. In some embodiments, the virus is AAV-HSC5 or a derivative thereof. In some embodiments, the virus is AAV-HSC6 or a derivative thereof. In some embodiments, the virus is AAV-HSC7 or a derivative thereof. In some embodiments, the virus is AAV-HSC8 or a derivative thereof. In some embodiments, the virus is AAV-HSC9 or a derivative thereof. In some embodiments, the virus is AAV-HSC10 or a derivative thereof. In some embodiments, the virus is AAV-HSC11 or a derivative thereof. In some embodiments, the virus is AAV-HSC12 or a derivative thereof. In some embodiments, the virus is AAV-HSC13 or a derivative thereof. In some embodiments, the virus is AAV-HSC14 or a derivative thereof. In some embodiments, the virus is AAV-HSC15 or a derivative thereof. In some embodiments, the virus is AAV-TT or a derivative thereof. In some embodiments, the virus is AAV-DJ/8 or a derivative thereof. In some embodiments, the virus is AAV-Myo or a derivative thereof. In some embodiments, the virus is AAV-NP40 or a derivative thereof. In some embodiments, the virus is AAV-NP59 or a derivative thereof. In some embodiments, the virus is AAV-NP22 or a derivative thereof. In some embodiments, the virus is AAV-NP66 or a derivative thereof. In some embodiments, the virus is AAV-HSC16 or a derivative thereof.

In some embodiments, the virus is HSV-1 or a derivative thereof. In some embodiments, the virus is HSV-2 or a derivative thereof. In some embodiments, the virus is VZV or a derivative thereof. In some embodiments, the virus is EBV or a derivative thereof. In some embodiments, the virus is CMV or a derivative thereof. In some embodiments, the virus is HHV-6 or a derivative thereof. In some embodiments, the virus is HHV-7 or a derivative thereof. In some embodiments, the virus is HHV-8 or a derivative thereof.

In some embodiments, the adenovirus or AAV helper polynucleotide is selected from the group consisting of: Rep, Cap, E1A, E1B, E4, E2A, and VA RNA. For example, in some embodiments, the adenovirus or AAV helper polynucleotide is Rep. In some embodiments, the adenovirus or AAV helper polynucleotide is Cap. In some embodiments, the adenovirus or AAV helper polynucleotide is E1A. In some embodiments, the adenovirus or AAV helper polynucleotide is E1B. In some embodiments, the adenovirus or AAV helper polynucleotide is E4. In some embodiments, the adenovirus or AAV helper polynucleotide is E2A. In some embodiments, the adenovirus or AAV helper polynucleotide is VA RNA.

In some embodiments, the lentiviral helper polynucleotides are selected from the group consisting of: Gag, Pol, Tat, Rev, Env, and VSV-G. For example, in some embodiments, the lentiviral helper polynucleotide is Gag. In some embodiments, the lentiviral helper polynucleotide is Pol. In some embodiments, the lentiviral helper polynucleotide is Tat. In some embodiments, the lentiviral helper polynucleotide is Rev. In some embodiments, the lentiviral helper polynucleotide is Env. In some embodiments, the lentiviral helper polynucleotide is VSV-G.

Described herein are pharmaceutical compositions comprising: a recombinant AAV vector comprising a payload of interest; and a plurality of helper polynucleotides, wherein the helper polynucleotide comprises a backbone polynucleotide comprising reduced CpG dinucleotides as compared to a parental equivalent. In some embodiments, the backbone polynucleotide comprises increased methylation of CpG dinucleotides as compared to a parental equivalent. In some embodiments, the backbone polynucleotide comprises reduced CpG dinucleotides and increased methylation of CpG dinucleotides as compared to a parental equivalent.

In some embodiments, the backbone polynucleotide comprises an antibiotic resistance gene, an origin of replication, an open reading frame, or combinations thereof. In some embodiments, the backbone polynucleotide comprises an antibiotic resistance gene, an origin of replication, and an open reading frame.

In some embodiments, the backbone polynucleotide comprises an antibiotic resistance gene. In some embodiments, the antibiotic resistance gene encodes an aminoglycoside, a beta-lactam, a glycopeptide, a macrolide, a polypeptide, a tetracycline, or a derivative thereof. In some embodiments, the antibiotic resistance gene encodes an aminoglycoside or a derivative thereof. In some embodiments, the antibiotic resistance gene encodes a beta-lactam or a derivative thereof. In some embodiments, the antibiotic resistance gene encodes a glycopeptide or a derivative thereof. In some embodiments, the antibiotic resistance gene encodes a macrolide or a derivative thereof. In some embodiments, the antibiotic resistance gene encodes a polypeptide or a derivative thereof. In some embodiments, the antibiotic resistance gene encodes a tetracycline or a derivative thereof.

In some embodiments, the antibiotic resistance gene encodes kanamycin, spectinomycin, streptomycin, ampicillin, carbenicillin, bleomycin, erythromycin, polymyxin B, tetracycline, chloramphenicol, neomycin, zeocin, or a derivative thereof. In some embodiments, the antibiotic resistance gene encodes kanamycin.

In some embodiments, the kanamycin comprises a nucleotide sequence having at least 70% (e.g., 75%, 80%, 90%, 95%, 97%, 98%, or 99%) sequence identity to the nucleic acid sequence of SEQ ID NOs: 9 or 12. In some embodiments, the kanamycin comprises a nucleotide sequence having at least 75% sequence identity to the nucleic acid sequence of SEQ ID NOs: 9 or 12. In some embodiments, the kanamycin comprises a nucleotide sequence having at least 80% sequence identity to the nucleic acid sequence of SEQ ID NOs: 9 or 12. In some embodiments, the kanamycin comprises a nucleotide sequence having at least 90% sequence identity to the nucleic acid sequence of SEQ ID NOs: 9 or 12. In some embodiments, the kanamycin comprises a nucleotide sequence having at least 95% sequence identity to the nucleic acid sequence of SEQ ID NOs: 9 or 12. In some embodiments, the kanamycin comprises a nucleotide sequence having at least 97% sequence identity to the nucleic acid sequence of SEQ ID NOs: 9 or 12. In some embodiments, the kanamycin comprises a nucleotide sequence having at least 98% sequence identity to the nucleic acid sequence of SEQ ID NOs: 9 or 12. In some embodiments, the kanamycin comprises a nucleotide sequence having at least 99% sequence identity to the nucleic acid sequence of SEQ ID NOs: 9 or 12. In some embodiments, the kanamycin comprises a nucleotide sequence having the nucleic acid sequence of SEQ ID NOs: 9 or 12.

In some embodiments, the backbone polynucleotide comprises an origin of replication. In some embodiments, the origin of replication is pMB1, pBR322, ColE1, R6K, p15A, pSC101, ColE2, F1, pUC, combinations or a derivative thereof. In some embodiments, the origin of replication is pMB1 or a derivative thereof. In some embodiments, the origin of replication is pBR322 or a derivative thereof. In some embodiments, the origin of replication is ColE1 or a derivative thereof. In some embodiments, the origin of replication is R6K or a derivative thereof. In some embodiments, the origin of replication is p15A or a derivative thereof. In some embodiments, the origin of replication is pSC101 or a derivative thereof. In some embodiments, the origin of replication is ColE2 or a derivative thereof. In some embodiments, the origin of replication is F1 or a derivative thereof. In some embodiments, the origin of replication is pUC or a derivative thereof.

In some embodiments, a helper polynucleotide of the disclosure comprise a woodchuck hepatitis virus post-transcriptional element.

Nucleic acids described herein, in some embodiments, contain a reporter sequence for co-expression, such as but not limited to lacZ, GFP, CFP, YFP, RFP, mCherry, mCardinal, RLuc, FLuc, NanoLuc Luciferase and tdTomato. In some embodiments, the vector comprises a selectable marker.

Described herein, in some embodiments, are nucleic acids comprising a helper polynucleotide, wherein any two or more helper polynucleotides of the disclosure is provided in the same plasmid or in different plasmids (e.g., a packaging plasmid, a transfer plasmid, or a helper plasmid).

EXAMPLES

Below are examples of specific embodiments for carrying out the present disclosure. The examples are offered for illustrative purposes only and are not intended to limit the scope of the present disclosure in any way. Efforts have been made to ensure accuracy with respect to numbers used (e.g., amounts, temperatures, etc.), but some experimental error and deviation should, of course, be allowed for.

Example 1. Reduction of CpG Content in a rAAV

This example demonstrates how the CpG content of genes in a rAAV, a backbone polynucleotide, and helper polynucleotide is reduced.

First, every CpG present in the nucleotide sequence of wildtype AAV Rep, AAV Cap and the Kanamycin resistance (KanR) genes (Table 2) were identified on an exemplary plasmid pRep_Cap_KanR.

TABLE 2

Sequences for CpG Reduction or Methylation

| Name | Sequence | SEQ ID NO. |
|---|---|---|
| AAV Rep gene | ATGCCGGGGTTTTACGAGATTGTGATTAAGGTCCCCAGCGA CCTTGACGAGCATCTGCCCGGCATTTCTGACAGCTTTGTGAA CTGGGTGGCCGAGAAGGAATGGGAGTTGCCGCCAGATTCTG ACATGGATCTGAATCTGATTGAGCAGGCACCCCTGACCGTG GCCGAGAAGCTGCAGCGCGACTTTCTGACGGAATGGCGCCG TGTGAGTAAGGCCCCGGAGGCcCTTTTCTTTGTGCAATTTGA GAAGGGAGAGAGCTACTTCCACATGCACGTGCTCGTGGAAA CCACCGGGGTGAAATCCATGGTTTTGGGACGTTTCCTGAGT CAGATTCGCGAAAAACTGATTCAGAGAATTTACCGCGGGAT CGAGCCGACTTTGCCAAACTGGTTCGCGGTCACAAAGACCA GAAATGGCGCCGGAGGCGGGAACAAGGTGGTGGATGAGTG CTACATCCCCAATTACTTGCTCCCCAAAACCCAGCCTGAGCT CCAGTGGGCGTGGACTAATATGGAACAGTATTTAAGCGCCT GTTTGAATCTCACGGAGCGTAAACGGTTGGTGGCGCAGCAT CTGACGCACGTGTCGCAGACGCAGGAGCAGAACAAAGAGA ATCAGAATCCCAATTCTGATGCGCCGGTGATCAGATCAAAA ACTTCAGCCAGGTACATGGAGCTGGTCGGGTGGCTCGTGGA CAAGGGGATTACCTCGGAGAAGCAGTGGATCCAGGAGGAC CAGGCCTCATACATCTCCTTCAATGCGGCCTCCAACTCGCGG TCCCAAATCAAGGCTGCCTTGGACAATGCGGGAAAGATTAT GAGCCTGACTAAAACCGCCCCCGACTACCTGGTGGGCCAGC AGCCCGTGGAGGACATTTCCAGCAATCGGATTTATAAAATT TTGGAACTAAACGGGTACGATCCCCAATATGCGGCTTCCGT CTTTCTGGGATGGGCCACGAAAAAGTTCGGCAAGAGGAACA CCATCTGGCTGTTTGGGCCTGCAACTACCGGGAAGACCAAC | 7 |

TABLE 2-continued

Sequences for CpG Reduction or Methylation

| Name | Sequence | SEQ ID NO. |
|---|---|---|
| | ATCGCGGAGGCCATAGCCCACACTGTGCCCTTCTACGGGTG<br>CGTAAACTGGACCAATGAGAACTTTCCCTTCAACGACTGTG<br>TCGACAAGATGGTGATCTGGTGGGAGGAGGGGAAGATGAC<br>CGCCAAGGTCGTGGAGTCGGCCAAAGCCATTCTCGGAGGAA<br>GCAAGGTGCGCGTGGACCAGAAATGCAAGTCCTCGGCCCAG<br>ATAGACCCGACTCCCGTGATCGTCACCTCCAACACCAACAT<br>GTGCGCCGTGATTGACGGGAACTCAACGACCTTCGAACACC<br>AGCAGCCGTTGCAAGACCGGATGTTCAAATTTGAACTCACC<br>CGCCGTCTGGATCATGACTTTGGGAAGGTCACCAAGCAGGA<br>AGTCAAAGACTTTTTCCGGTGGGCAAAGGATCACGTGGTTG<br>AGGTGGAGCATGAATTCTACGTCAAAAAGGGTGGAGCCAA<br>GAAAAGACCCGCCCCCAGTGACGCAGATATAAGTGAGCCC<br>AAACGGGTGCGCGAGTCAGTTGCGCAGCCATCGACGTCAGA<br>CGCGGAAGCTTCGATCAACTACGCGGACAGGTACCAAAACA<br>AATGTTCTCGTCACGTGGGCATGAATCTGATGCTGTTTCCCT<br>GCAGACAATGCGAGAGACTGAATCAGAATTCAAATATCTGC<br>TTCACTCACGGTGTCAAAGACTGTTTAGAGTGCTTTCCCGTG<br>TCAGAATCTCAACCCGTTTCTGTCGTCAAAAAGGCGTATCA<br>GAAACTGTGCTACATTCATCACATCATGGGAAAGGTGCCAG<br>ACGCTTGCACTGCTTGCGACCTGGTCAATGTGGACTTGGAT<br>GACTGTGTTTCTGAACAATAA | |
| AAV Cap gene | ATGGCTGCCGATGGTTATCTTCCAGATTGGCTCGAGGACAA<br>CCTTAGTGAAGGAATTCGCGAGTGGTGGGCTTTGAAACCTG<br>GAGCCCCTCAACCCAAGGCAAATCAACAACATCAAGACAA<br>CGCTCGAGGTCTTGTGCTTCCGGGTTACAAATACCTTGGACC<br>CGGCAACGGACTCGACAAGGGGGAGCCGGTCAACGCAGCA<br>GACGCGGCGGCCCTCGAGCACGACAAGGCCTACGACCAGC<br>AGCTCAAGGCGGAGACAACCCGTACCTCAAGTACAACCAC<br>GCCGACGCCGAGTTCCAGGAGCGGCTCAAAGAAGATACGTC<br>TTTTGGGGGCAACCTCGGGCGAGCAGTCTTCCAGGCCAAAA<br>AGAGGCTTCTTGAACCTCTTGGTCTGGTTGAGGAAGCGGCT<br>AAGACGGCTCCTGGAAAGAAGAGGCCTGTAGAGCAGTCTCC<br>TCAGGAACCGGACTCCTCCGCGGGTATTGGCAAATCGGGTG<br>CACAGCCCGCTAAAAAGAGACTCAATTTCGGTCAGACTGGC<br>GACACAGAGTCAGTCCCAGACCCTCAACCAATCGGAGAACC<br>TCCCGCAGCCCCCTCAGGTGTGGGATCTCTTACAATGGCTTC<br>AGGTGGTGGCGCACCAGTGGCAGACAATAACGAAGGTGCC<br>GATGGAGTGGGTAGTTCCTGGGAAATTGGCATTGCGATTC<br>CCAATGGCTGGGGGACAGAGTCATCACCACCAGCACCCGAA<br>CCTGGGCCCTGCCCACCTACAACAATCACCTCTACAAGCAA<br>ATCTCCAACAGCACATCTGGAGGATCTTCAAATGACAACGC<br>CTACTTCGGCTACAGCACCCCCTGGGGGTATTTTGACTTCAA<br>CAGATTCCACTGCCACTTCTCACCACGTGACTGGCAGCGAC<br>TCATCAACAACAACTGGGGATTCCGGCCTAAGCGACTCAAC<br>TTCAAGCTCTTCAACATTCAGGTCAAAGAGGTTACGGACAA<br>CAATGGAGTCAAGACCATCGCCAATAACCTTACCAGCACGG<br>TCCAGGTCTTCACGGACTCAGACTATCAGCTCCCGTACGTGC<br>TCGGGTCGGCTCACGAGGGCTGCCTCCCGCCGTTCCCAGCG<br>GACGTTTTCATGATTCCTCAGTACGGGTATCTGACGCTTAAT<br>GATGGAAGCCAGGCCGTGGGTCGTTCGTCCTTTTACTGCCTG<br>GAATATTTCCCGTCGCAAATGCTAAGAACGGGTAACAACTT<br>CCAGTTCAGCTACGAGTTTGAGAACGTACCTTTCCATAGCA<br>GCTACGCTCACAGCCAAAGCCTGGACCGACTAATGAATCCA<br>CTCATCGACCAATACTTGTACTATCTCTCAAAGACTATTAAC<br>GGTTCTGGACAGAATCAACAAACGCTAAAATTCAGTGTGGC<br>CGGACCCAGCAACATGGCTGTCCAGGGAAGAAACTACATAC<br>CTGGACCCAGCTACCGACAACAACGTGTCTCAACCACTGTG<br>ACTCAAAACAACAACAGCGAATTTGCTTGGCCTGGAGCTTC<br>TTCTTGGGCTCTCAATGGACGTAATAGCTTGATGAATCCTGG<br>ACCTGCTATGGCCAGCCACAAAGAAGGAGAGGACCGTTTCT<br>TTCCTTTGTCTGGATCTTTAATTTTTGGCAAACAAGGAACTG<br>GAAGAGACAACGTGGATGCGGACAAAGTCATGATAACCAA<br>CGAAGAAGAAATTAAAACTACTAACCCGGTAGCAACGGAG<br>TCCTATGGACAAGTGGCCACAAACCACCAGAGTGCCCAAGC<br>ACAGGCGCAGACCGGCTGGGTTCAAAACCAAGGAATACTTC<br>CGGGTATGGTTTGGCAGGACAGAGATGTGTACCTGCAAGGA<br>CCCATTTGGGCCAAAATTCCTCACACGGACGGCAACTTTCA<br>CCCTTCTCCGCTGATGGGAGGGTTTGGAATGAAGCACCCGC<br>CTCCTCAGATCCTCATCAAAAACACACCTGTACCTGCGGAT<br>CCTCCAACGGCCTTCAACAAGGACAAGCTGAACTCTTTCAT<br>CACCCAGTATTCTACTGGCCAAGTCAGCGTGGAGATCGAGT<br>GGGAGCTGCAGAAGGAAAACAGCAAGCGCTGGAACCCCGGA<br>GATCCAGTACACTTCCAACTATTACAAGTCTAATAATGTTGA | 8 |

TABLE 2-continued

Sequences for CpG Reduction or Methylation

| Name | Sequence | SEQ ID NO. |
|---|---|---|
| | ATTTGCTGTTAATACTGAAGGTGTATATAGTGAACCCCGCCC<br>CATTGGCACCAGATACCTGACTCGTAATCTGTAA | |
| Kanamycin resistance gene | TCAGAAGAACTCGTCAAGAAGGCGATAGAAGGCGATGCGC<br>TGCGAATCGGGAGCGGCGATACCGTAAAGCACGAGGAAGC<br>GGTCAGCCCATTCGCCGCCAAGCTCTTCAGCAATATCACGG<br>GTAGCCAACGCTATGTCCTGATAGCGGTCCGCCACACCCAG<br>CCGGCCACAGTCGATGAATCCAGAAAAGCGGCCATTTTCCA<br>CCATGATATTCGGCAAGCAGGCATCGCCATGGGTCACGACG<br>AGATCCTCGCCGTCGGGCATGCTCGCCTTGAGCCTGGCGAA<br>CAGTTCGGCTGGCGCGAGCCCCTGATGCTCTTCGTCCAGATC<br>ATCCTGATCGACAAGACCGGCTTCCATCCGAGTACGTGCTC<br>GCTCGATGCGATGTTTCGCTTGGTGGTCGAATGGGCAGGTA<br>GCCGGATCAAGCGTATGCAGCCGCCGCATTGCATCAGCCAT<br>GATGGATACTTTCTCGGCAGGAGCAAGGTGAGATGACAGGA<br>GATCCTGCCCCGGCACTTCGCCCAATAGCAGCCAGTCCCTTC<br>CCGCTTCAGTGACAACGTCGAGCACAGCTGCGCAAGGAACG<br>CCCGTCGTGGCCAGCCACGATAGCCGCGCTGCCTCGTCTTG<br>CAGTTCATTCAGGGCACCGGACAGGTCGGTCTTGACAAAAA<br>GAACCGGGCGCCCCTGCGCTGACAGCCGGAACACGGCGGC<br>ATCAGAGCAGCCGATTGTCTGTTGTGCCCAGTCATAGCCGA<br>ATAGCCTCTCCACCCAAGCGGCCGGAGAACCTGCGTGCAAT<br>CCATCTTGTTCAATCAT | 9 |

Figure 3:
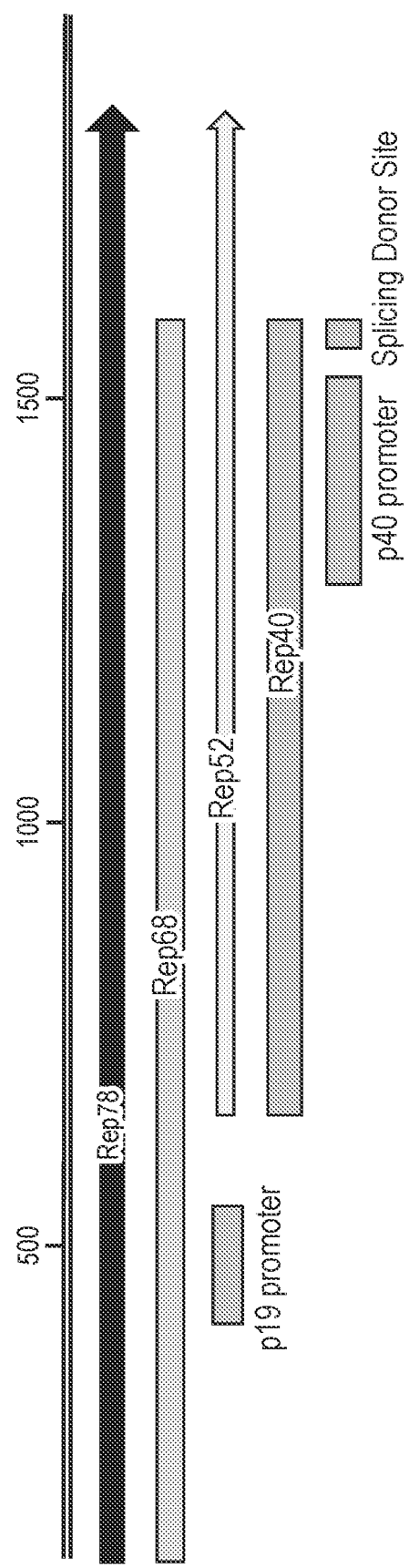
FIG. 3 is a DNA map of wild-type adeno-associated virus (AAV) replication (Rep) genes in an exemplary plasmid. The Rep genes encode four Rep proteins involved in viral replication ("Rep78," "Rep68," "Rep52," and "Rep40"), which are flanked by inverted terminal repeats (ITRs; not shown) and three promoters "p5" (not shown), "p19," and "p40".
Figure 4:
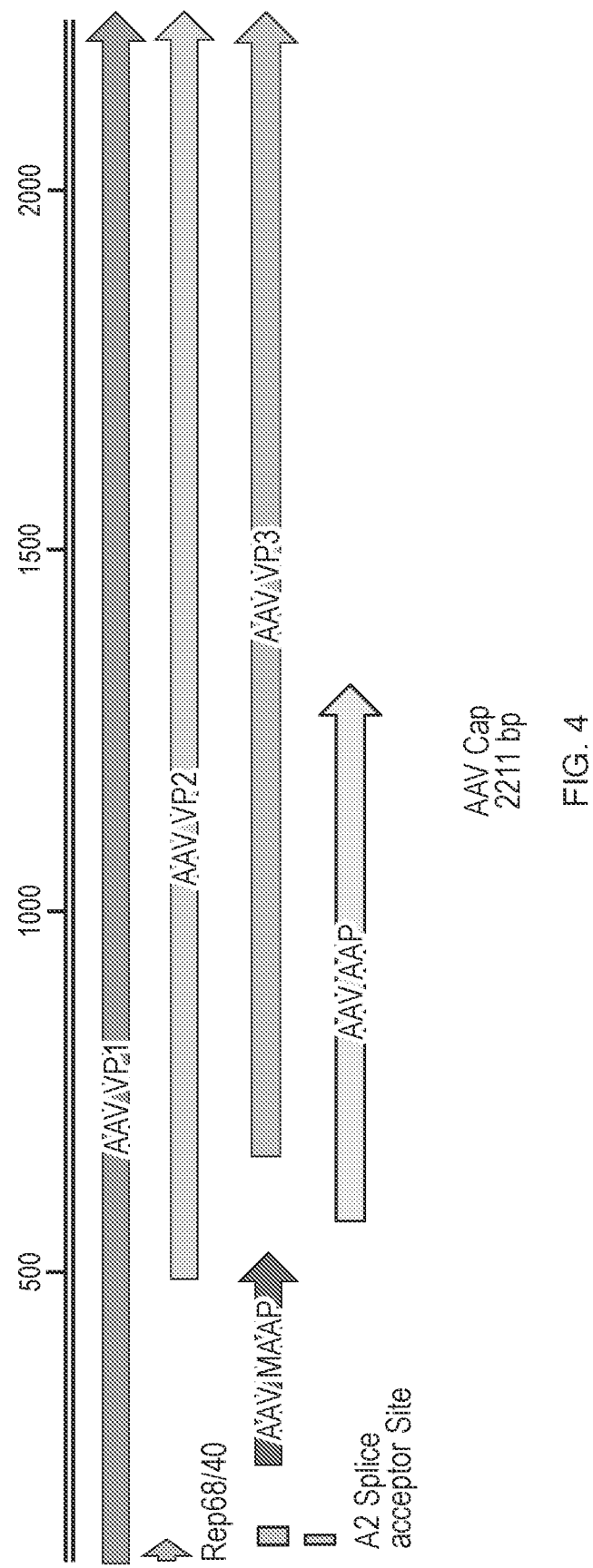
FIG. 4 is a DNA map of wild-type AAV capsid (Cap) genes in an exemplary plasmid. The Cap genes encode three Cap proteins involved in capsid formation (viral protein (VP) 1 (VP1), VP2, and VP3) and are flanked by inverted terminal repeats (ITRs; not shown) and three promoters (p5, p19, and p40; not shown).
Figure 5:
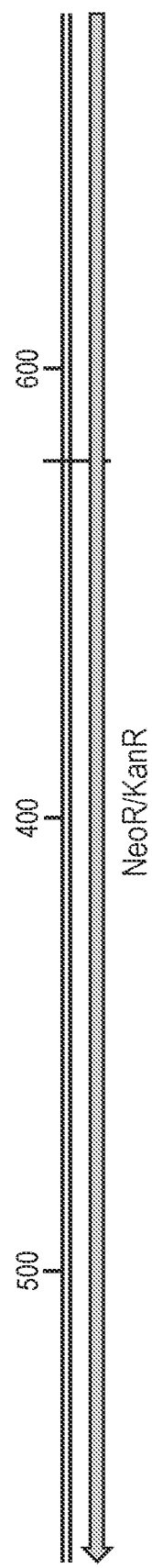
FIG. 5 is a DNA map of a wild-type kanamycin resistance gene in an exemplary plasmid.

Then, a map of a Rep and a Cap gene was generated (see FIG. 3 and FIG. 4) and each C or G of a CpG duplex in the Rep or Cap gene, respectively, was removed and replaced with the appropriate nucleotide to maintain the amino-acid codon sequence, using the human codon usage table depicted in FIG. 1. Similarly, for the kanamycin resistance gene, a map was generated (FIG. 5) and each C or G of a CpG duplex in the kanamycin resistance gene was removed and replaced with the appropriate nucleotide to maintain the amino-acid codon sequence, using the E. coli codon usage table depicted in FIG. 2.

For AAV Rep, three regions were excluded from CpG removal, comprising several key regulatory sequences, namely the AAV p19 and p40 promoters and the AAV splice donor site, as provided in Table 3 below. As denoted in the respective rows, nucleotide changes are provided by capital or lowercase letters, respectively. For AAV Cap, four regions were excluded from CpG removal comprising several regulatory sequences, namely AAP, MAAP, and splicing acceptor sites A1 and A2. For KanR no regions were excluded.

TABLE 3

Nucleotide Sequences with CpG Reduction

| Name | Sequence | SEQ ID NO. |
|---|---|---|
| CpG-depleted AAV Rep gene (nucleotide change shown in uppercase letters) | atgccTgggttttaTgagattgtgattaaggtccccagTgaccttgaTgagcatctgccTggcatt<br>tctgacagctttgtgaactgggtggcTgagaaggaatgggagttgccAccagattctgacatggat<br>ctgaatctgattgagcaggcaccccctgacAgtggcTgagaagctgcagAGAgactttctgac<br>AgaatggAGAAGGgtgagtaaggccccTgaggcccttttctttgtgcaatttgagaagggag<br>agagctacttccacatgcaTgtgctGgtggaaaccacAgggtgaaatccatggttttgggaAG<br>AttcctgagtcagattAGAgaaaaactgattcagagaatttacAGAgggatTgagccCacttt<br>gccaaactggttTgcTgtcacaaagaccagaaatggCgcCggaggCgggaacaaggtggtg<br>gatgagtgctacatccccaattacttgctccccaaaacccagcctgagctccagtgggcGtggact<br>aatatggaacagtatttaagCgcctgtttgaatctcacGgagCGTaaaAGGttggtggcTca<br>gcatctgacAcaTgtgtcTcagacTcaggagcagaacaaagagaatcagaatcccaattctgat<br>gcTccAgtgatcagatcaaaaacttcagccaggtacatggagctggtGgggtggctGgtggac<br>aagggattacctcTgagaagcagtggatccaggaggaccaggcctcatacatctccttcaatgc<br>TgcctccaactcCAGAtcccaaatcaaggctgccttggacaatgcTggaaagattatgagcct<br>gactaaaacAgccccTgactacctggtgggccagcagccTgtggaggacatttccagcaatAg<br>gatttataaaattttggaactaaaTgggtaTgatccccaatatgcTgcttcTgtcttttctgggatggg<br>ccacAaaaaagttTggcaagaggaaccaccatctggctgtttgggcctgcaactacAgggaaga<br>ccaacatTgcTgaggccatagcccacactgtgcccttctaTgggtgTgtaaactggaccaatga<br>gaacttttcccttcaaTgactgtgtGgacaagatggtgatctggtgggaggaggggaagatgacA<br>gccaaggtGgtggagtcAgccaaagccattctGgtgaggaagcaaggtgAGAgtggaccag<br>aaatgcaagtcctcTgcccagatagacccTactccTgtgatTgtcacctccaacaccaacatgtg<br>TgcTgtgattgaTgggaactcaacAaccttTgaacaccagcagccCttgcaagacAggatgt<br>tcaaatttgaactcaccAGAAGGctggatcatgactttgggaaggtcaccaagcaggaagtca<br>aagacttttttcCggtgggcaaaggatcaCgtggttgaggtggagcatgaattctaCgtcaaaaag<br>ggtggagccaagaaaagaccCgcccccagtgaCgcagatataagtgagcccaaaCgggtgC<br>gCGAgtcagttgcCcagccatcCacCtcagaTgcTgaagcttcGatcaactaCgcagaca<br>ggtaccaaaacaaatgttctAGAcaTgtgggcatgaatctgatgctgtttccctgcagacaatgT<br>gagagaatgaatcagaattcaaatatctgcttcactcaTggacagaaagactgtttagagtgctttcc<br>TgtgtcagaatctcaaccAgtttctgtGgtcaaaaaggcCtatcagaaactgtgctacattcatcat | 10 |

TABLE 3-continued

Nucleotide Sequences with CpG Reduction

| Name | Sequence | SEQ ID NO. |
|---|---|---|
| | atcatgggaaaggtgccagaTgcttgcactgcctgTgatctggtcaatgtggatttggatgactgc atctttgaacaataa | |
| CpG-depleted AAV Cap gene (nucleotide change shown in lowercase letters) | ATGGCTGCtGATGGTTATCTTCCAGATTGGCTcGAGGACAAC CTTAGTGAAGGAATTagaGAGTGGTGGGCTTTGAAACCTGGA GCCCCTCAACCCAAGGCAAATCAACAACATCAAGACAACGC TCGAGGTCTTGTGCTTCCGGGTTACAAATACCTTGGACCCGG CAACGGACTCGACAAGGGGGAGCCGGTCAACGCAGCAGAC GCGGCGGCCCTCGAGCACGACAAGGCCTACGACCAGCAGCT CAAGGCCGGAGACAACCCGTACCTCAAGTACAACCACGCCG ACGCCGAGTTCCAGGAGCGGCTCAAAGAAGATACGTCTTTT GGGGGCAACCTCGGGCGAGCAGTCTTCCAGGCCAAAAAGA GGCTTCTTGAACCTCTTGGTCTGGTTGAGGAAGCGGCTAAG ACGGCTCCTGGAAAGAAGAGGCCTGTAGAGCAGTCTCCTCA GGAACCaGACTCCTCtGCtGGTATTGGCAAATCtGGTGCACAG CCaGCTAAAAAGAGACTCAATTTtGGTCAGACTGGCGACACA GAGTCAGTCCCAGACCCTCAACCAATCGGAGAACCTCCCGC AGCCCCTCAGGTGTGGGATCTCTTACAATGGCTTCAGGTG GTGGCGCACCAGTGGCAGACAATAACGAAGGTGCCGATGG AGTGGGTAGTTCCTCGGGAAATTGGCATTGCGATTCCCAAT GGCTGGGGACAGAGTCATCACCACCAGCACCCGAACCTGG GCCCTGCCCACCTACAACAATCACCTCTACAAGCAAATCTC CAACAGCACATCTGGAGGATCTTCAAATGACAACGCCTACT TCGGCTACAGCACCCCCTGGGGGTATTTTGACTTCAACAGA TTCCACTGCCACTTCTCACCACGTGACTGGCAGCGACTCATC AACAACAACTGGGGATTCCGGCCTAAGCGACTCAACTTCAA GCTCTTCAACATTCAGGTCAAAGAGGTTACGGACAACAATG GAGTCAAGACCATCGCCAATAACCTTACCAGCACGGTCCAG GTCTTCACGGACTCAGACTATCAGCTCCCGTACGTGCTcGGG TCgGCTCAcGAGGGCTGCCTCCCgCCgTTCCCAGCgGAcGTTTT CATGATTCCTCAGTAGGGTATCTGACaCTTAATGATGGAAG CCAGGCtGTGGGTaGgTCcTCCTTTTACTGCCTGGAATATTTCC CaTCcCAAATGCTAAGAACaGGTAACAACTTCCAGTTCAGCT AtGAGTTTGAGAAtGTACCTTTCCATAGCAGCTAtGCTCACAG CCAAAGCCTGGACaGACTAATGAATCCACTCATtGACCAATA CTTGTACTATCTCTCAAAGACTATTAAtGGTTCTGGACAGAA TCAACAAACtCTAAAATTCAGTGTGGCtGGACCCAGCAACAT GGCTGTCCAGGGAAGAAACTACATACCTGGACCCAGCTACa GACAACAAaGgGTCTCAACCACTGTGACTCAAAACAACAAC AGtGAATTTGCTTGGCCTGGAGCTTCTTCTTGGGCTCTCAAT GGAaGgAATAGCTTGATGAATCCTGGACCTGCTATGGCCAGC CACAAAGAAGGAGAGGACAGgTTCTTTCCTTTGTCTGGATCT TTAATTTTTGGCAAACAAGGAACTGGAAGAGACAAtGTGGA TGCtGACAAAGTCATGATAACCAAtGAAGAAGAAATTAAAA CTACTAACCCaGTAGCAACaGAGTCCTATGGACAAGTGGCCA CAAACCACCAGAGTGCCCAAGCACAGGCcCAGACaGGCTGG GTTCAAAACCAAGGAATACTTCCtGGTATGGTTTGGCAGGAC AGAGATGTGTACCTGCAAGGACCCATTTGGGCCAAAATTCC TCACACaGAtGGCAACTTTCACCCTTCTCCcCTGATGGGAGGG TTTGGAATGAAGCACCCtCCTCCTCAGATCCTCATCAAAAAC ACACCTGTACCTGCtGATCCTCCAACaGCCTTCAACAAGGAC AAGCTGAACTCTTTCATCACCCAGTATTCTACTGGCCAAGTC AGtGTGGAGATtGAGTGGGAGCTGCAGAAGGAAAACAGCAA GaGgTGGAACCCtGAGATCCAGTACACTTCCAACTATTACAA GTCTAATAATGTTGAATTTGCTGTTAATACTGAAGGTGTATA TAGTGAACCCaGgCCCATTGGCACCAGATACCTGACTaGgAA TCTGTAA | 11 |
| CpG-depleted kanamycin resistance gene (nucleotide change shown in lowercase letters) | TCAGAAGAACTCaTCAAGAAGtCtATAGAAGGCaATtCtCTGgG AATCaGGAGCtGCaATACCaTAAAGCACaAGGAAtCtGTCAGCC CATTCaCCaCCAAGCTCTTCAGCAATATCtCtGGTAGCCAAgGC TATGTCCTGATAtCtGTCtGCCACACCCAGtCtGCCACAGTCaAT GAATCCAGAAAAtCtGCCATTTTCCACCATGATATTtGGCAAG CAGGCATCaCCATGGGTCACaACaAGATCCTCaCCaTCtGGCAT GCTgGCCTTGAGCCTGGCaAACAGTTCtGCTGGgGCaAGCCCC TGATGCTCTTCaTCCAGATCtGCaATCaACAAGACCtGCTT CCATtCtAGTtCtTGCTCtCTCaATtCtATGTTTgGCTTGGTGGTCa AATGGGCAGGTAGCtGGATCAAggGTATGCAGtCttCtCATTGC ATCAGCCATGATGGATACTTTCTCtGCAGGAGCAAGGTGAG ATGACAGGAGATCCTGCCCTGGCACTTCaCCCAATAGCAGCC AGTCCCTTCCtGCTTCAGTGACAACaTCaAGCACAGCTGCaCA AGGAACaCCaGTgGTGGCCAGCCAgGATAGtCtgCtGCCTCaT CTTGCAGTTCATTCAGGGCACCtGACAGGTCaGTCTTGACAA AAAGAACtGGtCtCCCCTGgGCTGACAGCCTgAACACtGCtGCA TCAGAGCAGCCaATTGTCTGTTGTGCCCAGTCATAGCCaAAT | 12 |

TABLE 3-continued

Nucleotide Sequences with CpG Reduction

| Name | Sequence | SEQ ID NO. |
|---|---|---|
| | AGCCTCTCCACCCAAGCtGCtGGAGAACCTGCaTGCAATCCAT CTTGTTCAATCAT | |

Figure 6:
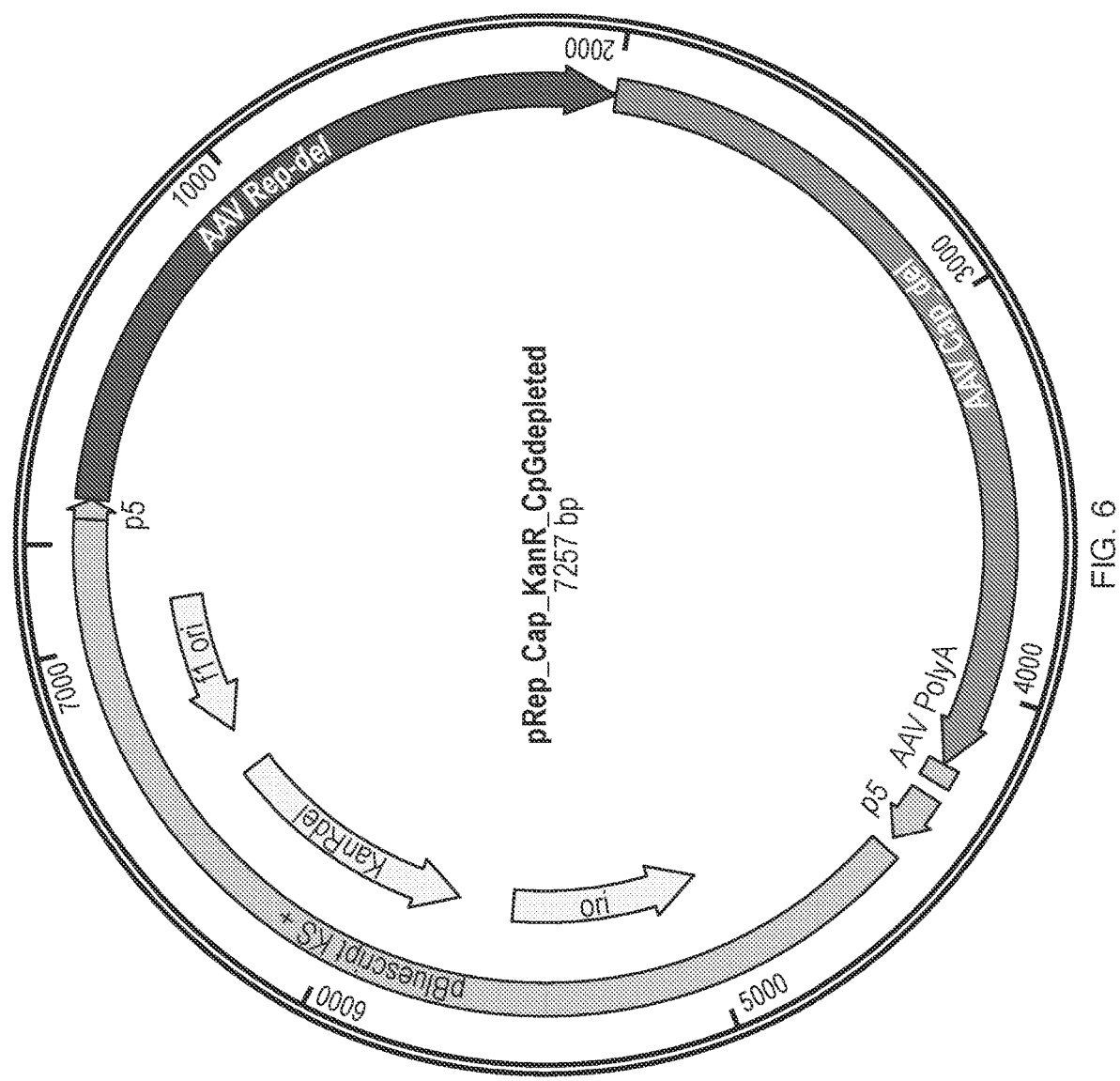
FIG. 6 is a schematic of a recombinant adeno-associated virus (rAAV) plasmid generated from a CpG-depleted AAV Rep and CpG-depleted AAV Cap, and a CpG-depleted KanR in a packaging plasmid ("pRep_Cap_KanR_CpGdepleted").
Figure 7:
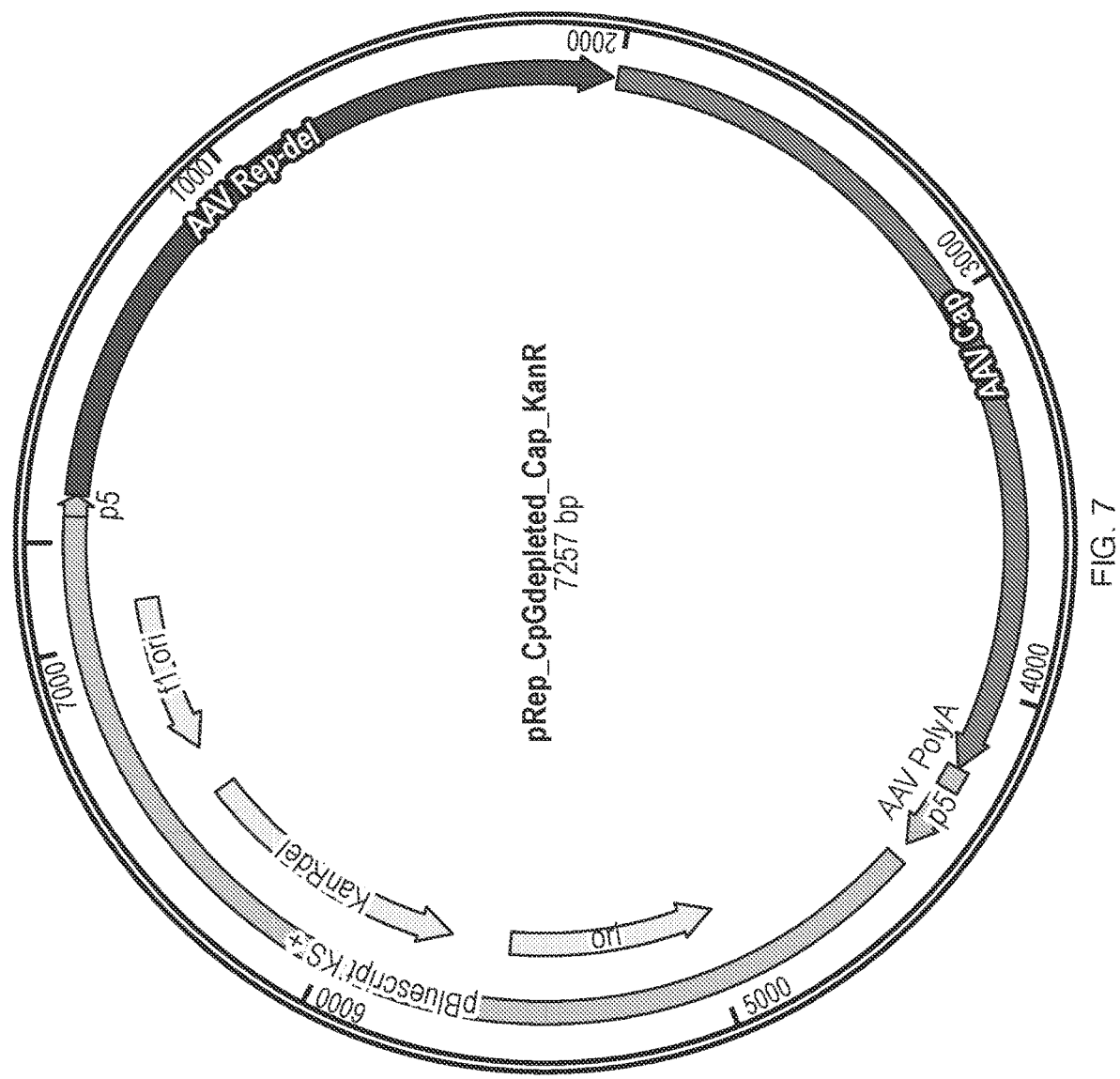
FIG. 7 is a schematic of a rAAV plasmid generated from a CpG-depleted AAV Rep a CpG-depleted KanR in a packaging plasmid ("pRep_CpGdepleted_Cap_KanR").
Figure 8:
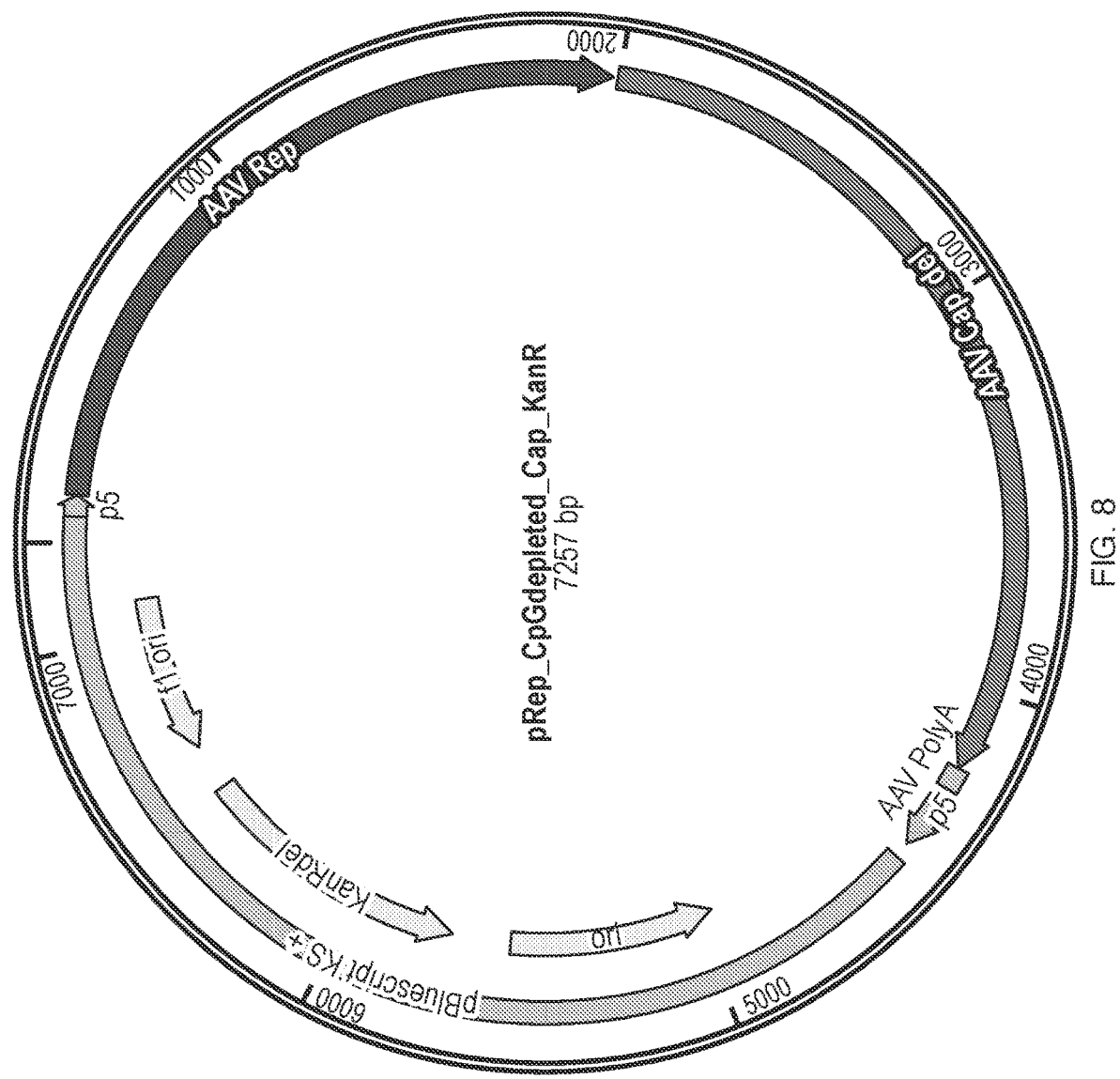
FIG. 8 is a schematic of a rAAV plasmid generated from a CpG-depleted AAV Cap and a CpG-depleted KanR in a packaging plasmid ("pRep_Cap_CpGdepleted_KanR").

Using the CpG-depleted genes, three plasmids were generated in E. coli strains JM108, NEB Stable, and Stbl3. The three generated plasmids included the following: 1) a rAAV plasmid generated from a CpG-depleted AAV Rep and a CpG-depleted AAV Cap in the packaging plasmid, and a CpG-depleted KanR in the packaging plasmid ("pRep_Cap_KanR_CpGdepleted;" "Plasmid 1," FIG. 6), 2) a plasmid having a CpG-depleted AAV Rep and a CpG-depleted KanR in the packaging plasmid ("pRep_CpGdepleted_Cap_KanR;" "Plasmid 2," FIG. 7), and 3) a plasmid having a CpG-depleted AAV Cap and a CpG-depleted KanR in the packaging plasmid ("pRep_Cap_CpGdepleted_KanR;" "Plasmid 3," FIG. 8). The yield, concentration, identity (by restriction digest of each plasmid preparation), and quality of each plasmid was confirmed. A control plasmid having endogenous CpG of Rep, Cap, and KanR was also generated ("pRep_Cap_KanR"). A calculation of the reduction of CpG per plasmid is provided in Table 4

TABLE 4

CpG Reduction in Experimental Plasmids

| | Plasmids | | | |
|---|---|---|---|---|
| | pRep_Cap_KanR | pRep_Cap_KanR_CpGdepleted | pRep_CpGdepleted_Cap_KanR | pRep_Cap_CpGdepleted_KanR |
| Total CpG | 456 | 239 | 289 | 333 |
| Total CpG deleted | 0 | 217 | 167 | 123 |
| CpG Reduction | 0% | 47.59% | 36.62% | 26.97% |

Example 2. Packaging AAV-GFP Using the CpG-Depleted pRepCap Plasmids

This example demonstrates the functional verification of the novel CpG-depleted pRepCap plasmids of Example 1.

Materials and Methods

To verify functionality of each novel plasmid of Example 1 with CpG depletion, packaging of an AAV vector expressing an enhanced green fluorescent protein (eGFP) reporter gene payload was conducted. Briefly, $1.5 \times 10^8$ suspension-adapted HEK293 cells were transfected in 50 mL with a combination of 3 plasmids to support AAV packaging according to the manufacturer protocol, including pHelper and pAAV and with pRep_Cap_KanR_CpGdepleted, pRep_CpGdepleted_Cap_KanR, pRep_Cap_CpGdepleted_KanR, or pRep_Cap_KanR, respectively. Approximately 48 hours post-incubation, a sample was obtained from each culture and placed in a 96-well plate for fluorescent imaging. Lysis buffer was added to the remainder of the cell cultures to lyse the cells. Lysates were then digested with a nuclease and clarified by centrifugation (30 min, 4198×G, 4° C.). The clarified crudes lysates were stored frozen at −80° C. prior to analytical assessment.

AAV9-GFP titers were estimated using a digital polymerase chain reaction (PCR) protocol. In brief, each AAV crude lysate was treated with DNAse-I, lysed, and submitted to partition; followed by PCR amplification using a CMV primer/probe set, using a dPCR instrument.

Capsid titers were roughly estimated with a semi-quantitative method using AAV9 antibodies coated on a strip.

Results

Figure 9:
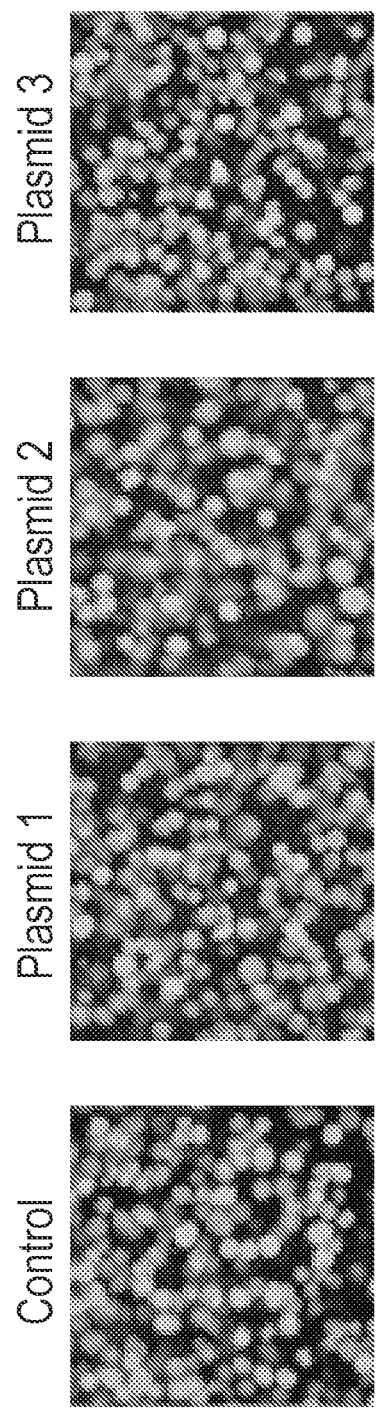
FIG. 9 is a set of photomicrographs of GFP-expressing VPC2.0 cells observed after transfection with the three experimental plasmids described in FIG. 6 ("Plasmid 1"), FIG. 7 ("Plasmid 2"), and FIG. 8 ("Plasmid 3"), respectively, or with a control plasmid having endogenous CpG of Rep, Cap, and KanR ("pRep_Cap_KanR" also referred to as "Control").

Photomicrographs of GFP-expressing VPC2.0 cells were observed 48 hours post-transfection with the CpG-depleted plasmids, and no difference in transfection efficiency was observed when using the CpG-depleted pRepCap plasmids compared to the unmodified wild-type version (FIG. 9). The percentage of GFP-expressing cells and the intensity of GFP expression in cells was similar.

The results of the capsid titers are seen in Table 5.

TABLE 5

AAV Titers Post-Production with Novel Plasmids

| pRepCap plasmid | vg/mL | Total vg |
|---|---|---|
| pRep_Cap_KanR | +++ | +++ |
| pRep_Cap_KanR_CpGdepleted | + | + |
| pRep_CpGdepleted_Cap_KanR | + | + |
| pRep_Cap_CpGdepleted_KanR | ++ | ++ |

Example 3. Reduction of CpG Content of a Transgene in a rAAV

This example demonstrates how the CpG content of a transgene in a rAAV is reduced.

Using the methods described in Example 1, the CpG content of transgene in a rAAV was modified by incorporating codon substitutions that diminish the CpG content of the gene. For example, every CpG present in the nucleotide sequence of the wild-type human interferon beta 1 (IFN) gene (Table 6) was identified on an exemplary plasmid. Each C or G of a CpG duplex in the gene was removed and replaced with the appropriate nucleotide to maintain the amino-acid codon sequence. As denoted in Table 6, nucleotide changes are provided by uppercase letters.

TABLE 6

Exemplary Payload Gene for and with CpG Reduction

| Name | Sequence | SEQ ID NO. |
|---|---|---|
| Human IFNβ gene | atgaccaacaagtgtctcctccaaattgct ctcctgttgtgcttctccactacagctctt tccatgagctacaacttgcttggattccta caaagaagcagcaattttcagtgtcagaag ctcctgtggcaattgaatgggaggcttgaa tactgcctcaaggacaggatgaactttgac atccctgaggagattaagcagctgcagcag ttccagaaggaggacgccgcattgaccatc tatgagatgctccagaacatctttgctatt ttcagacaagattcatctagcactggctgg aatgagactattgttgagaacctcctggct aatgtctatcatcagataaaccatctgaag acagtcctggaagaaaaactggagaaagaa gatttcaccaggggaaaactcatgagcagt ctgcacctgaaaagatattatgggaggatt ctgcattacctgaaggccaaggagtacagt cactgtgcctggaccatagtcagagtggaa atcctaaggaacttttacttcattaacaga cttacaggttacctccgaaactaa | 13 |
| CpG-depleted human IFNβ gene (nucleotide change shown in uppercase letters) | atgaccaacaagtgtctcctccaaattgct ctcctgttgtgcttctccactacagctctt tccatgagctacaacttgcttggattccta caaagaagcagcaattttcagtgtcagaag ctcctgtggcaattgaatgggaggcttgaa tactgcctcaaggacaggatgaactttgac atccctgaggagattaagcagctgcagcag ttccagaaggaggaTgcTgcattgaccatc tatgagatgctccagaacatctttgctatt ttcagacaagattcatctagcactggctgg aatgagactattgttgagaacctcctggct aatgtctatcatcagataaaccatctgaag acagtcctggaagaaaaactggagaaagaa gatttcaccaggggaaaactcatgagcagt ctgcacctgaaaagatattatgggaggatt ctgcattacctgaaggccaaggagtacagt cactgtgcctggaccatagtcagagtggaa atcctaaggaacttttacttcattaacaga cttacaggttacctcAgaaactaa | 14 |

Example 4. Reduction of CpG Content of a Gene of Interest in a Helper Plasmid

This example demonstrates how the CpG content of a gene of interest in a helper plasmid of a rAAV is reduced.

Using the methods described in Example 1, the CpG content of gene in a helper plasmid to a rAAV is modified by incorporating codon substitutions that diminish the CpG content of the gene. For example, every CpG present in the nucleotide sequence of a gene of interest, such as wild-type E4, E2A, or VA is identified. Each C or G of a CpG duplex in the gene is removed and replaced with the appropriate nucleotide to maintain the amino-acid codon sequence.

Example 5. Enhanced Methylation of CpG Dinucleotide Content in a rAAV

This example demonstrates how the methylated content of CpG dinucleotides in a rAAV, a packaging plasmid, and a helper plasmid is increased.

For example, one of skill in the art can design the methylated CpG content of a helper polynucleotide (e.g., a regulatory polynucleotide) or fragment thereof by methylating the unmethylated CpGs. Such a helper polynucleotide comprises, for example, a promoter, an enhancer, an intron, a microRNA, a linker, a splicing element, and a polyA signal in a rAAV or a viral life-cycle coding gene or fragment thereof, such as Rep, Cap, E1A, E1B, E4, E2A, ampicillin resistance gene, kanamycin resistance gene, VA RNA, Gag, Pol, Tat, Rev, Env, and VSV-G, in a packaging or helper plasmid, respectively. For instance, one begins with a wild-type gene sequence and introduces a dead CRISPR-associated endonuclease fused to an RNA methyltransferase or a nucleic acid encoding the CRISPR-associated endonuclease fused to an RNA methyltransferase. Such a methyltransferase can coordinate with a guide RNA targeted to, for example, a helper polynucleotide, such as a regulatory polynucleotide or fragment thereof in a rAAV; a viral life-cycle coding gene or fragment thereof in a packing plasmid; or a polynucleotide in a helper plasmid. This coordination of the methyltransferase with the gRNA can serve to increase the methylation of CpG dinucleotides of the respective gene while preserving the identity of the encoded protein's sequence. Once designed, the final methylation-optimized sequence is prepared.

Example 6. Enhanced Methylation of CpG Dinucleotide Content in a Viral Vector

This example demonstrates how the methylated content of CpG dinucleotides in a rAAV, a packaging plasmid, or a helper plasmid is increased.

For example, one of skill in the art can design the methylated CpG content of a helper polynucleotide (e.g., a regulatory polynucleotide) or fragment thereof by methylating the unmethylated CpGs. Such a helper polynucleotide comprises, for example, a promoter, an enhancer, an intron, a microRNA, a linker, a splicing element, and a polyA signal in a rAAV or a viral life-cycle coding gene or fragment thereof, such as Rep, Cap, E1A, E1B, E4, E2A, ampicillin resistance gene, kanamycin resistance gene, VA RNA, Gag, Pol, Tat, Rev, Env, and VSV-G, in a packaging or helper plasmid, respectively. For instance, one can provide cells (e.g., host cells) with a polynucleotide comprising a payload of interest and culture the cells in a growth medium comprising cytosine or a derivative thereof to generate a recombinant AAV vector having increased methylation of CpG dinucleotides as compared to a recombinant AAV vector generated in a control growth medium.

Additionally, determination of the total methylation profile of AAV genomes following production with CpG-depleted plasmids can be determined. For example, methylation levels between AAV genome preparations made with CpG-containing versus CpG-depleted plasmids can be determined using methylation sequencing methods, such as bisulfite sequencing. Briefly, DNA genomes are extracted from AAV preparations and prepared into libraries for sequencing and then subject to bilsulfite sequencing.

In addition, ELISA can be used for quick assessment of DNA methylation.

Example 7. Evaluating the Impact of CpG-Depletion or Enhanced Methylation of CpG Dinucleotide Content in a Viral Vector Once designed and generated, a vector, such as any such viral vector generated by the methods described in any one of Examples 1-4, is evaluated. Features for evaluation include identifying the vector genome titer (vg/mL), transduction units or infectious titer, Rep protein expression and ratio, Cap protein expression and ratio, overall genome methylation level, residual plasmid DNA (e.g., KanR, Rep, Cap; such as residual plasmid DNA in copy numbers or by next-generation sequencing). Further, the vector immunogenicity is evaluated in vitro, for example, using a TLR9 assay, and the vector immunogenicity is evaluated in vivo.

The TLR9 assay involves the in vitro use of a reporter cell line. Briefly, iLite TLR9 Assay ready cells are used to develop a functional assay to evaluate the TLR9 response to AAV preparations made with CpG-containing versus CpG-depleted plasmids. The cells consist of genetically-modified HEK293 reporter cells that quantitatively express Firefly Luciferase in response to TLR9 activation. Cells are mixed with various dilutions of AAVs (both with and without CpG sequences) and resultant output Firefly luciferase expression is quantified on a luminometer. A reduction in the Firefly luciferase expression level indicates a reduction in CpG-triggered signaling via TLR9, thereby demonstrating that the AAV is less immunogenic.

In vivo assays for evaluating immunogenicity include taking AAV productions made with CpG-containing and CpG-depleted plasmids, transducing wild-type or TLR9 mutant (TLR9$^{-/-}$) mice, which serve as a control because TLR9$^{-/-}$ mice as well as TLR9 antagonists can prevent innate immune responses, and assessing for differential responses with transcriptomic sequencing (RNA-seq) or staining of relevant tissue sections for proteins of interest (e.g., infiltrating neutrophils, Mac-1$^+$ macrophages, and CD335$^+$ natural killer cells).

Additionally, in vivo assays for evaluating immunogenicity include IFN-γ ELISpot assays, which can be used to measure broad spectrum cellular immune responses against viral antigens, such as CpG sequences in the payload genomes.

The invention claimed is:

1. A nucleic acid, comprising two or more helper polynucleotides, wherein the two or more helper polynucleotides comprise an adeno-associated virus (AAV) Rep gene comprising the nucleic acid sequence of SEQ ID NO: 10 and an AAV Cap gene comprising the nucleic acid sequence of SEQ ID NO: 11, and wherein the two or more helper polynucleotides comprise reduced CpG dinucleotides as compared to a wild-type gene equivalent.

2. The nucleic acid of claim 1, wherein the two or more helper polynucleotides comprise increased methylation of CpG dinucleotides as compared to a wild-type gene equivalent.

3. The nucleic acid of claim 1, wherein the two or more helper polynucleotides further comprise:
(a) a promoter, an enhancer, an intron, a microRNA, a linker, a splicing element, a polyA signal, or a combination thereof; and/or
(b) AAV helper polynucleotides selected from the group consisting of E1A, E1B, E4, E2A, and VA RNA.

4. The nucleic acid of claim 1, wherein the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof.

5. The nucleic acid of claim 1, wherein the nucleic acid comprises a backbone polynucleotide comprising reduced CpG dinucleotides, increased methylation of CpG dinucleotides, or both reduced CpG dinucleotides and increased methylation of CpG dinucleotides.

6. The nucleic acid of claim 5, wherein the backbone polynucleotide comprises an antibiotic resistance gene.

7. The nucleic acid of claim 6, wherein the antibiotic resistance gene encodes a kanamycin, spectinomycin, streptomycin, ampicillin, carbenicillin, bleomycin, erythromycin, polymyxin B, tetracycline, chloramphenicol, neomycin, or zeocin resistance gene, or a resistance gene derivative thereof.

8. The nucleic acid of claim 7, wherein the kanamycin resistance gene comprises a sequence 100% identical to the nucleic acid sequence of SEQ ID NO: 12.

9. A recombinant adeno-associated virus (AAV) vector comprising:
(a) a first nucleic acid comprising a payload of interest comprising a sequence 100% identical to the nucleic acid sequence of SEQ ID NO: 14; and
(b) a second nucleic acid comprising two or more helper polynucleotides, a first helper polynucleotide of the two or more helper polynucleotides comprising an AAV Rep gene comprising a sequence 100% identical to the nucleic acid sequence of SEQ ID NO: 10; and a second helper polynucleotide of the two or more helper polynucleotides comprising an AAV Cap gene comprising a sequence 100% identical to the nucleic acid sequence of SEQ ID NO: 11.

10. The recombinant AAV vector of claim 9, wherein the second nucleic acid has a reduced number of CpG dinucleotides and/or increased methylation of CpG dinucleotides as compared to a wild-type gene equivalent.

11. The recombinant AAV vector of claim 10, wherein the two or more helper polynucleotides further comprise:
(a) a promoter, an enhancer, an intron, a microRNA, a linker, a splicing element, a polyA signal, or a combination thereof; and/or
(b) AAV helper polynucleotides selected from the list consisting of E1A, E1B, E4, E2A, and VARNA.

12. The recombinant AAV vector of claim 11, wherein the two or more helper polynucleotides further comprise a promoter.

13. The recombinant AAV vector of claim 10, wherein the recombinant AAV vector comprises a backbone polynucleotide comprising reduced CpG dinucleotides, increased methylation of CpG dinucleotides, or both reduced CpG dinucleotides and increased methylation of CpG dinucleotides.

14. The recombinant AAV vector of claim 13, wherein the backbone polynucleotide comprises an antibiotic resistance gene.

15. The recombinant AAV vector of claim 14, wherein the antibiotic resistance gene encodes a kanamycin, spectinomycin, streptomycin, ampicillin, carbenicillin, bleomycin, erythromycin, polymyxin B, tetracycline, chloramphenicol, neomycin, or zeocin resistance gene, or a resistance gene derivative thereof.

16. The recombinant AAV vector of claim 15, wherein the kanamycin resistance gene comprises a sequence 100% identical to the nucleic acid sequence of SEQ ID NO: 12.

17. The recombinant AAV vector of claim 9, wherein the AAV is AAV1, AAV2, AAV3, AAV4, AAV5, AAV6, AAV7, AAV8, AAV9, AAV10, AAV11, AAV12, AAV13, AAV14, AAV15, AAV16, AAV-rh8, AAV-rh10, AAV-rh20, AAV-rh39, AAV-rh74, AAV-rhM4-1, AAV-hu37, AAV-Anc80, AAV-Anc80L65, AAV-7m8, AAV-PHP-B, AAV-PHP-EB, AAV-2.5, AAV-2tYF, AAV-3B, AAV-LK03, AAV-HSC1, AAV-HSC2, AAV-HSC3, AAV-HSC4, AAV-HSC5, AAV-HSC6, AAV-HSC7, AAV-HSC8, AAV-HSC9, AAV-HSC10, AAV-HSC11, AAV-HSC12, AAV-HSC13, AAV-HSC14, AAV-HSC15, AAV-TT, AAV-DJ/8, AAV-Myo, AAV-NP40, AAV-NP59, AAV-NP22, AAV-NP66, or AAV-HSC16, or a derivative thereof.

18. A pharmaceutical composition comprising:
(a) a recombinant adeno-associated virus (AAV) vector comprising a payload of interest;
(b) a plurality of helper polynucleotides comprising an AAV Rep gene comprising a sequence 100% identical to the nucleic acid sequence of SEQ ID NO: 10 and an AAV Cap gene comprising a sequence 100% identical to the nucleic acid sequence of SEQ ID NO: 11, wherein the plurality of helper polynucleotides comprise reduced CpG dinucleotides; and
(c) a pharmaceutically acceptable excipient.

19. The pharmaceutical composition of claim 18, wherein the pharmaceutical composition comprises less than about 50% CpG dinucleotides as compared to a wild-type gene equivalent.

20. The pharmaceutical composition of claim 19, wherein the recombinant AAV vector comprises less than about 10% CpG dinucleotides.

* * * * *